United States Patent [19]
Borbas et al.

[11] 3,922,644
[45] Nov. 25, 1975

[54] SCAN OPERATION FOR A CENTRAL PROCESSOR

[75] Inventors: Robert A. Borbas; John P. Dufton, both of Brockville; James H. Foster, Smithsfalls, all of Canada

[73] Assignee: GTE Automatic Electric (Canada) Limited, Brockville, Canada

[22] Filed: Sept. 27, 1974

[21] Appl. No.: 510,253

[52] U.S. Cl. .............................................. 340/172.5
[51] Int. Cl.² .............................................. G06F 9/06
[58] Field of Search ............... 340/172.5; 179/18 ES

[56] References Cited

UNITED STATES PATENTS

| | | | |
|---|---|---|---|
| 3,370,274 | 2/1968 | Kettley et al. | 340/172.5 |
| 3,408,628 | 10/1968 | Brass et al. | 340/172.5 |
| 3,529,295 | 9/1970 | Brass et al. | 340/172.5 |
| 3,614,741 | 10/1971 | McFarland, Jr. et al. | 340/172.5 |
| 3,705,389 | 12/1972 | Krock et al. | 340/172.5 |
| 3,820,084 | 6/1974 | Jones et al. | 340/172.5 |

*Primary Examiner*—Harvey E. Springborn
*Assistant Examiner*—Paul R. Woods
*Attorney, Agent, or Firm*—John T. Winburn; Richard O. Gray, Jr.

[57] ABSTRACT

A central processor of the type which controls the operation of telephone exchange subsystems to establish requested service between telephone subscribers in response to a plurality of addressable multiple bit operational codes wherein each of the subsystems is connected to the central processor by a common data bus and assigned a discrete subsystem address for enabling the addressing of each subsystem and wherein one of the subsystems is a program memory containing the plurality of operational codes has a scan means for locating stored subsystem data which contains preselected bits of data responsive to a particular operational code which includes first and second partial subsystem addresses and a mode bit for specifying either a direct scan mode or an indirect scan mode.

In the direct scan mode a combining means combines the first partial address with a third partial address stored in one of the central processor stores to provide a composite subsystem address. A bus address register addresses the subsystem having the composite address and obtains the data stored therein. A comparator compares the stored subsystem data to a compare constant consisting of the preselected bits of data. If they are identical the scan means is terminated and if they are not identical the third partial address is incremented to the next subsystem address to be interrogated.

In the indirect mode the combined first and third partial addresses are an address obtaining composite address and the data received is an address word. The combining means combines the address word and the second partial subsystem address to obtain the composite subsystem address for locating the preselected bits of data.

16 Claims, 42 Drawing Figures

SCAN OPERATION FOR A CENTRAL PROCESSOR

BACKGROUND OF THE INVENTION

The present invention is generally directed to a central processor for use in a telephone switching system wherein the subsystems of the system are interconnected on a common data bus and in particular to such a central processor which includes a scan means for interrogating a preselected subsystem to locate stored subsystem data which contains preselected bits of data.

Modern telephone exchanges operate in response to a central processor which controls all of the necessary functions within the exchange system to provide requested service. One type of well known exchange system is disclosed in Borbas et al., U.S. Pat. No. 3,767,863 which issued on Oct. 23, 1973 and which is assigned to the assignee of the present invention. The exchange system theredisclosed is a system wherein each of the subsystems of the exchange is connected to the central processor by a common data bus and assigned a discrete subsystem address for enabling the addressing of each subsystem. Among the subsystems is a program memory which contains operational codes to be utilized by the central processor to control the overall function of the system.

The common data bus is interfaced to the central processor by a bus control unit which is fully disclosed and claimed in Borbas, U.S. Pat. No. 3,812,297 which is also assigned to the assignee of the present invention. The bus control unit theredescribed is one which is compatible with the present invention. Any further reference to a bus control unit may be made to the aforementioned U.S. Pat. No. 3,812,297. The bus control unit theredescribed provides an address cycle followed by a data cycle indicated by signals on the control conductors for use by the central processor.

To control the operation of a telephone exchange such as the one disclosed in the aforementioned U.S. Pat. No. 3,767,863, a central processor is required. It operates under the commands of operational codes to control the function of the subsystems connected to the common data bus to provide the desired service between the subscribers. Such a central processor is fully disclosed and claimed in copending U.S. Pat. application Borbas et al., entitled Central Processor For a Telephone Exchange, Ser. No. 510,092, which was filed on the same day as this application and is also assigned to the assignee of the present invention.

During the operation of the central processor, it is sometimes necessary to locate preselected bits of data which are stored in the telephone exchange subsystems. Scan means of the prior art for accomplishing this function have been limited. This is due to the fact that the end points of the scan have been fixed for scanning the various subsystems to locate the preselected bits of data.

It is therefore an object of the present invention to provide an improved central processor for a telephone exchange system.

It is a further object of the present invention to provide an improved scan means for a central processor of the type which controls the operations of telephone exchange subsystems which are interconnected onto a common data bus responsive to a plurality of multiple bit operational codes wherein the improved scan means responsive to a particular operational code locates preselected bits of data which are stored in the telephone exchange subsystems and wherein the scan means operate in either a direct or an indirect scan mode for providing a degree of flexibility heretofore unobtainable.

SUMMARY OF THE INVENTION

The present invention provides, in a central processor of the type which controls the operation of telephone exchange subsystems to establish requested service between telephone subscribers in response to a plurality of addressable multiple bit operational codes, wherein each of the subsystems is connected to the central processor by a common data bus and assigned a discrete subsystem address for enabling the addressing of each subsystem and wherein one of the subsystems is a program memory containing the plurality of operational codes, the improvement of scan means responsive to a particular operational code which includes a first partial subsystem address for interrogating preselected subsystems to locate stored subsystem data which contains preselected bits of data. The central processor comprises an instruction register for storing the particular operational code, an instruction register byte selector coupled to the instruction register for selecting the first partial subystem address, a first accumulator for storing a second partial subsystem address, and combining means coupled to the instruction register byte selector and the first accumulator for combining the first and second partial subsystem addresses to provide a composite subsystem address. The central processor further comprises a bus address register coupled to the combining means and to the common data bus for addressing the subsystem having the composite subsystem address for causing it to transmit the data stored therein over the common data bus, a second accumulator for storing the preselected bits of data as a compare constant, a comparator coupled to the common data bus and to the second accumulator for comparing the transmitted data to the compare constant for determining if the transmitted data and the compare constant are identical, and means responsive to the comparator for providing a first control signal when the transmitted data and the compare constant are identical and for providing a second control signal when the transmitted data and the compare constant are not identical.

The present invention additionally provides, in a central processor of the type which controls the operation of telephone exchange subsystems to establish requested service between telephone subscribers in response to a plurality of addressable multiple bit operational codes, wherein each of the subsystems is connected to the central processor by a common data bus and assigned a discrete subsystem address for enabling the addressing of each subsystem and wherein one of the subsystems is a program memory containing the plurality of operational codes, the improvement of a scan means responsive to a particular operational code which includes a mode bit and first and second partial subsystem addresses for interrogating preselected subsystems to locate stored subsystem data which contains preselected bits of data. The central processor comprises an instruction register for storing the particular operational code, an instruction register byte selector coupled to the instruction register for selecting the first and second partial subsystem addresses, a first accumulator for storing a third partial subsystem address, and combining means coupled to the instruction register byte selector and the first accumulator for combining the first and third partial subsystem addresses to provide an address word obtaining composite subsystem address. The central processor additionally comprises a bus address register coupled to the combining means and to the common data bus and responsive to the combining means for addressing the subsystem having the address word obtaining composite subsystem address for causing it to transmit the address word stored therein over the common data bus, the combining means additionally being coupled to the common data bus and responsive to the mode bit for combining the second partial subsystem address with the address word for providing a data obtaining composite subsystem address, the bus address register additionally being responsive to the data obtaining composite subsystem address for addressing the subsystem having the data obtaining composite address for causing it to transmit the data stored therein over the common data bus. The central processor further comprises a second accumulator for storing the preselected bits of data as a compare constant, a comparator coupled to the common data bus and to the second accumulator for comparing the transmitted data to the compare constant for determining if the transmitted data and the compare constant are identical, and means responsive to the comparator for providing a first control signal when the transmitted data and the compare constant are identical and for providing a second control signal when the transmitted data and the compare constant are not identical.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings and in the several figures of which like reference numerals indicate identical elements and in which:

DESCRIPTION OF THE PREFERRED EMBODIMENT

Figure 1:
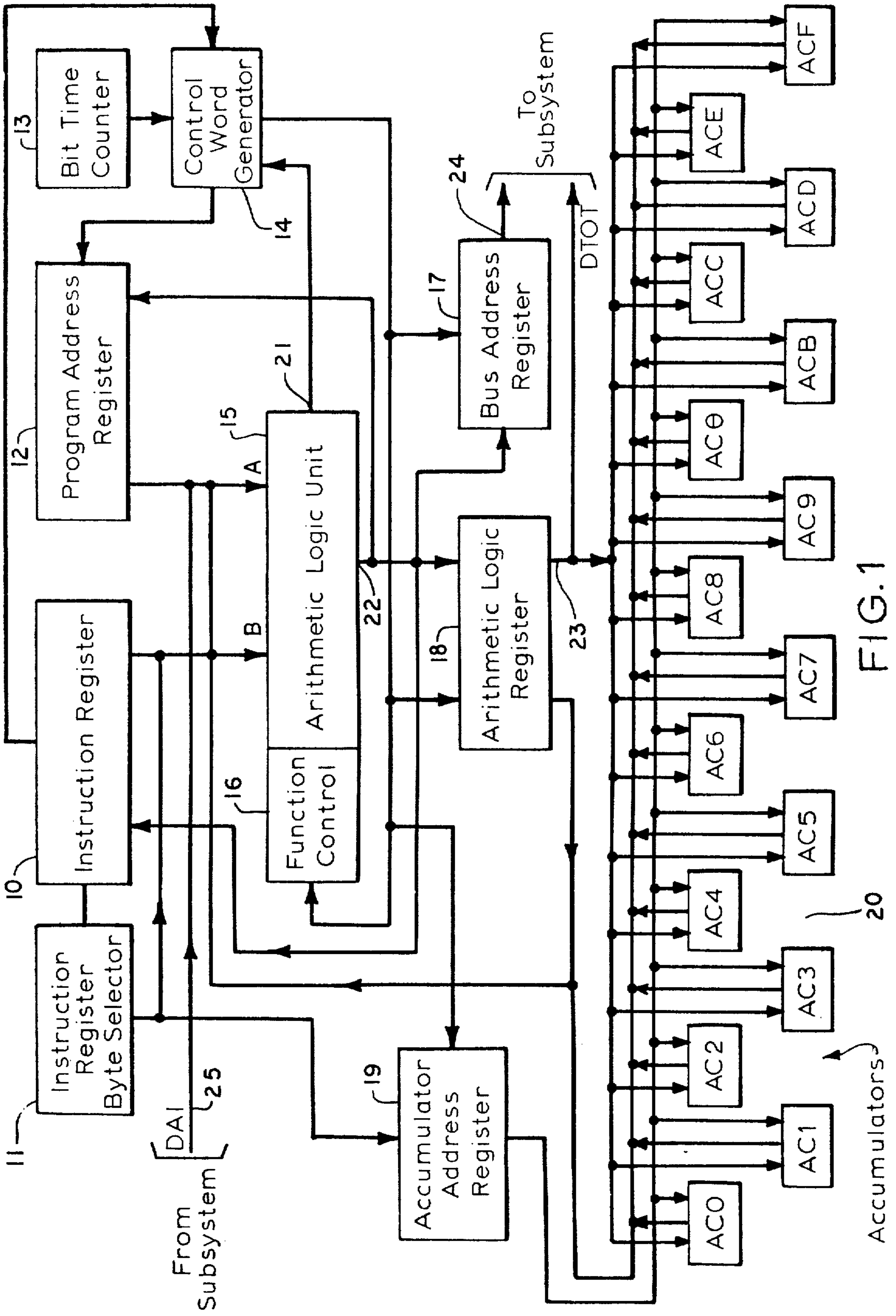
FIG. 1 is a block schematic representation of a central processor embodying the scan means of the present invention.

Referring to the block diagram of FIG. 1, the central processor thererepresented includes instruction register (IR) 10, instruction register byte selector (IRBYS) 11, program address register (PAR) 12, bit time counter (BTC) 13, control word generator 14, arithmetic logic unit (ALU) 15, function control (FCT) 16, bus address register (BAR) 17, arithmetic logic register (ALR) 18, accumulator address register (ACCADR) 19, and a plurality of accumulators 20 each having its own designation ACO–ACF.

The program address register 12 is coupled to input A of the arithmetic logic unit 15. It is a 16 bit store which stores the address of the next operational code and addresses the program memory to obtain a selected operational code to be read by the central processor. It is coupled to control word generator 14 which increments the program address register 12 during a given operational code command sequence to provide it with the next program address. The program address register 12 is also coupled to output 22 of arithmetic logic unit 15 and obtains from arithmetic logic unit 15 a selected program memory address during certain ones of the operational codes.

Bit time counter 13 is a 16 bit shift register so that the executions of the operational codes are performed in proper time sequence. It is coupled to control word generator 14 and is driven by a central processor clock (CPC) not shown. The CPC pulses have a frequency of 5MHz which have periods of 200 ns.

Instruction register 10 is a 20 bit store which stores each program instruction operational code as it is obtained from the program memory or from a central processing unit test panel which provides manual access to the central processor. The central processor operates in accordance with a 20 bit operational code obtained from program memory and it is this operational code which is stored in the instruction register. Certain bits of the operational codes contain partial subsystem addresses and these addresses are obtained by the central processor from the instruction register.

Instruction register byte selector 11 is coupled to the instruction register 10 and selects individual bytes of the selected operational code. During certain ones of the operational code it is necessary to reference particular bytes of the operational code for performing specific operations or for obtaining partial preselected subsystem addresses.

Control word generator 14 is coupled to instruction register 10 and in response to the first four bits of the operational codes stored in the instruction register provides function control signals which are applied to function control 16. These function control signals are designated M, S8, S4, S2 and S1. The control word generator 14 as previously mentioned also increments the program address register 12 during each of the operational codes to set the program address register at the next program address for the next operational code to be utilized by the central processor.

The arithmetic logic unit 15 contains the logic circuitry required to carry out the arithmetic and logic operational code instructions. Function control 16 is part of the arithmetic logic unit and responsive to the function control signals supplied by the control word generator 14, it informs the arithmetic logic unit what specific function it will perform at a specified time. The arithmetic logic unit 15 has two data inputs, input A and input B. It additionally has output 21 coupled to control word generator 14 for providing a data compare function when necessary and an output 22 coupled to the bus address register 17, arithmetic logic register 18, the instruction register 10, and the program address register 12 for providing the program address register with a specific program memory address in response to selected operational codes.

The arithmetic logic unit not only performs the arithmetic and logic functions of the central processor but additionally serves as a conduit to transfer the data received over DAI line 25 from the telephone exchange subsystems to the central processor circuits to which it is coupled. For instance, when a particular program is program memory is to be selected, the program address register provides the address of the selected operational code within the program memory and transfers this address to input A of the arithmetic logic unit. The program address is then transferred from output 22 of the arithmetic logic unit 15 to the bus address register 17 which contains the address of the program memory. Upon receipt of a ready signal from the bus control unit the selected operational code is received from the program memory over DAI line 25 into input A of the arithmetic logic unit whereupon it is transferred from output 22 of the arithmetic logic unit to the instruction register.

As previously mentioned, the arithmetic logic unit provides the arithmetic and logic functions of the central processor in response to the function control signals generated by the control word generator 14. Table 1 lists these functions as they correspond to the M, S8, S2, and S1 input levels required at the function control 16.

Table 1

| M (MODE) | ALU Function Control Commands S8 | S4 | S2 | S1 | FUNCTION |
|---|---|---|---|---|---|
| 1 | 1 | 1 | 1 | 1 | A |
| 1 | 1 | 0 | 1 | 0 | B |
| 1 | 1 | 0 | 1 | 1 | A.B |
| 1 | 1 | 1 | 1 | 0 | A+B |
| 1 | 0 | 1 | 1 | 0 | $A \oplus B$ |
| 1 | 1 | 0 | 0 | 1 | $\overline{A \oplus B}$ |
| 1 | 0 | 0 | 0 | 0 | $\overline{A}$ |
| 1 | 0 | 0 | 1 | 1 | 0 |
| 0 | 1 | 0 | 0 | 1 | A PLUS B |
| 0 | 0 | 0 | 0 | 0 | A PLUS 1 * |
| 0 | 1 | 1 | 1 | 1 | A MINUS 1 |
| 0 | 0 | 1 | 1 | 0 | A MINUS B * |

WHERE:
Mode = 1, logic operation
Mode = 0, arithmetic operation
A = ALU A
B = ALU B
* The carry lead (ALUFC) to units digit of ALU must be true.

During the execution of the scan operational code, the scan means of the central processor utilizes the functions of Table 1 designated A, B, A.B, $\overline{A \oplus B}$, $\overline{A}$, APLUS B, and A MINUS B. The A function dictates that the data at input A of the ALU be passed directly to output 22 of the ALU. The B function dictates that the data at input B of the ALU be passed directly to output 22 of the ALU. The A.B function is and AND function wherein the data at inputs A and B of the ALU are AND together and the results passed to output 22. The $\overline{A \oplus B}$ is an exclusive OR function wherein the data at inputs A and B of the ALU are exclusively OR together and the complement of the result is passed to output 22 of the ALU. The $\overline{A}$ function dictates that the data at input A of the ALU be complemented and passed to output 22 of the ALU. The A PLUS B function is the function where the data at the A and B inputs are added together or combined and the result passed to output 22 of the ALU and the A MINUS B function is the function where the data at input B of the ALU is substracted from the data at the input A of the ALU by the ALU and the result passed directly to output 22.

The arithmetic logic register 18 consists of a 20 bit store which is used to temporarily store the data received from the ALU output 22. The data temporarily stored in the arithmetic logic register 18 may be gated to the arithmetic logic inputs for further processing, to one of the accumulators, or to the subsystem addressed by the bus address register.

Accumulator 20 consists of 16, 20 bit accumulators (ACO–ACF) which may be used to temporarily store data during processor operations. During the scan operational code the scan means utilizes accumulators ACO, AC1, AC2 and AC3. Accumulator ACO stores in bits 5–20 a 16 bit partial subsystem address. Accumulator AC1 stores a mask constant which is a 20 bit data word which is logically ANDed with the data received from the particular subsystem, the result of which is then compared to the contents of accumulator AC2. Accumulator AC2 stores the preselected bits of data as a compare constant to be compared to the data received from the particular subsystem being interrogated. Lastly, accumulator AC3 stores in its bits 1–8 the number of scan cycles to be executed by the scan means an serves as a down counter which is decremented each time a scan cycle does not locate the preselected bits of data. Accumulator AC3 additionally stores in its bits 9–20 and ADD constant which is utilized to increment the 16 bit partial address of accumulator ACO each time a scan cycle does not produce the preselected bits of data to provide a new address to be utilized by the scan means for its next subsystem interrogation.

The accumulator address register 19 is used to select a particular accumulator in response to the instruction register byte selector or the control word generator. During a scan cycle, the accumulator address register is called upon to select at various times one of the accumulators ACO–AC3. The input data to the accumulators comes directly from the arithmetic logic register 18 and the output data can go to either input A or input B of the arithmetic logic unit 15. The bus address register 17 receives and stores the 20 bit subsystem address of the particular subsystem to be accessed during a BCU cycle. This address is presented to the common data bus during an address cycle, thus enabling data flow to and from the particular subsystem. The data which is to be transferred to a subsystem is provided at arithmetic logic register output 23 and the subsystem address is provided at bus address register output 24.

During the scan operations, the scan means only executes data in cycles, that is to say, the scan means does not send data, other than subsystem addresses, out onto the bus. Thus, the addresses sent out onto the bus to interrogate a particular subsystem originates from the bus address register 17.

Figure 2A:
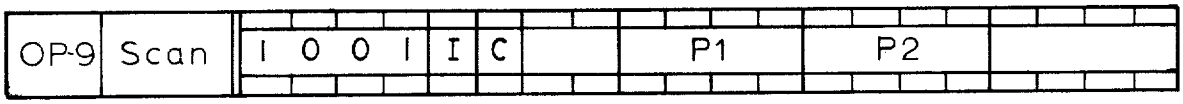
FIG. 2A is a graphic representation of the contents of a particular operational code which is utilized by the scan means of the central processor of FIG. 1.

All functios of the central processor are controlled by the coded commands of the particular operational code obtained from program memory and fed into the instruction register 10. FIG. 2A shows the contents of the instruction register in symbolic form for the scan operational code. IR bits 1–4 of the scan operational code (1001) are utilized by the control word generator to provide the function control signals previously described. IR bit 5 (I) is a mode bit which designates whether the scan means is to operate in a direct or an indirect mode. If I is equal to 0 the scan means will operate in the direct mode and if I is equal to 1 the scan means will operate in an indirect mode. IR bit 6 (C) is the bit of information which determines whether the scan means is looking for preselected bits of data which are identical to the compare constant (C=0) or data which is not identical to the preselected bits of data (C=1).

IR bits 9–12 (P1) specifies a partial subsystem address which is utilized by the scan means during both the direct and indirect modes. IR bits 13–16 (P2) specifies a partial subsystem address which is utilized during the indirect mode.

Figure 2B:
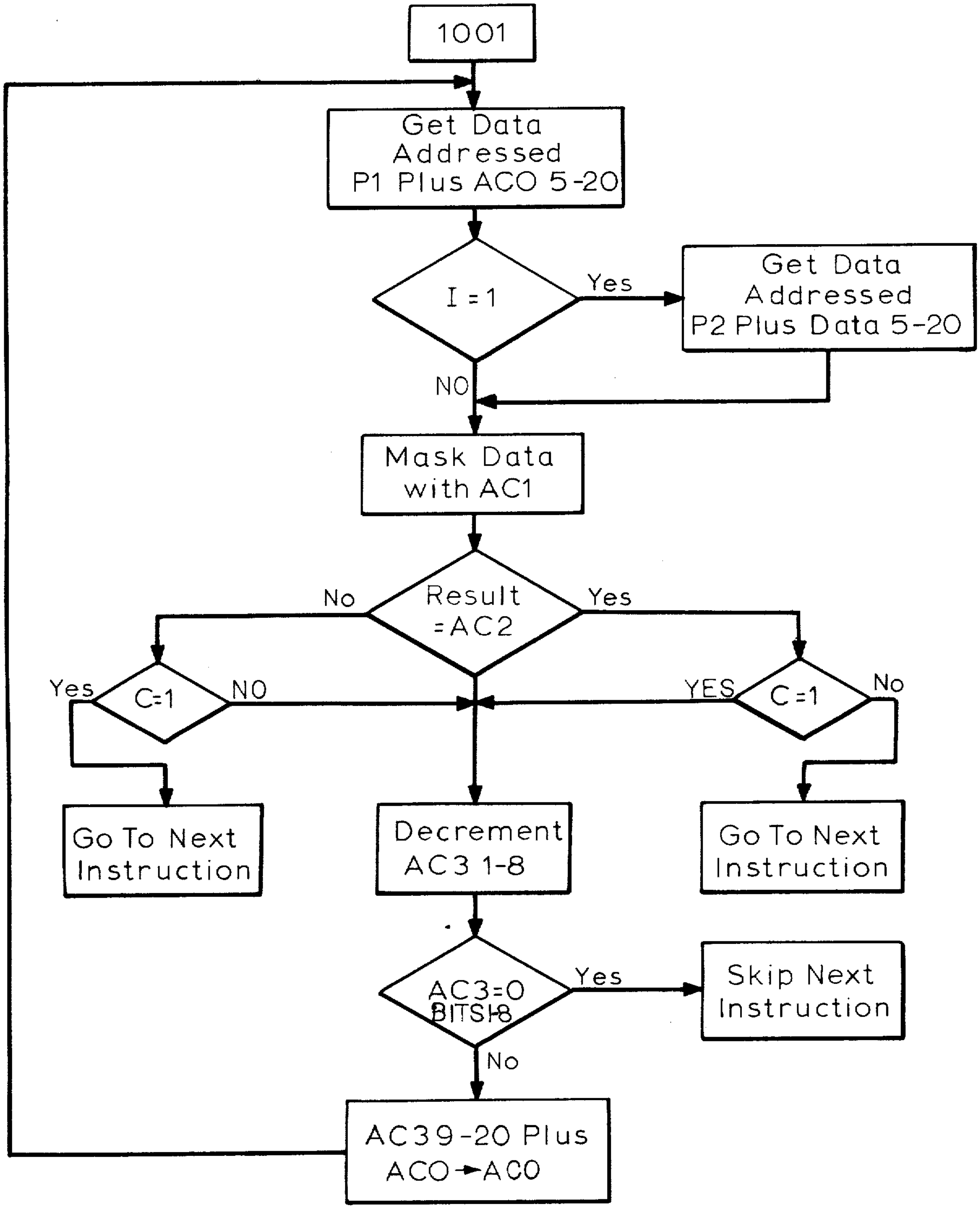
FIG. 2B is a flow chart representing the operation of the scan means of the present invention.

The operation of the scan means during the scan operational code cycle may best be understood by referring to the flow chart of FIG. 2B.

During the direct scan mode, the IR byte selector 11 takes the partial address specified in IR bits 9–12 (P1) and transfers this partial address to input B of the arithmetic logic unit. The partial 16 bit subsystem address of accumulator ACO is also transferred to input B of the arithmetic logic unit. This provides a composite subsystem address at output 22 which is transferred to the bus address register 17.

The bus address register then uses the composite address to address the subsystem having the composite subsystem address to cause it to transmit the data which it has stored therein. The transmitted data is received over DAI line 25 and is placed into input A of the arithmetic logic unit 15. If IR bit 5 (I) is equal to 0, the mask constant contained within accumulator AC1 is transferred to input B of the arithmetic logic unit wherein the transmitted data is masked with the mask constant for transforming the transmitted data into a data word having selected bits to be compared to the compare constant. This result is stored in the arithmetic logic register 18.

After the transmitted data is masked with the contents of accumulator AC1, the contents of accumulator AC2 is transmitted to the arithmetic logic unit. The contents of accumulator AC2 are the preselected bits of data which are to be located within the subsystems. The arithmetic logic unit then compares the masked data in the arithmetic logic register to the data obtained from accumulator AC2. If the comparison is successful, that is, if the masked data is identical to the data in accumulator AC2, and if IR bit 6 (C) is equal to 0, or the comparison was unsuccessful and if IR bit 6 (C) is equal to 1, the arithmetic logic unit will provide a first control signal which terminates the scan means and also initiates the control word generator to address the program memory to obtain the next operational code to be utilized by the central processor.

If neither of the above conditions are met, the arithmetic logic unit will provide a second control signal which causes the scan means to continue.

Accumulator AC3, bits 1–8 contains a cycle data word representing a predetermined number of scan cycles. Bits 1–8 of accumulator AC3 are decremented in response to the second control signal and the results of the decrement are transferred to the arithmetic logic unit wherein the arithmetic logic unit determines if the decrement resulted in the accumulator AC3 bits 1–8 having a 0 therein. If the contents of AC3 bits 1–8 are not 0, AC3 bits 9–20 are transferred to the arithmetic logic unit along with the contents of accumulator ACO (a 16 bit partial starting address) wherein they are added to provide an incremented composite address to be used for the next scan cycle. The operation of the scan means previously described continues until the contents of AC3 bits 1–8 are equal to 0 (indicating that the predetermined number of incremented composite addresses have been provided) or until one of the conditions for providing the first control signal is obtained.

If the contents of accumulator AC3 bits 1–8 is equal to 0 before a successful completion of the scan operation, the program address register will be incremented in order to pass over the next operational code.

The indirect scan mode requires the scan means to look to a subsystem to obtain an address word to derive a data obtaining composite subsystem address. As in the direct scan mode, the instruction register byte selector selects IR bits 9–12 (P1) which are transferred to input B of the arithmetic logic unit. The 16 bit partial subsystem address of accumulator ACO is transferred to input B of the arithmetic logic unit where it is combined with the partial subsystem address (P1) to provide an address word obtaining composite subsystem address which is transferred to the bus address register 17 from output 22 of the arithmetic logic unit. The address obtaining composite subsystem address is set out onto the bus by the bus address register to cause it to transmit the address word stored therein over the common data bus. The address word received over DAI line 25 is transferred to the arithmetic logic register via input A of the arithmetic logic unit 15. The instruction register byte selector then selects IR bits 13–16 (P2) which contains the other partial subsystem address within the operational code. These IR bits 13–16 (P2) are transferred to input B of the arithmetic logic unit along with bits 5–20 of the ALR. The resulting data obtaining composite subsystem address is transferred to the bus address register 17 from output 22 of the arithmetic logic unit. The data obtaining composite subsystem address is then sent out over the bus by the bus address register to cause the subsystem having that address to transmit its data stored therein over the common data bus and to be received by DAI line 25 and transferred to input A of the arithmetic logic unit. From this point on, the scan means operates in identical fashion as it operates during the direct scan mode. However, the incremented composite addresses for the sequential interrogation of the subsystems until a favorable comparison is made may be though of as incremented data obtaining composite subsystem addresses.

In order to aid in the further understanding of the operation of the scan means during the scan operational code sequence, reference may be made to the following glossary of terms and to the command sequence fro the scan operational code as shown in Table 2 in conjunction with the following detailed description of the operation of the scan means during the various bit times of the central processor.

| | |
|---|---|
| ACC | Accumulator Lead |
| AC | Accumulator |
| ACCA | Accumulator Address Selection |
| ACCB | |
| ACCC | |
| ACCSTR | |
| ACCAD | Address Input to Select Accumulator |
| ACCWR | Accumulator Write |
| ADDL | Add Literal OP-C |
| ADST1 | Accumulator Address Leads |
| ADST2 | |
| ADST4 | |
| ADST8 | |
| ALR | Arithmetic Logic Register |
| ALRCL | ALR clear |
| ALRLDA | Arithmetic Logic Register Load |
| ALRLDB | Control |
| ALRLDC | |
| ALRLD1 | Arithmetic Logic Register Byte |
| ALRLD2 | Load Leads |
| ALRLD3 | |
| ALRLD4 | |
| ALRLD5 | |
| ALRS1 | ALR Function Control Leads |
| ALRS2 | |
| ALUTHC | Carry Lead to Thousands Digit of ALU |
| ALUTC | Carry Lead to Tens Digit of ALU |
| ALU | Arithmetic Logic Unit |
| ALUA | Input A of ALU |
| ALUAA | |
| ALUAB | ALUA Data Selection Leads |
| ALUAST | |
| ALUA=B | Compare Output of ALU |
| ALUB | Input B of ALU |
| ALUBA | |
| ALUBB | ALUB Data Selection Leads |
| ALUBC | |
| ALUBST | |
| BAR | Buss Address Register |
| BARLD | Bus Address Register Load |
| BCS | False State While CP Waiting for BCU |
| BCUS | Bus Control Stobe for Data |
| BR | Branch OP-D |
| BT0 | Bit Time Counter Outputs |
| BT1 | |
| BT2–BT13 | |
| BRIND | Branch Indirect OP-E |
| BUSWT | Bit Wait |
| BYTE 1 | |
| BYTE 2 | ALR Byte Selection Leads |
| BYTE 3 | |
| BYTE 4 | |
| BYTE 5 | |
| BYTST | Byte Test OP-6 |
| BYSET | Byte Set OP-7 |
| COMP | Compare OP-1 |
| CPC | Central Processor Clock (Controlled) |
| CPUINT | CPU Interrupt |

-continued

| | |
|---|---|
| CV - S1 | |
| CV - S2 | ALU Function Control Leads |
| CV - S4 | |
| CV - S8 | |
| CV - M | |
| CVR - S1 | |
| CVR - S2 | |
| CVR - S4 | |
| CVR - S8 | ALU Function Control Leads |
| CVR - M | |
| CVR-CAR | Carry Logic for ALU |
| DAI01 – DAI20 | Data In Lines |
| DATA | Data Handling OP-8 |
| DDSA | |
| DDSB | |
| DDSC | Data Display Selection Leads |
| DDSST | |
| DLP | Data Display Lamp |
| DSELA | |
| DSELB | Data Selection Leads |
| DSELC | |
| EOI | End of Instruction |
| EOSC | End of Scan |
| FBR | Fault Buffer |
| FCT | Function Input to ALU |
| FETCH | Obtain Data from Program Memory |
| INTAC | Interrupt Acknowledge from CPU |
| INTRQJ | Interrupt Request Flip-Flop Q Side |
| IR | Instruction Register |
| IRA | IR Byte Selection Control |
| IRB | |
| IRDEC | IR Decrement |
| IRH=1 | IR Byte 3=1 |
| IR LOAD | Instruction Register Load |
| IRST | Enable Lead to IR Byte Selector Lead |
| IRX8 – IRX1 | IR Byte Selection Leads |
| JSR | Jump to Subroutine OP-0 |
| LOAD | Load OP-F |
| PAR | Program Address Register |
| PARCT | PAR Count |
| PARTHC | PAR Carry Into Thousands |
| PARLD | PAR Load |
| PAUSEJ | Q Output of PAUSE FF |
| PULUP | Logic 1 pull-up |
| MASK | Logical AND OP-2 |
| ROT | Rotate OP-θ |
| SCAN | Scan OP-9 |
| SCIN | Scan Inhibit |
| SC 13 | Scan OP-9 Bit Time 13 |
| SSACC | Store Selection Accumulator |
| SSALR | Store Selection ALR |
| SSALU | Store Selection ALU Output |
| SSALUA | Store Selection ALUA Input |
| SSALUB | Store Selection ALUB Input |
| SSBAR | Store Selection BAR |
| SSIR | Store Selection IR |
| SSPAR | Store Selection PAR |
| STIN | Start Data In Cycle |
| STINOT | Start In or Start Out |
| STOT | Start Data Out Cycle |
| SUPER | Superimpose OP-3 (Logical OR) |
| SYRST | System Reset |
| SYRT | Reset and Halt |

Table 2

| | | OP-9 Scan |
|---|---|---|
| BIT TIME | DATA TRANSFER | OPERATION |
| 0 | PAR → BAR | PAR → ALU A<br>REQ. STIN<br>SET FETCH<br>ALU → BAR<br>F(A) → FCT |
| 1 | DAI → IR<br>PAR + 1 → PAR<br>RESET FETCH ON BCUS | DAI → ALU A<br>ALU → IR (BCUS)<br>PAR + 1 → PAR(BCUS)<br>RESET FETCH (BCUS)<br>F(A) → FCT<br>0 → ACC ADR |
| 2 | ACO → ALR | ACO → ALU A<br>F(B) → FCT<br>ALU → ALR<br>0 → ACC ADR<br>BYTE3 → IRBYS |
| 3 | IF I = 1,<br>P1 PLUS ALR5-20 →<br>BAR<br>REQUEST STIN | IRX PLUS ALR5-20 → ALU B<br>IF I, REQ. STIN |

Table 2-continued

OP-9 Scan

| BIT TIME | DATA TRANSFER | OPERATION |
|---|---|---|
| 4 | ALR → ACO<br>IF I = 0,<br>GO TO BT4<br>IF I = 1,<br>DAI → ALR | IF I, ALU → BAR<br>IF I, ALR → ACO<br>DAI → ALU A |
| 5 | IF I = 0<br>GO TO BT5<br>REQUEST STIN<br>IF I = 0<br>P1 PLUS ALR5-20 →<br>BAR | IF I, ALU → ALR (BCUS)<br>IF PREVIOUS TO BCUS, F(A) →<br>FCT<br>IF AFTER BCUS<br>F(B) → FCT<br>IF I = 0, BYTE 3 → IRBYS<br>IF I = 1, BYTE 4 → IRBYS<br>0 → ACC ADR<br>REQ. STIN<br>IRX PLUS ALR5-20 → ALU B |
| 6 | ALR → ACO<br>IF I = 1,<br>P2 PLUS ALR5-20 →<br>BAR<br>DAI. AC1 → ALR | ALU → BAR<br>IF I = 0,<br>ALR → ACO<br>DAI → ALU A<br>AC1 → ALU B |
| 7<br>(400 NS) | RESET TO BT0 IF:<br>(ALR = AC2).(C = 0) or<br>(ALR ≠ AC2).(C = 1) | IF PREVIOUS TO BCUS,<br>1 → ACCADR<br>F(A.B) → FCT<br>IF AFTER BCUS,<br>2 → ACC ADR<br>F (A⊕B) → FCT<br>ALR → ALU A<br>AC2 → ALU B |
| 8 | AC3-01000 → ALR | IF (ALU A = B).(C = 0)<br>OR ($\overline{\text{ALU A = B}}$).(C = 1)<br>BT0 → BTC<br>F(A) → FCT<br>IF ($\overline{\text{ALU A = B}}$).(C = 0)<br>OR (ALU A = B).(C = 1)<br>F(A − B) → FCT<br>3 → ACC ADR ($\overline{\text{SCINH}}$)<br>AC3 → ALU A<br>01000 → ALU B<br>FORCE UNITS CARRY |
| 9 | ALR → AC3 | ALU → ALR<br>3 → ACC ADR |
| 10 | CLEAR ALR<br>AC3 → ALR(BYTES1&2) | ALR → AC3<br>F(A) → FCT<br>3 → ACC ADR<br>PULSE $\overline{\text{ALRCL}}$<br>AC3 → ALUA |
| 11 | IF AIR = 0<br>PAR + 1 → PAR<br>RESET BTC | ALU → ALR(BYTES1&2)<br>F(A) → FCT<br>ALR → ALU A |
| 12 | CLEAR ALR<br>AC3 → ALR<br>(BYTES3,4,5) | 3 → ACC ADR<br>F(A) → FCT<br>IF ALU A = B<br>PAR + 1 → PAR<br>BTO → BTC<br>PULSE $\overline{\text{ALRCL}}$<br>AC3 → ALU A |
| 13 | ALR PLUS ACO → ALR<br>IF I = 0<br>RESET TO BT5 | ALU → ALR (BYTES3,4,5)<br>F(A PLUS B) → FCT<br>0 → ACC ADR<br>ALR → ALU A<br>ACO → ALU B |
| | IF I = 1<br>RESET TO BT3 | ALU → ALR<br>F(B) → FCT<br>IF I = 0<br>BT5 → BTC<br>IF I = 1<br>BT3 → BTC |

SCAN DETAILED BIT TIME DESCRIPTION

At bit time 0 the program address contained in the program address register is loaded into the bus address register through the arithmetic logic unit. BAR bits 5–20 contain a program memory address whose contents will be read into the instruction register. This program address is the address of the scan operational code. A start bus input transfer is requested and the bit time counter is updated to BT1 while a bus wait signal is provided.

On bit time 1 the BTC is inhibited due to the bus wait signal. At this point in time the central processor is waiting for the operational code to be transferred from the program memory. The operational code over the DAI line 25 is fed to the ALU at input A. The DAI line will contain the contents of the address presented to the bus address register during bit time 0. The output of the ALU is taken to the instruction register and loaded into the instruction register. The instruction register will now contain the operational code from the program memory as addressed by the BAR. The bit time counter is advanced to BT2.

At bit time 2 the contents of accumulator ACO are directed to the input A of the ALU and are stored in the ALR. A 0 is placed in the accumulator address register and IR bits 9–12 (P1) are placed in the instruction register byte selector. The bit time counter is then advanced to BT3.

At bit time 3, if IR bit 5 (I) is equal to 0, the bit time counter is advanced to BT4. If I is equal to 1, the contents of the instruction register byte selector plus bits 5–20 of the ALR are placed onto input B of the ALU. A start in command is then requested. Data flows through the ALU and is stored into the bar to be placed onto the common data bus. The contents of the ALR are placed in accumulator ACO. The bit time counter is advanced to BT4.

At bit time 4, if I is equal to 0, IR bits 9–12 (P1) are placed in the instruction register byte selector and a 0 is placed in the accumulator address register. The bit time counter is advanced to BT5. If I is equal to 1, data is received from the bus via the DAI line 25 at input A of the ALU. The ALU output is stored in the ALR. IR bits 13–16 (P2) are placed in the instruction register byte selector and 0 in the accumulator address register. The bit time counter is then advanced to BT5.

At bit time 5 a start in command is requested. The contents of the instruction register byte selector plus bits 5–20 of the ALR are placed into input B of the ALU. For I=0, the contents of the instruction register byte selector will be P1, and for I=1, the contents will be P2. Data flows through the ALU and is stored in the BAR to be placed on the bus. If I is equal to 0, the contents of the ALR are placed into an accumulator ACO. The bit time counter is advanced to BT6.

At BT 6 the data on the DAI line 25 from the bus is placed on input A of the ALU and the contents of accumulator AC1 (i.e., the mask constant) on input B of the ALU. The two inputs A and B are masked and the result is stored in the ALR. A 1 is placed in the accumulator address register if BCUS has not occurred; a 2 is placed in the accumulator address register if BCUS has occurred. The bit time counter is advanced to BT7.

Bit time 7 lasts for 400 n.s. The contents of the ALR (i.e., the result of the mask operation) are placed on input A and the contents of accumulator AC2 (i.e., the compare constant) are placed on input B of the ALU. The contents of inputs A and B of the ALU are compared. The bit time counter is reset to BTO if the contents of input A are equal to the contents of input B and if IR bit 6 (C) is equal to 0 or if the contents of input A are not equal to the contents of input B of the ALU and if IR bit 6 (C) is equal to 1. If these conditions are not met, a 3 is placed in the accumulator address register and the bit time counter is advanced to BT8.

At bit time 8 the contents of AC3 are placed in input A of the ALU and a constant, 01000, is placed at input B of he ALU. In order to decrement bits 1–8 of AC3 by 1, the contents of input B of the ALU are subtracted from the contents of input A of he ALU. The result is placed in the ALR. A 3 is placed in the accumulator address register. The bit time counter is advanced to BT9.

At BT9, the contents of the ALR are placed into accumulator AC3 and a 3 is placed in the accumulator address register. The bit time counter is then advanced to bit time 10.

At bit time 10, the ALR is cleared. The contents of accumulator AC3 are placed into input A of the ALU. The ALU output bits 1–8 are stored in the ALR. The bit time counter is advanced to BT11.

Bit time 11 lasts for 400 n.s. The contents of the ALR are placed on input A of the ALU. If input A is equal to 0, the PAR is incremented by one and the bit time counter is reset to bit time 0. If input A is not equal to 0, a 3 is placed in the accumulator address register. The bit time counter is then advanced to BT12.

At BT12, the ALR is cleared. Bits 9–12 of accumulator AC3 are stored in the ALR via input A of the ALU. A 0 is placed in the accumulator address register. The bit time counter is advanced to BT13.

At BT13 the contents of the ALR are placed into input A of the ALU and the contents of accumulator ACO are placed into input B of the ALU. Input A and input B are added and the sum stored in the ALR. This gives a new starting address to continue the scan. If I is equal to one, the bit time counter is reset to BT3. If I is equal to zero, the bit time counter is reset to BT5.

FIGS. 3–41 are detailed schematic representations of the central processor of FIG. 1 which embodies the scan means of the present invention. The circuits thereshown are comprised of standard 7400 series of circuits which are well known in the art. As is well known, this series of devices are readily commercially available and information as to their individual circuit configurations are readily obtainable. Each of the individual logic blocks in the drawings has a mnemonic thereon which indicates the particular type of 7400 device. The table below gives each mnemonic representation with its equivalent 7400 series number and a brief description of the type of circuit.

| MNEMONIC | 7400 EQUIV. | DESCRIPTION |
|---|---|---|
| ND1 | 7400 | QUAD 2-NAND |
| ND2 | 7401 | QUAD 2-NAND (OC) |
| NR1 | 7402 | QUAD 2-NOR |
| INV1 | 7404 | HEX INVERTER |
| INV2 | 7405 | HEX INVERTER (OC) |
| IBD1 | 7406 | HEX INVERTER BUFFER (OC) |
| BD1 | 7407 | HEX BUFFER |
| AND1 | 7408 | QUAD 2-AND |
| SMTR1 | 7413 | DUAL 4-NAND (SCHMITT TRIGGER) |
| ND3 | 7420 | DUAL 4-NAND |
| ND4 | 7430 | 8-NAND |
| ND5 | 7438 | QUAD 2-NAND BUFFER (OC) |
| ND6 | 7440 | DUAL 4-NAND BUFFER |
| AO11 | 7451 | DUAL 2×2 AND/OR/INVERT |
| AO12 | 7454 | 4×2 AND/OR/INVERT |
| FF1 | 7474 | DUAL D FLIP-FLOP |
| LTCH1 | 7475 | DUAL 2-BIT LATCH |
| FF2 | 7476 | DUAL JK FLIP-FLOP |
| XOR1 | 7486 | QUAD 2-EXCLUSIVE-OR |
| MEM1 | 7489 | 16×4 RAM |
| CTR1 | 7493 | 1+3 BIT COUNTER |
| SHFT3 | 7496 | 5-BIT SHIFT REG. |
| LTCH2 | 74100 | DUAL4-BIT LATCH |
| MONO1 | 74121 | MONOSTABLE |
| MONO2 | 74123 | DUAL RETRIGGERABLE MONO |
| MX3 | 74150 | 16 → 1 MULTIPLEXER |
| MX1 | 74153 | DUAL 4 → 1 MULTIPLEXER |
| DEC1 | 74154 | 1/16 DECODER |
| DEC2 | 74155 | ⅛ or DUAL ¼ DECODER |
| MX2 | 74157 | QUAD 2 → 1 MULTIPLEXER |
| SHFT4 | 74164 | 8 BIT SHIFT REG. |
| ALU1 | 74181 | 4-BIT ARITHMETIC & LOGIC UNIT |
| CTR2 | 74193 | 4-BIT UP/DOWN COUNTER |
| SHFT2 | 74198 | 8-BIT SHIFT REG. |

Each input and output lead as shown on FIGS. 3–41 is labeled with the type of signal placed thereon in abbreviated form and reference to the glossary of terms will provide a brief definition of the various abbreviations utilized in the figures. Also, each such lead is also labeled with a figure number indicating to which circuit the particular lead is to be connected to.

Figure 3:
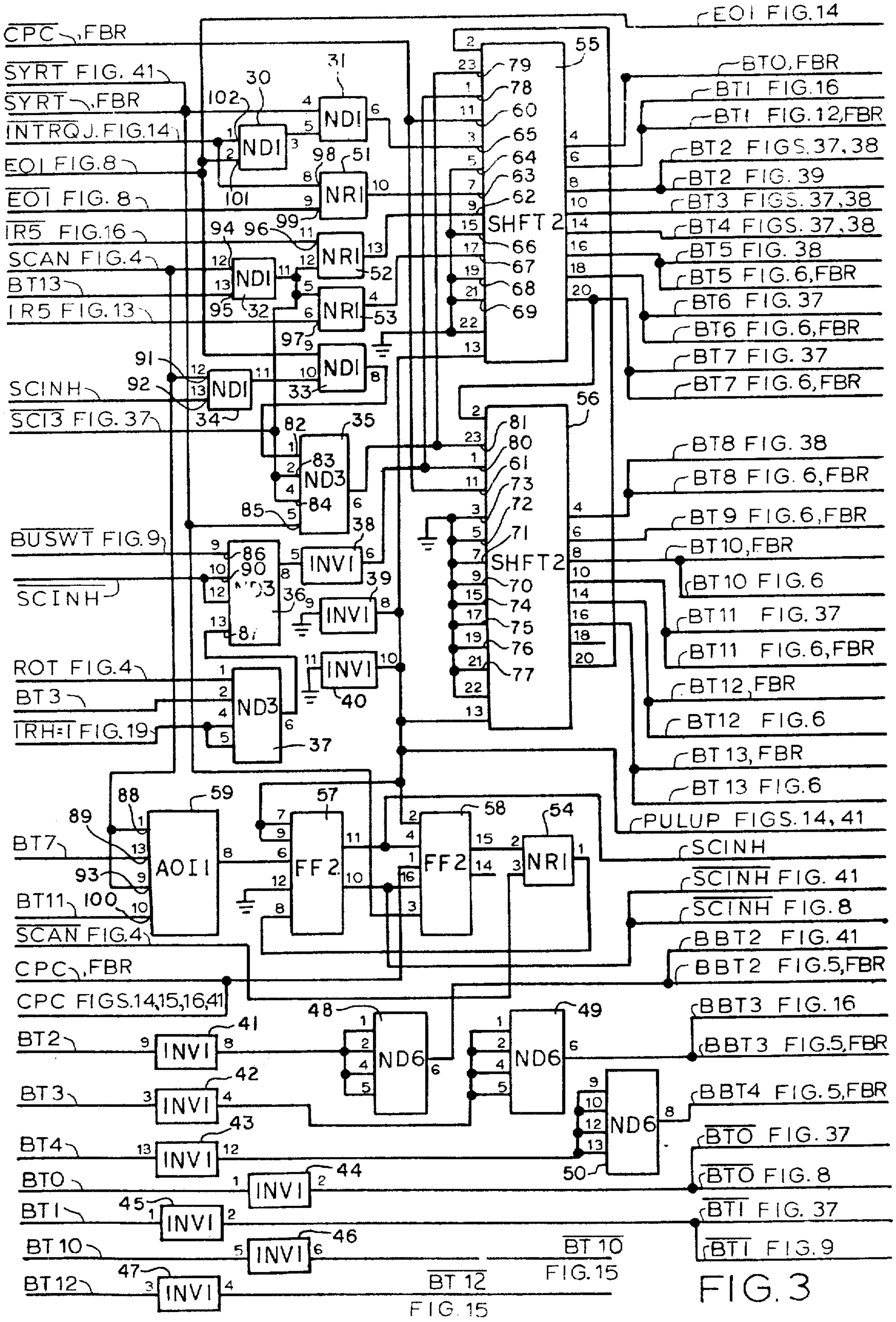
FIG. 3 is a detailed schematic diagram of the bit time counter of the central processor of FIG. 1.

Referring specifically to FIG. 3, FIG. 3 shows a detailed schematic diagram of the bit time counter of the central processor of FIG. 1 which embodies the scan means of the present invention. It comprises 7400 QUAD 2-NAND gates 30–34, 7420 DUAL 4-NAND gates 35–37, 7404 HEX INVERTERS 38–47, 7440 DUAL 4-NAND buffer gates 48–50, 7402 QUAD 2-NOR gates 51–54, 74198 8-bit shift registers 55 and 56, 7476 DUAL JK FLIP-FLOPS 57 and 58, and a 7451 DUAL 2×2 AND/OR/INVERTER 59.

The bit time counter of FIG. 3 is a 16 bit shift register with shift registers 55 and 56 operating in series. The bit time counter sequences the central processor scan means through the scan operational code by producing at output leads BT1–BT13 initializing pulses to initialize the logic control circuits of the scan means. These initializing pulses are produced in response to the $\overline{SCAN}$. SCAN is true high and $\overline{SCAN}$ is true low.

The bit time counter is driven on its clock inputs 60 and 61 with central processor clock pulses at lead $\overline{CPC}$ and may be considered to be a free running counter. However, logic level inputs 62–77 along with control function inputs 78–81 provide for parallel loading, shifting down or inhibiting the bit time counter as required for the processor operation scan code. The bit time counter input functions include bus wait (BUSWT), system reset (SYRT), rotate operational code, scan operational code, interrupt (INTRQJ), and end of instruction (EOI).

For the bus wait function, during bit time 1 of each operational code, including the scan operational code, the central processor must wait until a data transfer has been completed. Because the length of time required to perform a data transfer is longer than one CPC period (200 n.s.), the bit time counter is inhibited until the data transfer has been completed. Input 82 of NAND gate 35 will be high due to EOI (end of instruction) being low. Inputs 83 and 84 will be high due to $\overline{SC13}$ being high. Input 85 will be high due to $\overline{SYRT}$ (system reset) being high. Therefore, control function inputs 79, 81 will be low. Control function inputs 78, 80 will be low due to $\overline{BUSWT}$ at input 86 of NAND gate 36 being low. Control function inputs 78, 79, 80 and 81 by all being low will inhibit the advance of the bit time counter. As soon as the data transfer is complete, $\overline{BUSWT}$ goes high allowing control function inputs 78, 80, to go high. The next central processor clock pulse advances the bit time counter to BT2.

In performing a reset function, during a system reset, $\overline{SYRT}$ is forced low. Input 65 of shift register 55 will be high. A low on input 85 of NAND gate 35 forces control function inputs 79, 81 high. Control function inputs 78, 80 is forced high due to all inputs of NAND gate 36 being high. $\overline{SYRT}$ being low forces $\overline{BUSWT}$ and $\overline{SCINH}$ to go high during system reset. Input 87 of NAND gate 36 is forced high due to the fact that the down counter of FIG. 19 will eventually reach count one. Control function inputs 78, 79, 80, and 81 all being high allow the shift register to parallel load the data on input 65 to load BTO. The bit time counter is now at bit time O.

For the scan operation during certain portions of the scan operational code it is necessary to inhibit the bit time counter or force it to a new bit time (other than normal advancements). Bit time 7 is extended to 400 n.s. by inhibiting the bit time counter. At the beginning of bit time 7 control function inputs 78, 80 are high due to all the inputs to NAND gate 36 being high. Control function inputs 79, 81 are low due to all inputs of NAND gate 35 being high. Flip-flop 57 will be set due to inputs 88 and 89 of DUAL AND/OR/INVERTER 59 being high. Control function inputs 78, 80 to low due to SCINH at input 90 of NAND gate 36 being low. Control function inputs 79, 81 are maintained low due to inputs 91 and 92 of NAND gate 34 being high. The bit time counter is now inhibited from advancing to the next bit time. Flip-flop 58 will now set on the next central processing clock pulse. The output of NOR gate 54 goes low and clears flip-flop 57. Control function inputs 80, 78 now go high due to $\overline{SCINH}$ going high. Flip-flop 58 resets on the next central processor clock pulse. The bit time counter will now advance to the next bit time on the next central processor clock pulse. In this manner bit time 7 was extended to 400 n.s.

Bit time 11 is extended to 400 n.s. in a similar manner by inputs 93 and 100 of the DUAL AND/OR/INVERTER 59. During bit time 13 of the scan operational code a decision must be made. If IR bit 5 is equal to one, the bit time couner shoudl be set to bit time 3. If IR bit 5 is not equal to one, the bit time counter must be set to BT5. Control function inputs 78, 80 will be high due to all inputs of NAND gate 36 being high. Control function inputs 79 and 81 will be high due to inputs 94 and 95 of NAND gate 32 being high. If IR 5 is equal to 1, input 96 of NOR gate 52 is low, thus input 62 of shift register 55 is high. The bit time counter will be set to bit time 3 on the next central processor clock pulse. If IR 5 is equal to 0, input 97 of NOR gate 53 will be low, thus input 67 of shift register 55 will be high. The bit time counter will then set to BT5 on the next central processor clock pulse.

When an interrupt occurs the bit time counter is not affected until the end of instruction (EOI) is reached. If at the end of an instruction $\overline{INTRQJ}$ is low, input 63 of shift register 55 goes high due to inputs 98 and 99 of NOR gate 51 being low. Control function input 79 and 81 will both be high due to input 82 of NAND gate 35 being low and all inputs of NAND gate 36 being high. The bit time counter is set to BT2 on the next central processor clock pulse.

Each operational code, and for that matter the scan operational code, utilizes a certain number of bit times. Regardless of the number of bit times associated with each operational code, EOI goes high during the final bit time. Input 65 of shift register 55 goes high due to input 101 of NAND gate 30 going high (input 102 is normally high). Control function inputs 78, 80 are high due to input 82 of NAND gate 35 being low. The bit time counter is set to BT0 on the next central processor clock pulse. Note, if $\overline{INTRQJ}$ is low at the end of an instruction the bit time counter will be set to BT2 on CPC.

Bit time BT2, BT3 and BT4 are buffered to provide more drive for central processor control function. For example, BT2 is buffered by inverter 41 and NAND gate 48 to provide BBT2.

Bit times BT0, BT1, BT10, and BT12 are inverted by inverters 44, 45, 46 and 47 respectively thus providing true logic 0 levels for use with central processor control function.

Figure 4:
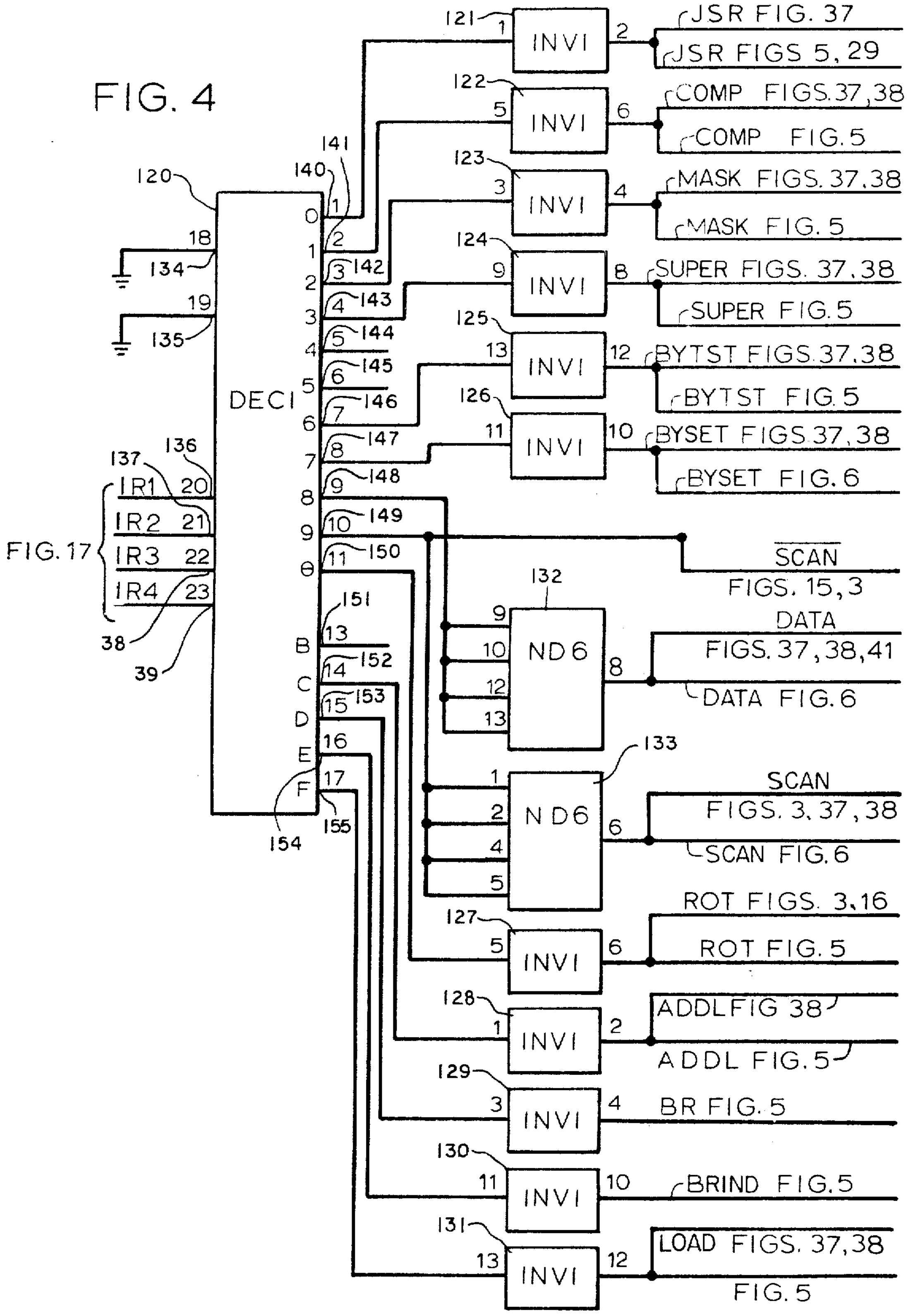
FIGS. 4–16 are detailed schematic diagrams of the control word generator of the central processor of FIG. 1.

FIGS. 4–16 and FIGS. 37–40 show detailed schematic circuit diagrams of the control word generator of FIG. 1. Referring specifically to FIG. 4, for the moment, the portion of the control word generator thereshown is the operational code decoder.

The operational code decoder comprises a 74154 1/16 decoder 120, 7404 HEX inverters 121–131, and 7440 DUAL 4-NAND buffer gates 132 and 133 all interconnected as shown in FIG. 4.

The function of the operational code decoder is to decode instruction levels which are representative of the current operational code. Function control inputs 134 and 135 of decoder 120 are permanently low, thus the hexidecimal input on leads 136, 137, 138 and 139 is decoded and appears as a low logic level on the respective output lead 140–155. The corresponding hexadecimal output is shown adjacent to each of the leads 140–155. For example, a hexadecimal input equal to 9 would be represented as a low logic level on output 149 indicating the scan operational code. All other outputs would remain high. Outputs 144, 145 and 151 are not used. Inverters 121–131 and buffer gates 132 and 133 invert the decoder output providing true high logic levels for use in the central processor scan means.

As previously mentioned, in the above example, for the scan operational code, IR bits 1–4 are 1001 and the circuit of FIG. 4 at leads $\overline{\text{SCAN}}$ and SCAN produces true low and true high signals respectively evidencing the scan operational code. These signals are produced at output 149 of decoder 120 and the outputs of NAND gate 133. The outputs of NAND gate 133 are used by the control word generator for providing the function control signals.

Figure 5:
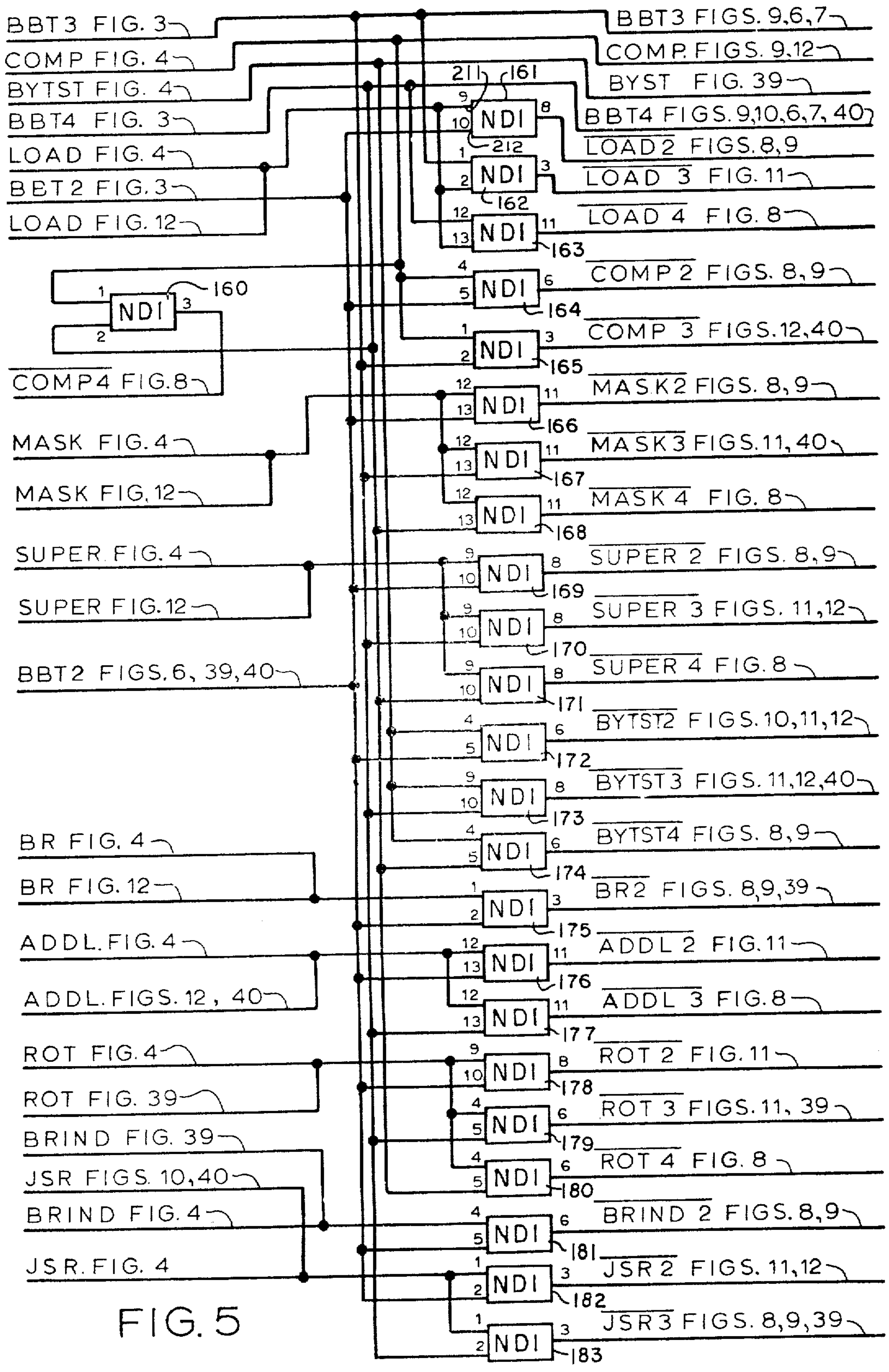
Figure 6:
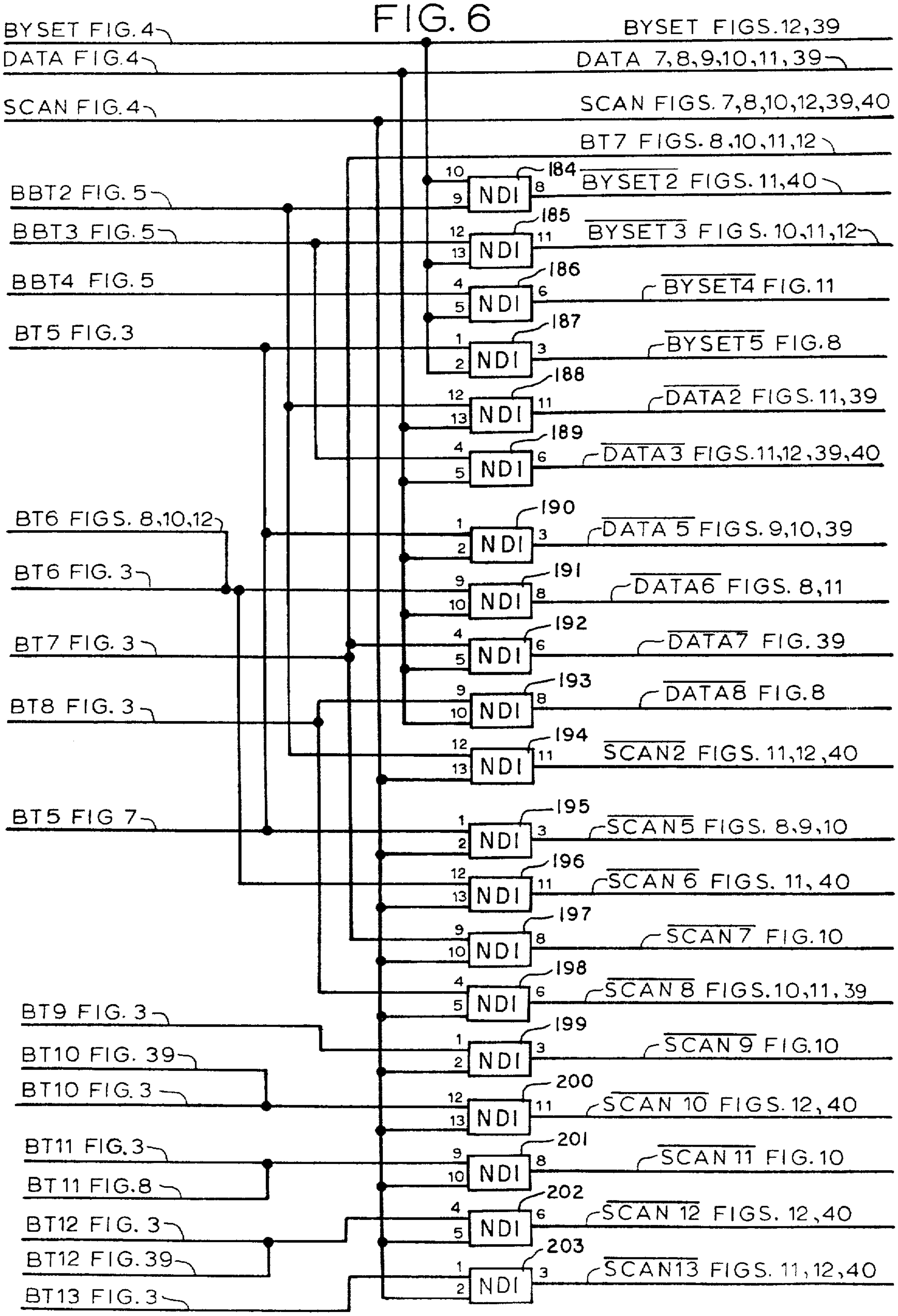
Figure 7:
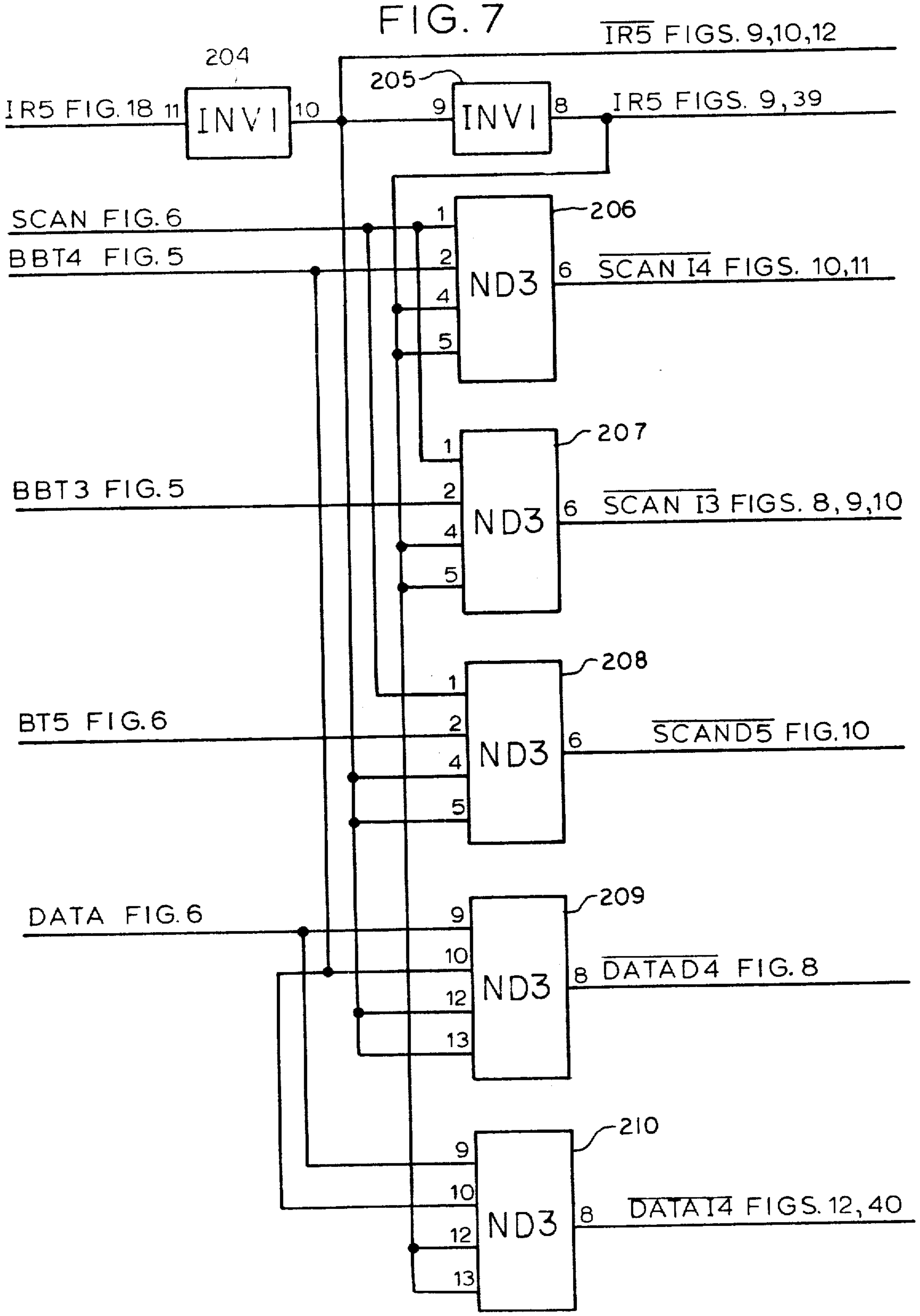

Referring now to FIGS. 5, 6 and 7, the portion of the control word generator thereshown is the bit time decoding circuitry. The circuit portion of FIG. 5 comprises 7400 QUAD 2-NAND gates 160–183 interconnected as shown. The circuit of FIG. 6 comprises 7400 QUAD 2-NAND gates 184–203. The circuit of FIG. 7 comprises 7404 hex inverters 204 and 205, and 7420 dual 4-NAND gates 206–210.

The function of the operational code bit time decoding circuit is to provide a series of logic levels which are a direct function of a particular operational code and bit time combination. The outputs of NAND gates 161–203 are true low logic levels. For the scan operational code, NAND gates 194–203 of FIG. 6 are used. These NAND gates provide output signals during the scan operational code so that the following logic will know where it is during the scan operational code and what to do next. They produce their true low output signals responsive to the operational code detector and the bit time signals of the bit time counter.

The circuit of FIG. 7 detemines whether the scan means is in the direct or indirect scan mode. NAND gates 206 through 208 are used for this purpose. Their outputs provide $\overline{\text{SCANI4}}$, $\overline{\text{SCANI3}}$, $\overline{\text{SCAND5}}$ true low signals responsive to IR bit 5 and a scan operational code detection and the bit time. For example, NAND gate 206 will provide $\overline{\text{SCANI4}}$ (scan indirect BT4) when the processor is in the scan operational code at BT4 and in the indirect mode (IR 5=1).

Figure 8:
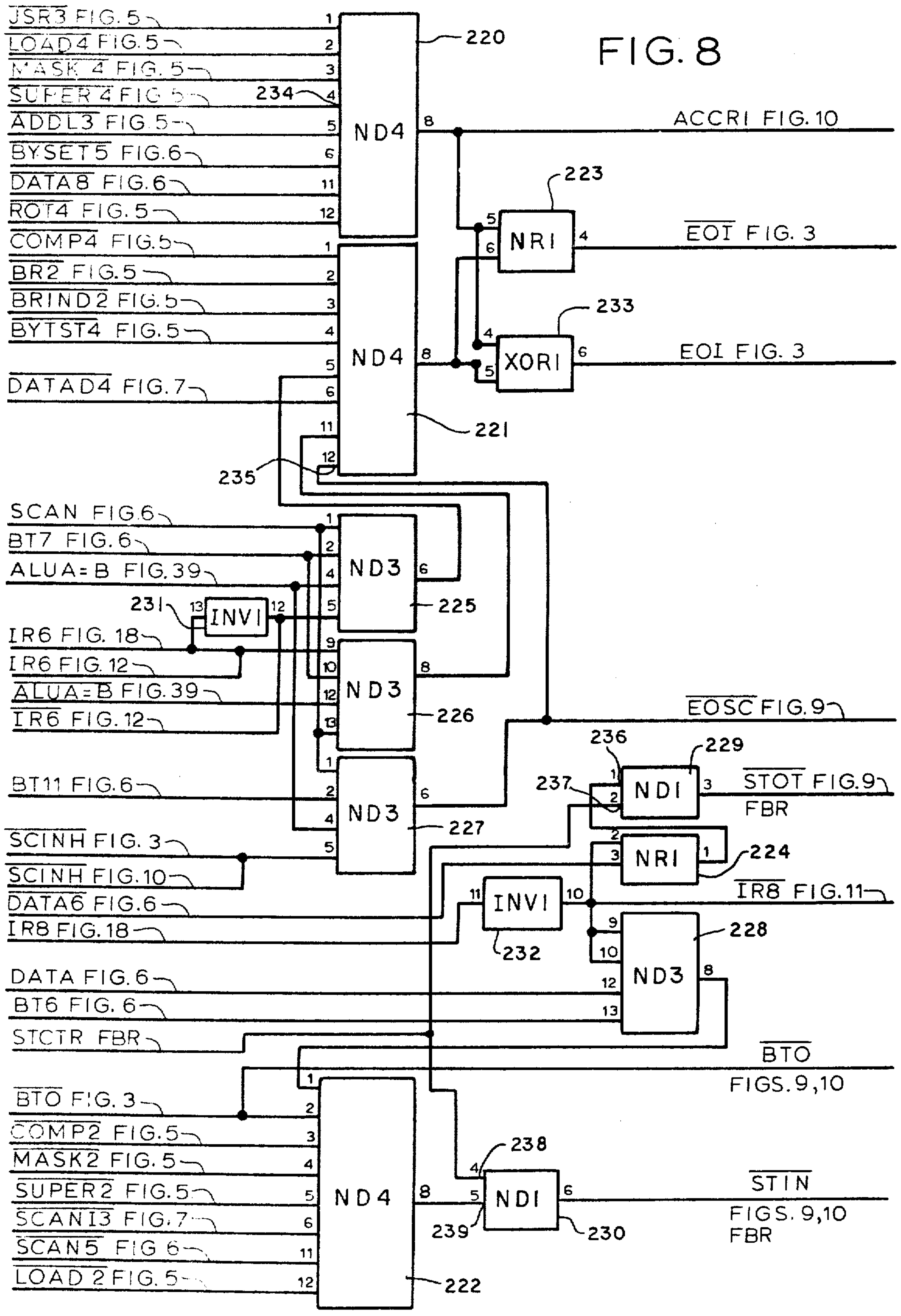

Referring now to FIG. 8, the circuit thereshown is the portion of the control word generator which generates the ACCR1, EOI, STIN, STOT functions. It comprises 7430 8-NAND gates 220, 221 and 222, 7402 QUAD 2-NOR gates 223 and 224, 7420 DUAL 4-NAND gates 225–228, 7400 quad 2-NAND gates 229 and

230, 7404 hex inverters 231 and 232, and a 7486 quad 2-exclusive OR gate 233.

The end of instruction command is true ($\overline{\text{EOI}}$ low and EOI high) when any one input to NAND gates 220 or 221 go low. For example, input 235 of NAND gate 221 goes low as a function of SCAN . BT11 . ALU=B . $\overline{\text{SCINH}}$.

As previously mentioned, the down counter of accumulator AC3 is decremented at the termination of each unsuccessful scan cycle. When this down counter has been decremented a predetermined number of times without successfully locating the predetermined bits of data, the program address register is incremented so that it will skip the next instruction. This is accomplished by NAND gate 227 which is responsive to SCAN, BT11, ALUA=B and $\overline{\text{SCINH}}$. During the scan cycle in bit time 11 the down counter is checked by comparing its contents within the ALU. If ALUA=B is true there is an indication that the total number of permissible scan cycles have been completed without successfully locating the particular bits of data looked for. If this situation occurrs, NAND gate 227 produces an $\overline{\text{EOSC}}$ signal which is utilized for incrementing the program address register. NAND gates 222 and 238 are used to request the start of a bus cycle during the scan operation.

Figure 9:
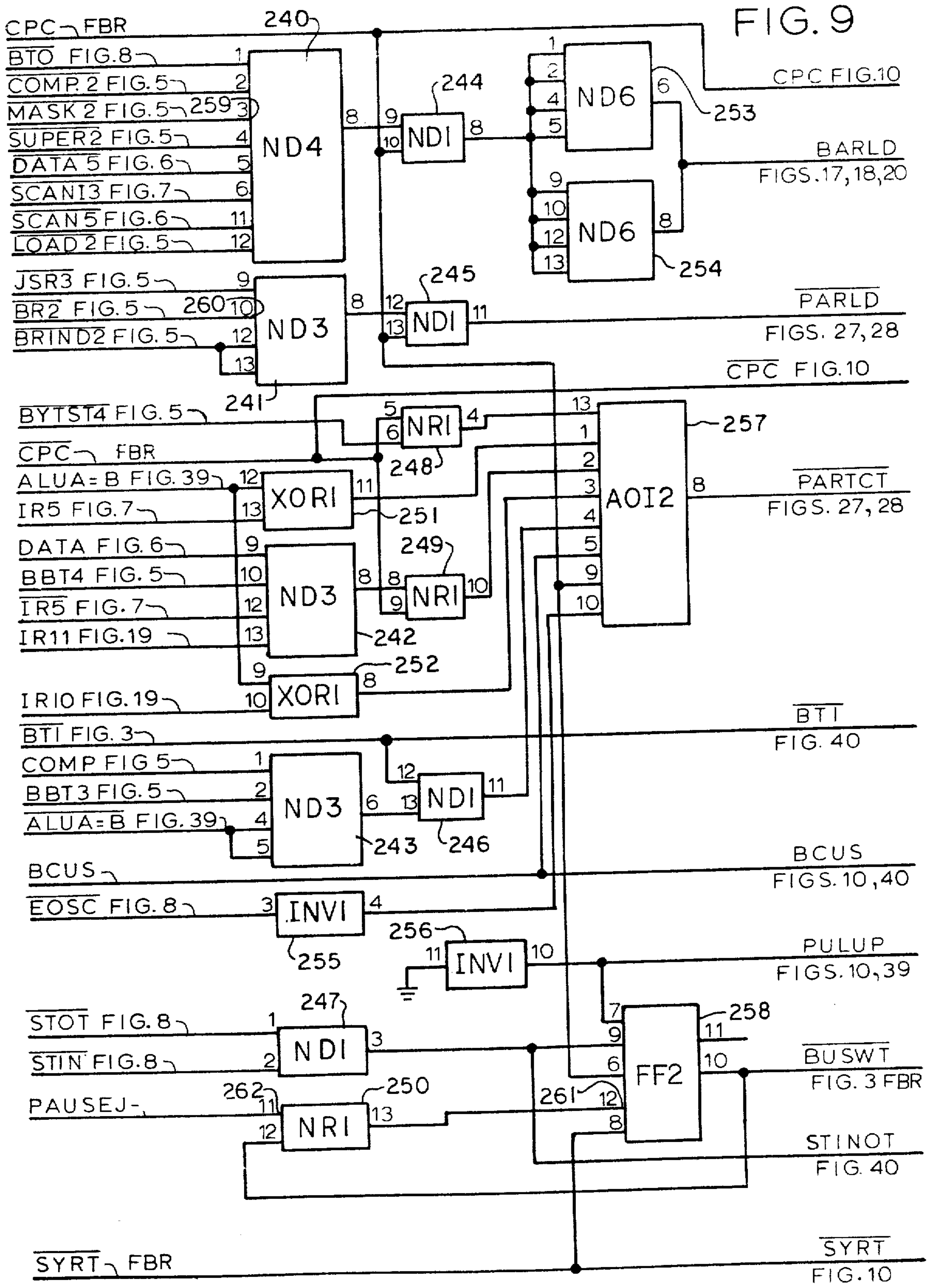

FIG. 9 shows the detailed schematic diagram of that portion of the control word generator which generates the function BARLD, PARLD, PARCT, BCUS, BUSWT and STINOT. The circuit of FIG. 9 comprises a 7430 8-NAND gate 240, 7420 DUAL 4-NAND gates 241, 242 and 243, 7400 QUAD 2-NAND gates 244–247, 7402 QUAD 2-NOR gates 248, 249 and 250, 7486 QUAD 2-EXCLUSIVE OR gates 251 and 252, 7440 DUAL 4-NAND BUFFER gates 253 and 254, 7404 HEX INVERTERS 255 and 256, 7454 4×2 AND-/OR/INVERTER gate 257 and a 7476 DUAL JK FLIP-FLOP 258.

$\overline{\text{PARCT}}$ is used to ultimately increment the program address register if a scan cycle is not successful and the total number of allowable scans have been completed. $\overline{\text{PARCT}}$ also increments the program address register for the following conditions.

| | | | | | | |
|---|---|---|---|---|---|---|
| BYTST4 | | ALUA=B | $\overline{\text{IR5}}$ | CPC | | |
| BYTST4 | | $\overline{\text{ALUA=B}}$ | IR5 | CPC | | |
| DATA | BBT4 | $\overline{\text{IR5}}$ | IR11 | ALUA=B | $\overline{\text{IR10}}$ | CPC |
| DATA | BBT4 | $\overline{\text{IR5}}$ | IR11 | $\overline{\text{ALUA=B}}$ | IR10 | CPC |
| BT1 | BCUS | | | | | |
| COMP | BBT3 | $\overline{\text{ALUA=B}}$ | BCUS | | | |
| EOSC | CPC | | | | | |

As previously mentioned, during the scan operational code cycle it is necessary to inhibit the bit time counter until a data transfer has been completed. This is accomplished by generating the $\overline{\text{BUSWT}}$. $\overline{\text{BUSWT}}$ going low and providing the bus wait signal is a function of setting the flip-flop 258. Logic functions required to set flip-flop 258 include STIN . CPC or STOT . CPC (STIN and STOT are both data transfer functions). The K input 261 of flip-flop 258 is kept low by input 262 of NOR gate 250 being high in response to PAUSEJ. PAUSEJ goes low as soon as a data transfer is completed. PAUSEJ being low along with $\overline{\text{BUSWT}}$ at a low causes flip-flop 258 to reset on CPC. $\overline{\text{BUSWT}}$ now goes high allowing the bit time counter to advance to the next bit time.

Figure 10:
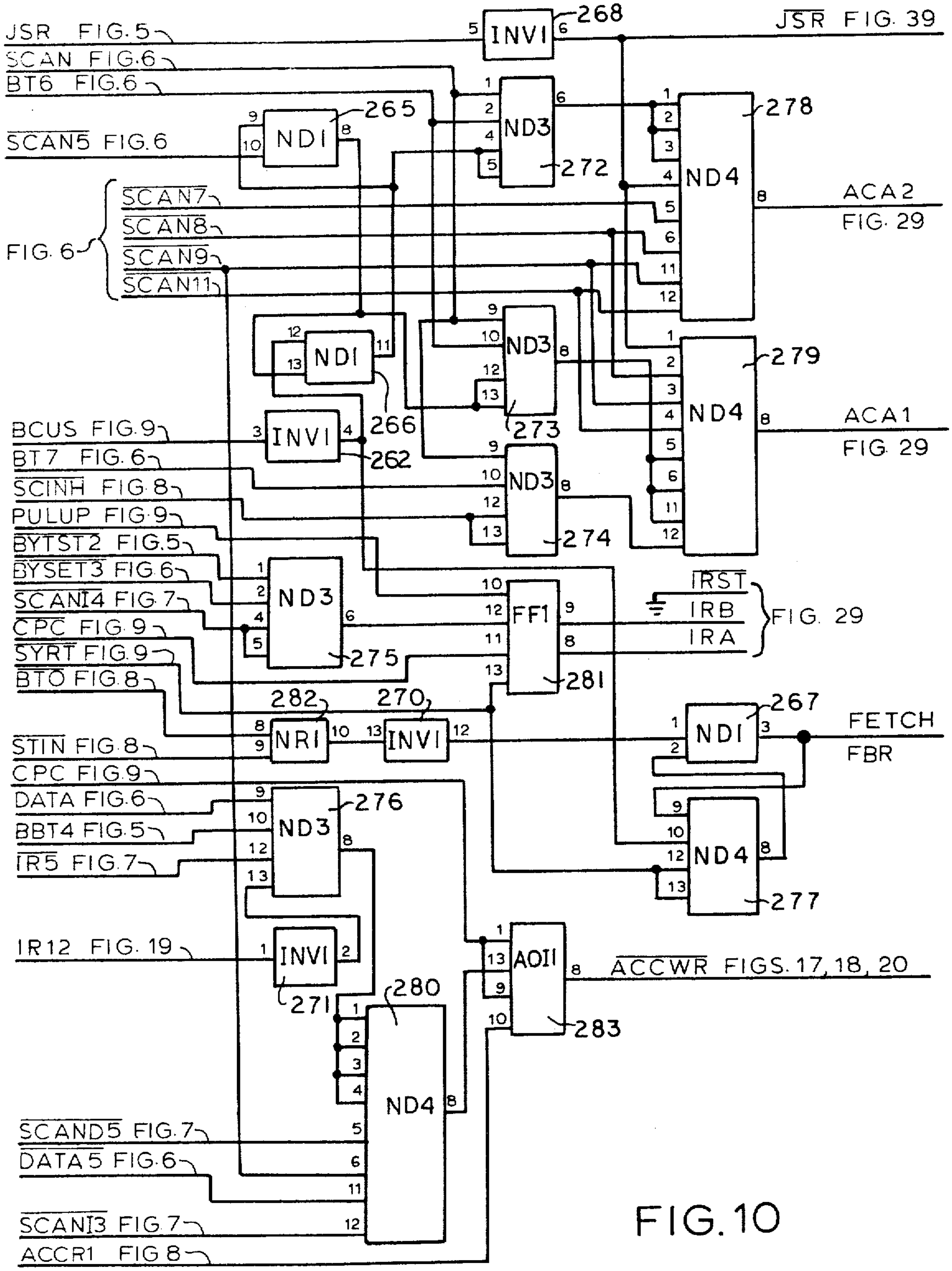

Referring now to FIG. 10, the circuit thereshown is a portion of the control word generator which initiates the functions ACA2, ACA1, IRA, IRB, FETCH and ACCWR. The circuit of FIG. 10 comprises 7400 QUAD 2-NAND gates 265, 266 and 267, 7404 HEX INVERTERS 268–271, 7420 DUAL 4-NAND gates 272–277, 7430 8-NAND gates 278, 279 and 280, a 7474 DUAL D FLIP-FLOP 281, a 7402 QUAD 2-NOR gate 282 and a 7451 DUAL 2×2 AND/OR/INVERTER 283.

ACA2 and ACA1 are used when determining the address of a particular accumulator. They provide addressing information for the accumulator address register for addressing specific accumulators. As previously mentioned, accumulators AC0–AC3 are utilized and it is the ACA2 and the ACA1 signals which are utilized by the accumulator address register for addressing one or all of these accumulators.

$\overline{\text{ACCWR}}$ is used to provide pulses to load data into he accumulators. For instance, it is recalled that a constant is added to the partial subsystem address stored in accumulator AC0 for providing an incremented composite subsystem address. $\overline{\text{ACCWR}}$ enables the loading of the incremented composite address into accumulator AC0 after the addition has been performed by the arithmetic logic unit and the result stored in the arithmetic logic register. This occurs when SCAN13 . CPC are present. $\overline{\text{ACCWR}}$ also causes loading of information into the accumulators during bit time 5 of the scan direct mode or during bit time 9 of either mode.

Figure 11:
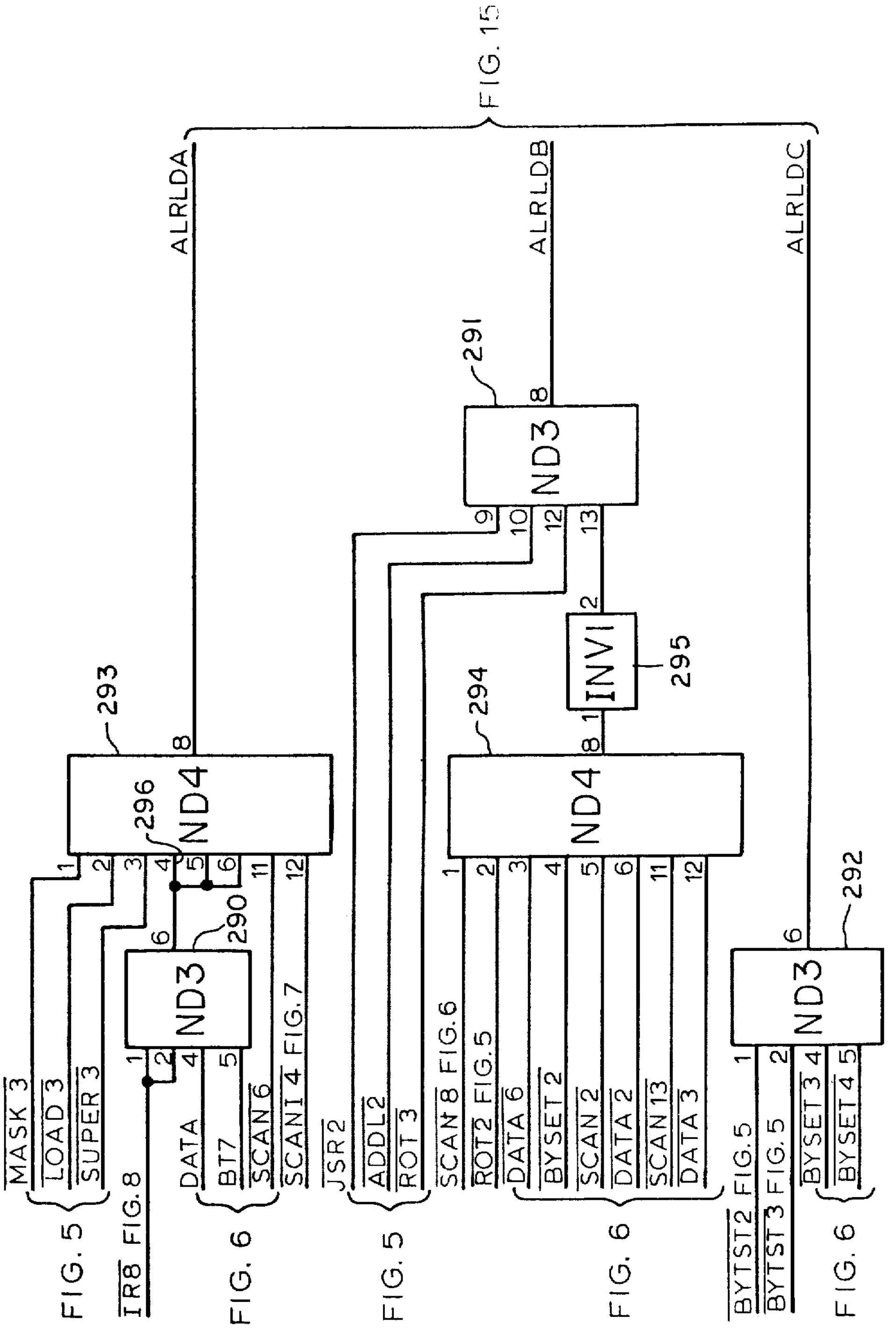

Referring now to FIG. 11, the circuit thereshown is the portion of the control word generator which generates the arithmetic logic register functions. It comprises 7420 DUAL 4-NAND gates 290, 291 and 292, 7430 8-NAND gates 293 and 294 and a 7404 HEX INVERTER 295.

This circuit provides arithmetic logic register loading signals ALRLDA, ALRLDB, and ALRLDC when it is necessary to load information into the arithmetic logic register. As can be seen from the Figure, the arithmetic logic register will be loaded during the scan operation when $\overline{\text{SCAN6}}$, $\overline{\text{SCAN14}}$, $\overline{\text{SCAN8}}$, $\overline{\text{SCAN2}}$, and $\overline{\text{SCAN13}}$ are low.

Figure 12:
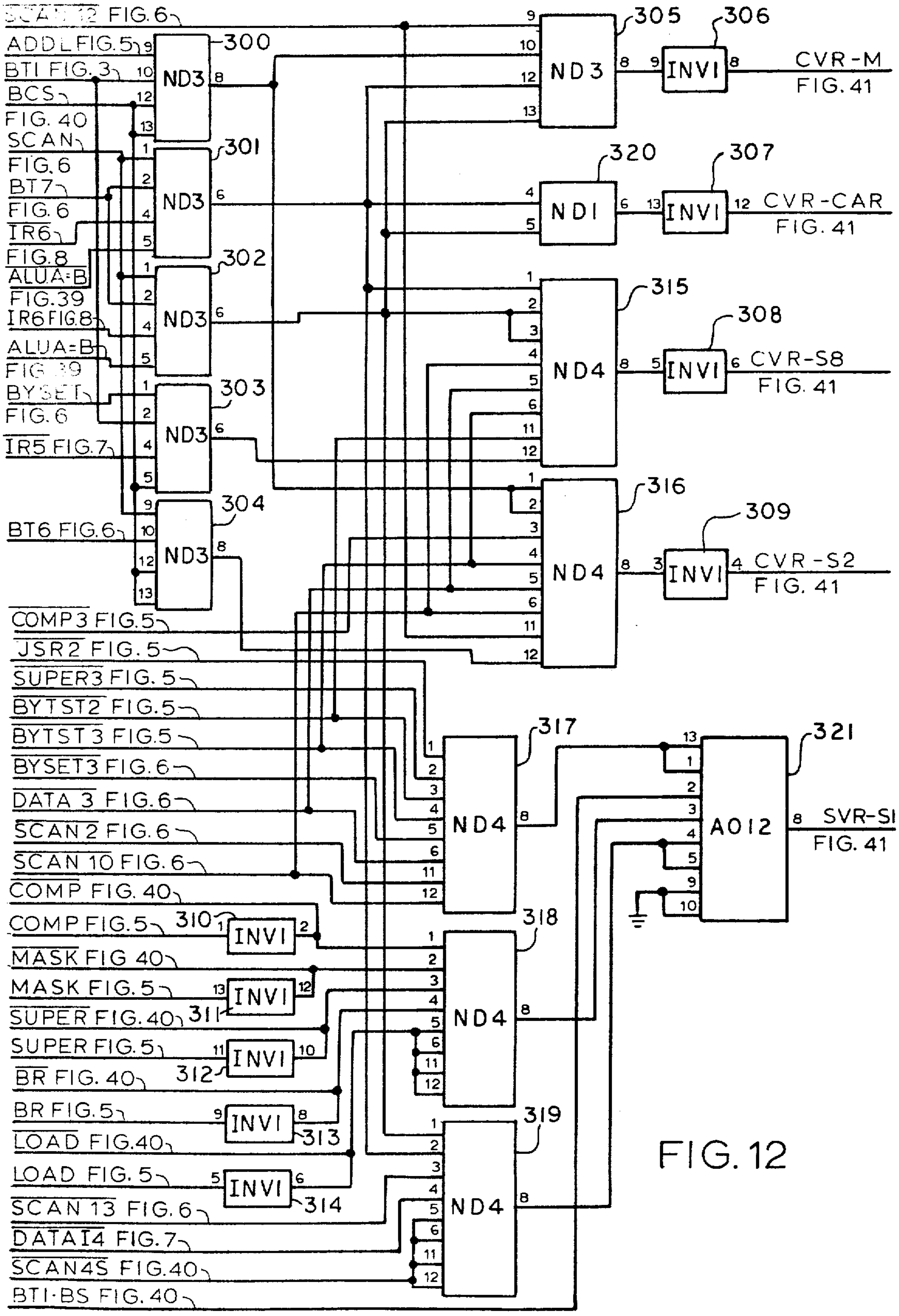

FIG. 12 is that portion of the control word generator which initiates those functions during the scan operational code and bit time combinations in order to control the action taken by the arithmetic logic unit. The functions generated are CVR-S1, CVR-S2, CVR-S4, CVR-S8, CVR-CAR, CVR-M. These are generated as a direct function of the scan operational code, (and other operational codes as well) bit time and instruction register content. The outputs of these circuits are taken to the circuit shown in FIG. 41 where they are encoded to be used as function control signals to the arithmetic logic unit. The circuit of FIG. 12 comprises 7420 DUAL 4-NAND gates 300–305, 7404 HEX INVERTERS 306–314, 7430 8-NAND gates 315–319, 7400 QUAD 2-NAND gate 320 and a 7454 4×2 AND/OR/INVERTER 321.

Figure 13:
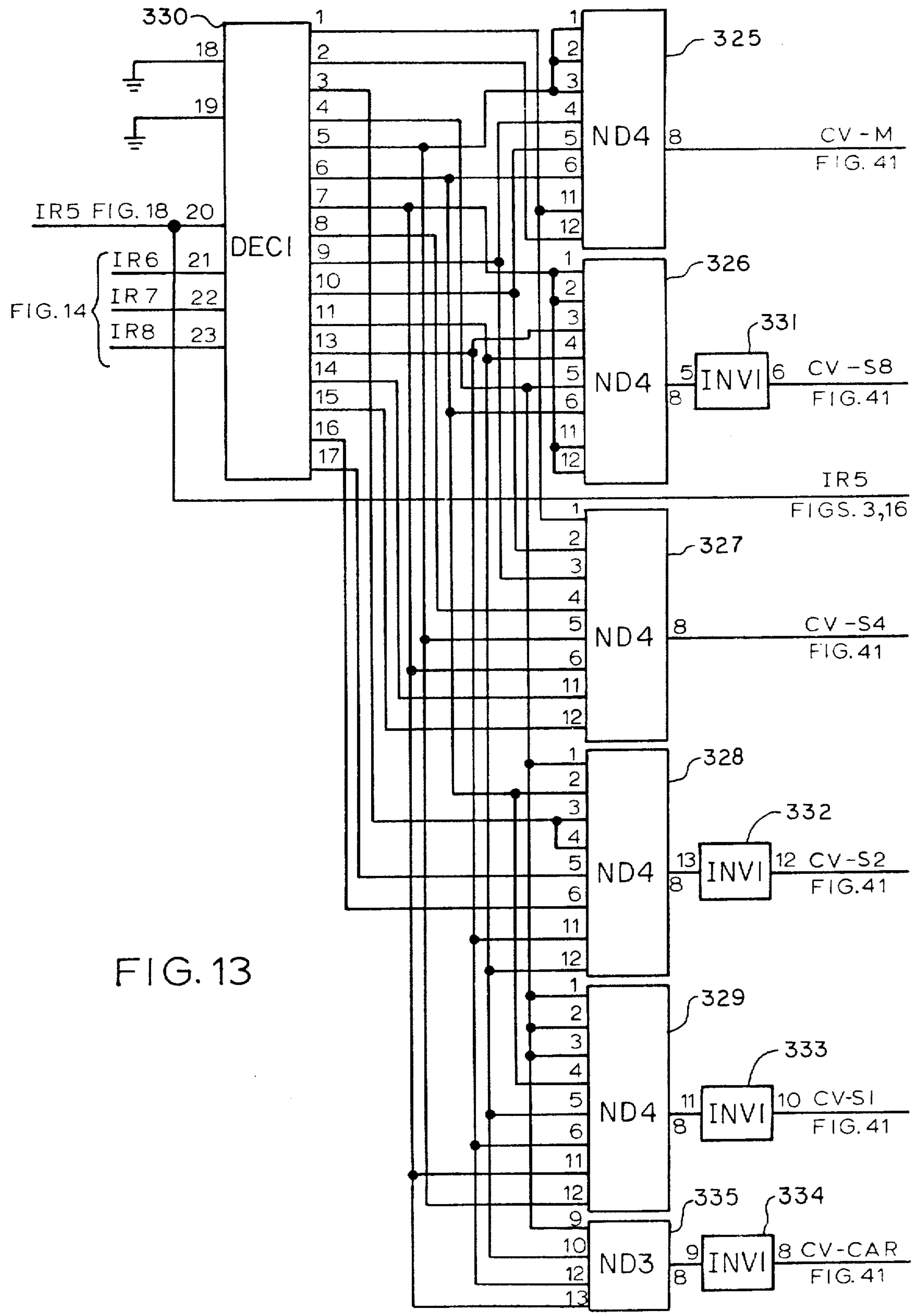

FIG. 13 is that portion of the control word generator which provides CV-S1, CV-S2, CV-S4, CV-S8, CV-CAR and CV-SM functions which, however, are not associated with the scan means. These functions are associated with other central processor operations. The circuit of FIG. 13 comprises 7430, 8-NAND gates 325–329, 74154 1/16 DECODER 330, 7404 HEX INVERTERS 331–334 and 7420 DUAL 4-NAND gate 335.

Figure 14:
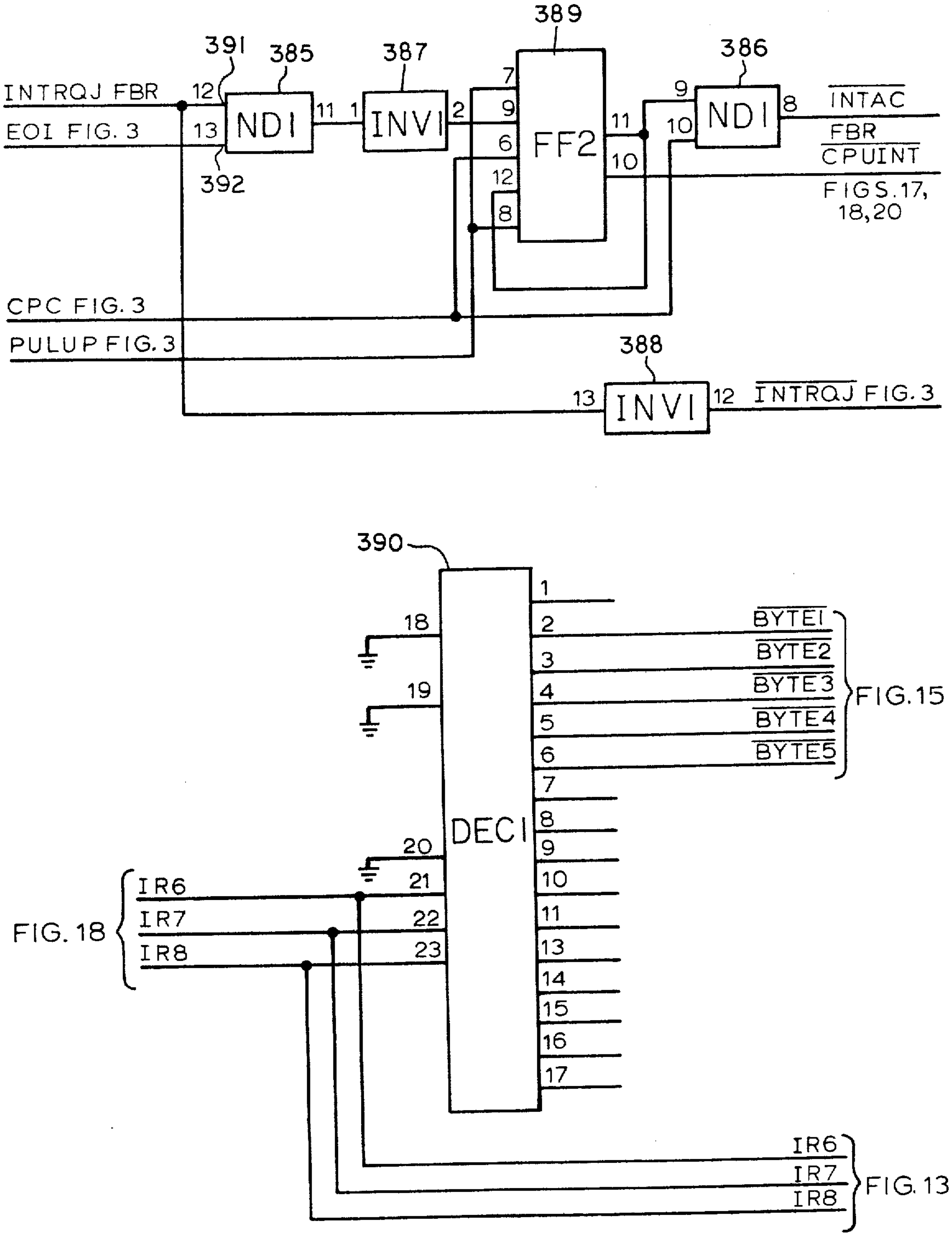

The circuit of FIG. 14 comprises 7400 QUAD 2-NAND gates 385 and 386, 7404 HEX INVERTERS 387 and 388, a 7476 DUAL JK FLIP-FLOP 389 and a 74154 1/16 DECODER 390. The circuit of FIG. 14 is not utilized by the scan means during the scan operational code executions and therefore will not be described in detail.

Figure 15:
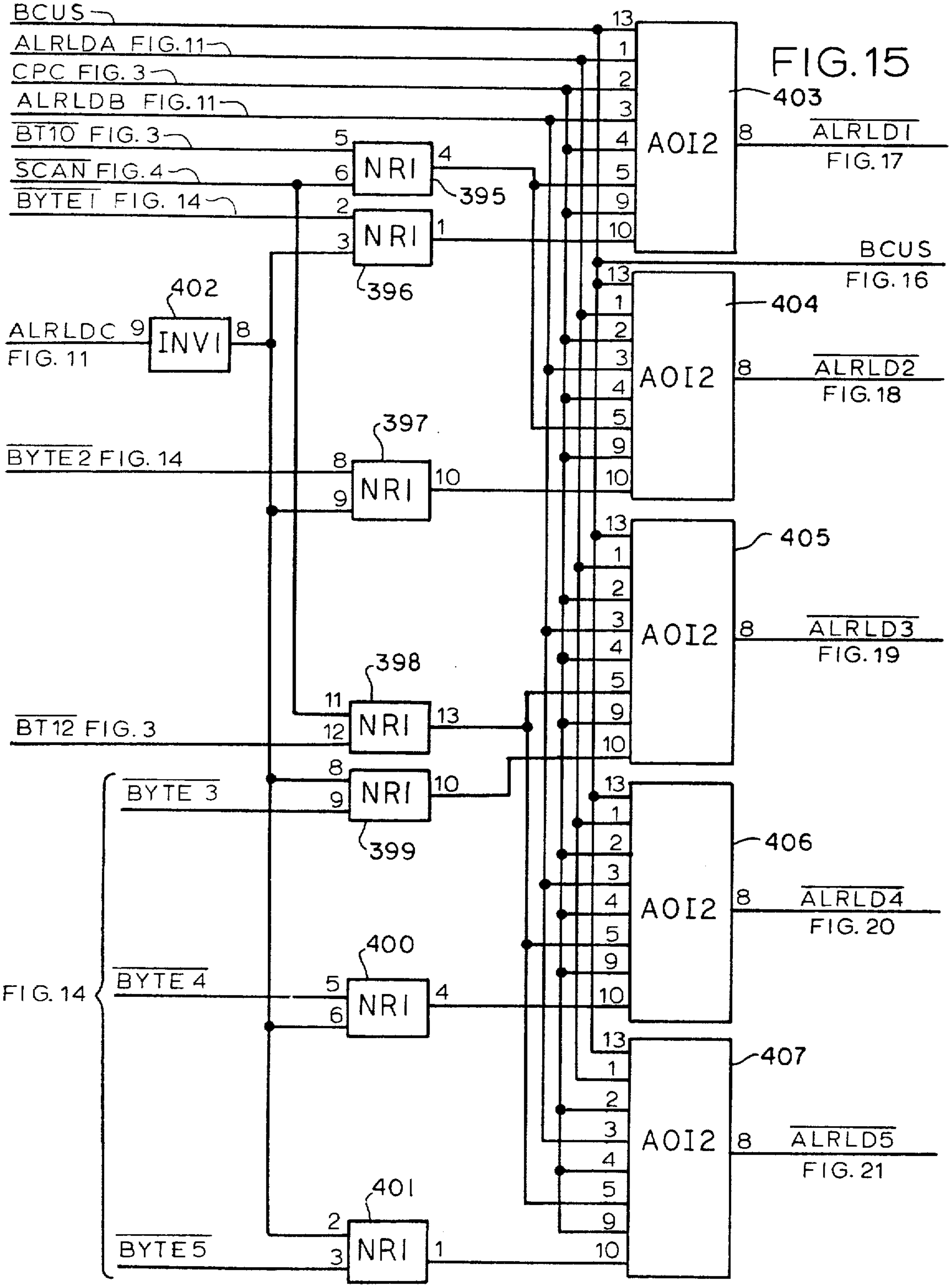

The circuit of FIG. 15 comprises 7402 QUAD 2-NOR gates 395–401, 7404 HEX INVERTERS 402, 7454 4×2 AND/OR/INVERTER gates 403–407. Referring back to FIG. 11 for the moment, it would be best to remember that FIG. 11 comprises leads which are utilized to control the loading of the arithmetic logic register during certain operational code executions including the scan operational code execution, the circuit of FIG. 15 is a part of the logic shown on FIG. 11. The output leads of FIG. 11 feed into the input leads of FIG. 15. The circuit of FIG. 15 therefore further controls the loading of the ALR responsive to the circuit of FIG. 11. Output leads $\overline{\text{ALRLD1}}$, $\overline{\text{ALRLD2}}$, $\overline{\text{ALRLD3}}$, $\overline{\text{ALRLD4}}$ and $\overline{\text{ALRLD5}}$ control the loading of the arithmetic logic register bits 1–4, 5–8, 9–12, 13–16 and 17–20 respectively. The clock pulses appearing at each of these leads load these particular bits of the arithmetic logic register. Specifically, during the scan operation, all ALR bits are loaded when BCUS . ALRLDA or CPC . ALRLDB is present. ALR bits 1–4 are loaded when either CPC . SCAN . BT10 or CPC . ALRLDC . BYTE1 is present. ALR bits 5–8 are loaded when either CPC . SCAN . BT10 or CPC . ALRLDC . BYTE2 is present. ALR bits 9–12 are loaded when either CPC . SCAN . BT12 or CPC . ALRLDC . BYTE3 is present. ALR bits 13–16 are loaded when either CPC . SCAN . BT12 or CPC . ALRLDC . BYTE4 is present and ALR bits 17–20 are loaded when either CPC . SCAN . BT12 or CPC . ALRLDC . BYTE5 is present.

Figure 16:
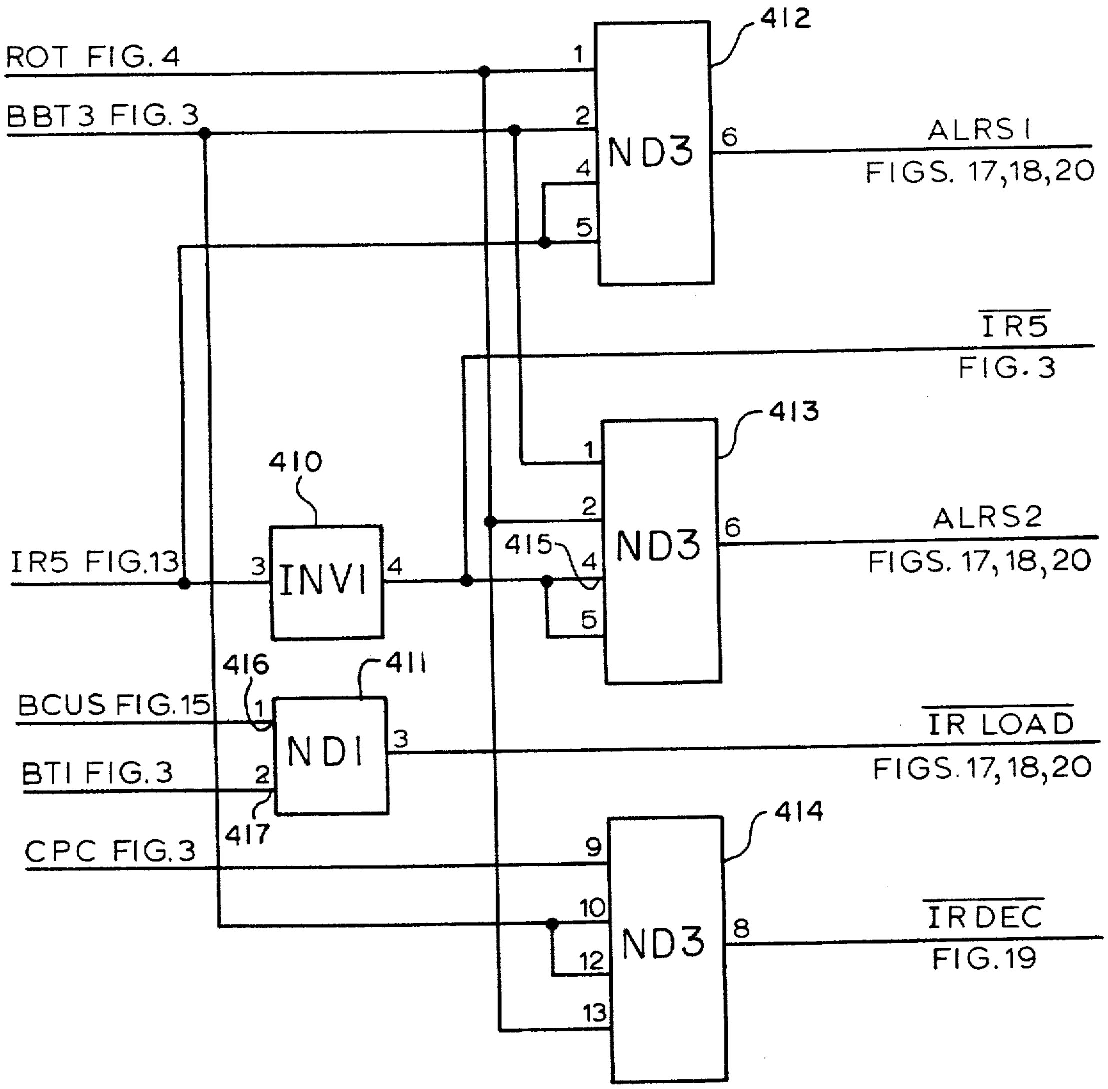

The circuit of FIG. 16 comprises 7404 HEX INVERTER 410, 7400 QUAD 2-NAND gate 411 and 7420 DUAL 4-NAND gate 412, 413 and 414. The circuit of FIG. 16 is used during all of the operational codes and by the scan means during the scan operational code to load the operational code into the instruction register. NAND gate 411 initiates the loading when BCUS . BT1 is present. BCUS is applied at input 416 and BT1 is applied at input 417.

FIGS. 17, 18, 19, 20 and 21 show the major portions of a bus address register, instruction register, arithmetic logic register and accumulators corresponding to bits 1–4, 5–8, 9–12, 13–16 and 17–20 respectively.

Figure 17:
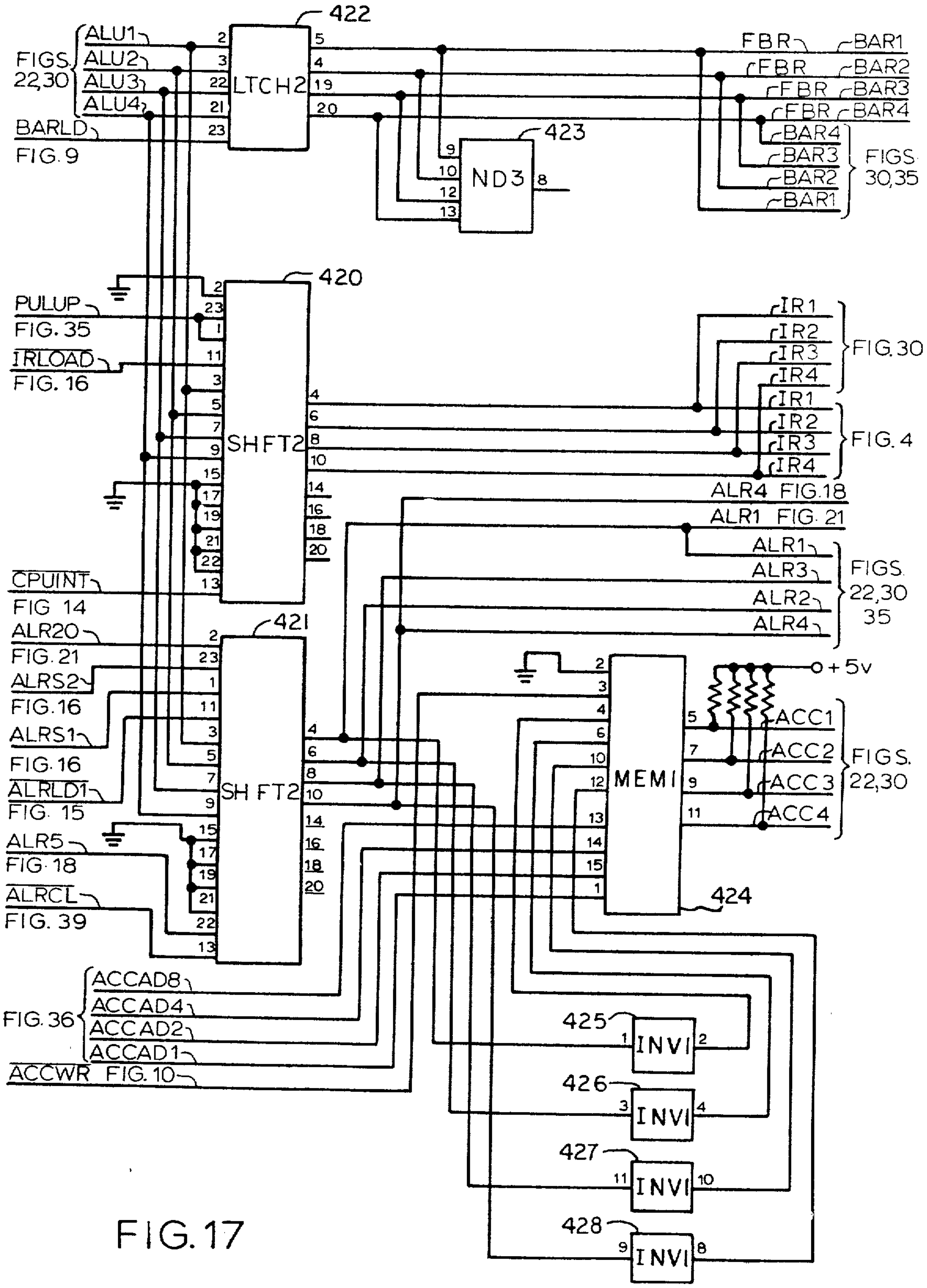
FIGS. 17–21 are detailed schematic diagrams showing the bus address register, instruction register, arithmetic logic register and accumulators of FIG. 1 in detail.
Figure 18:
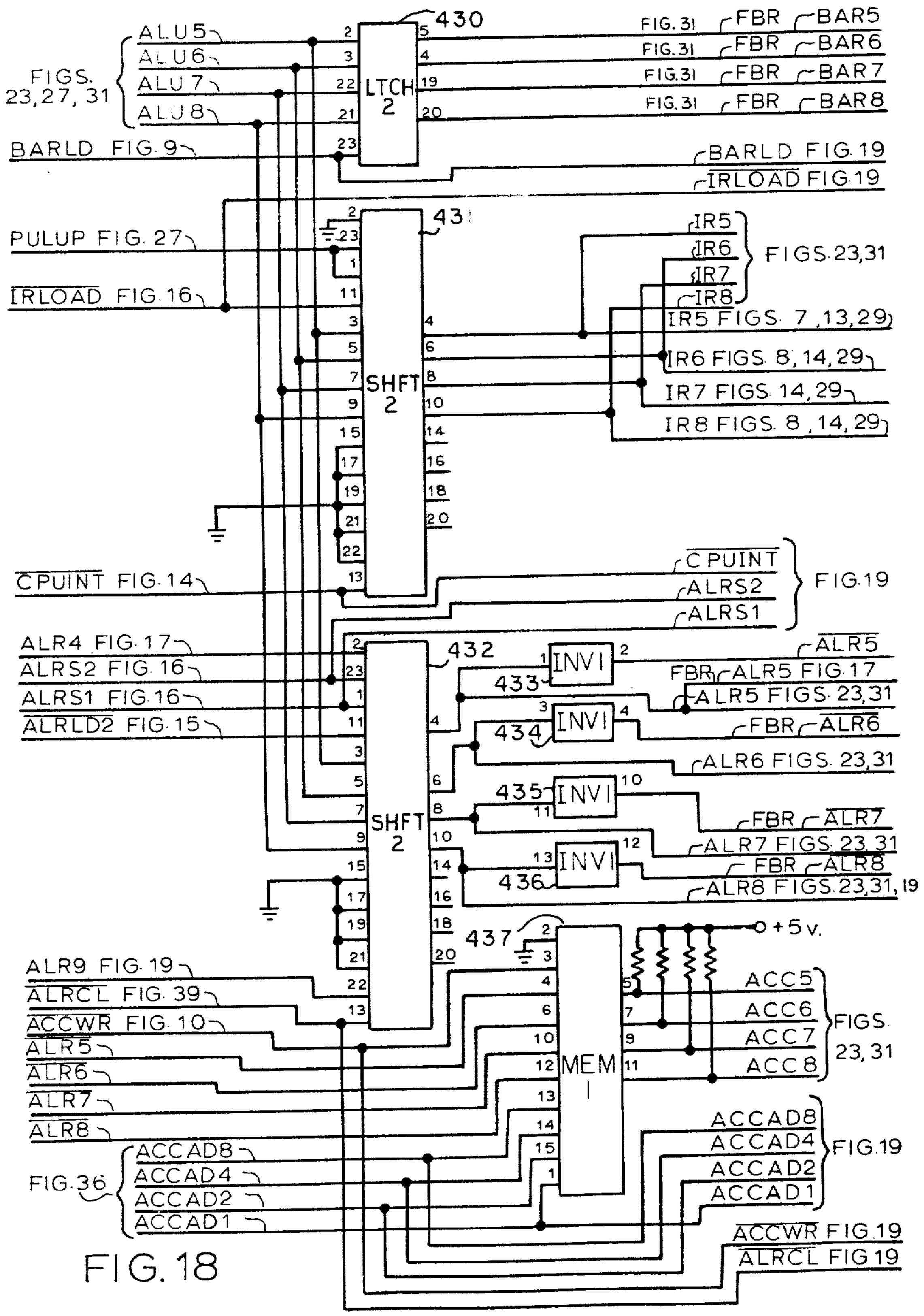
Figure 19:
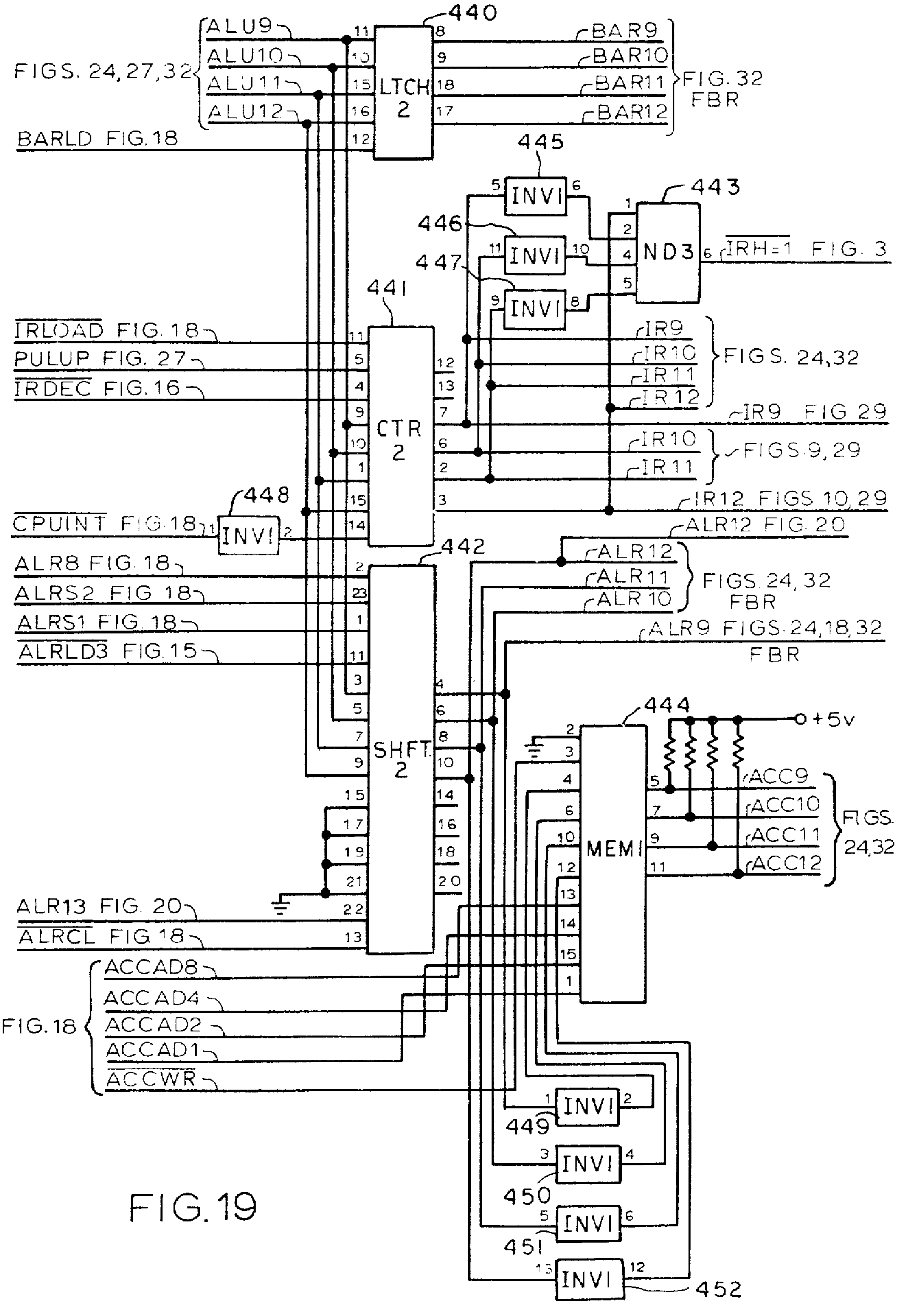
Figure 20:
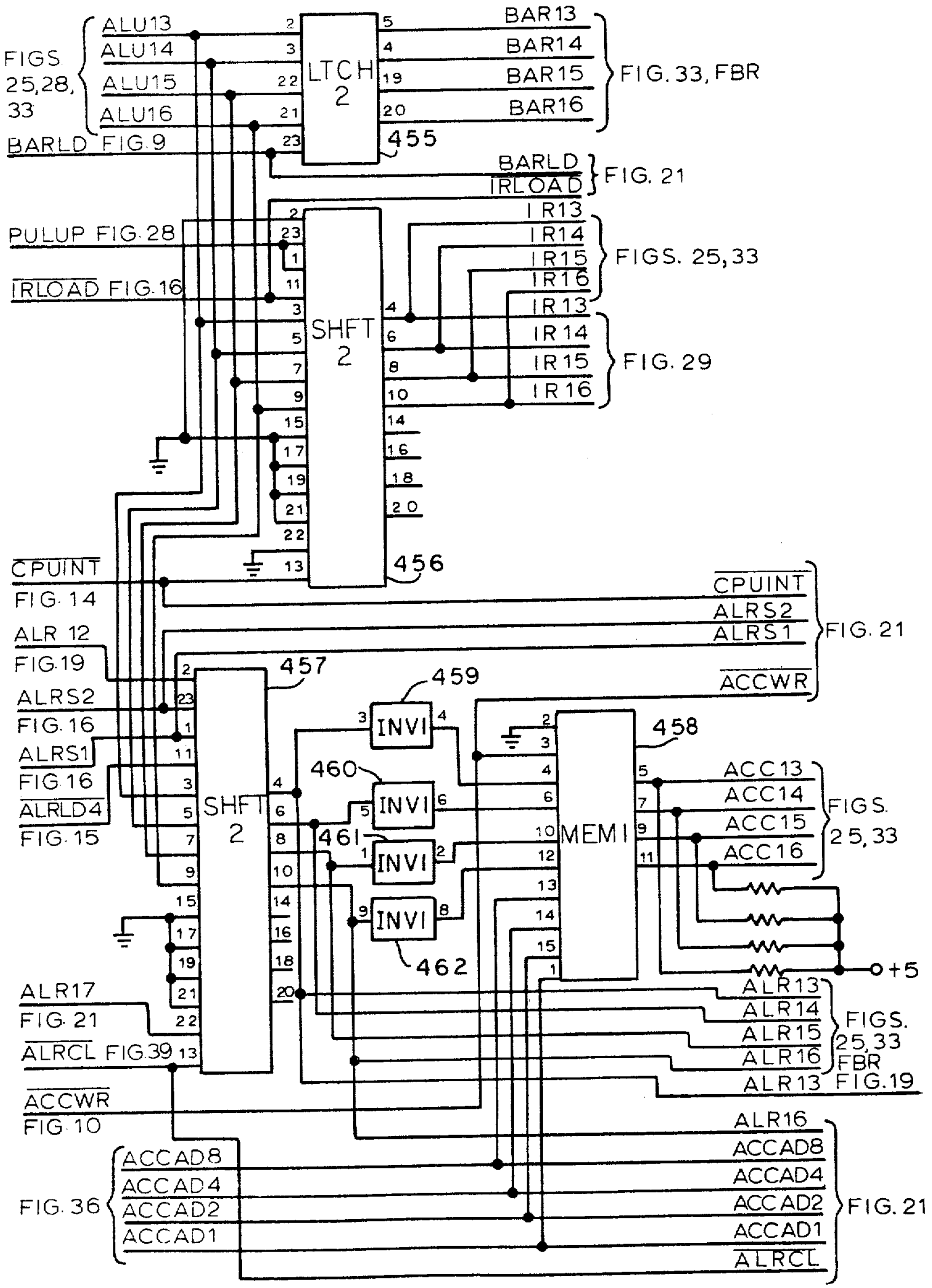
Figure 21:
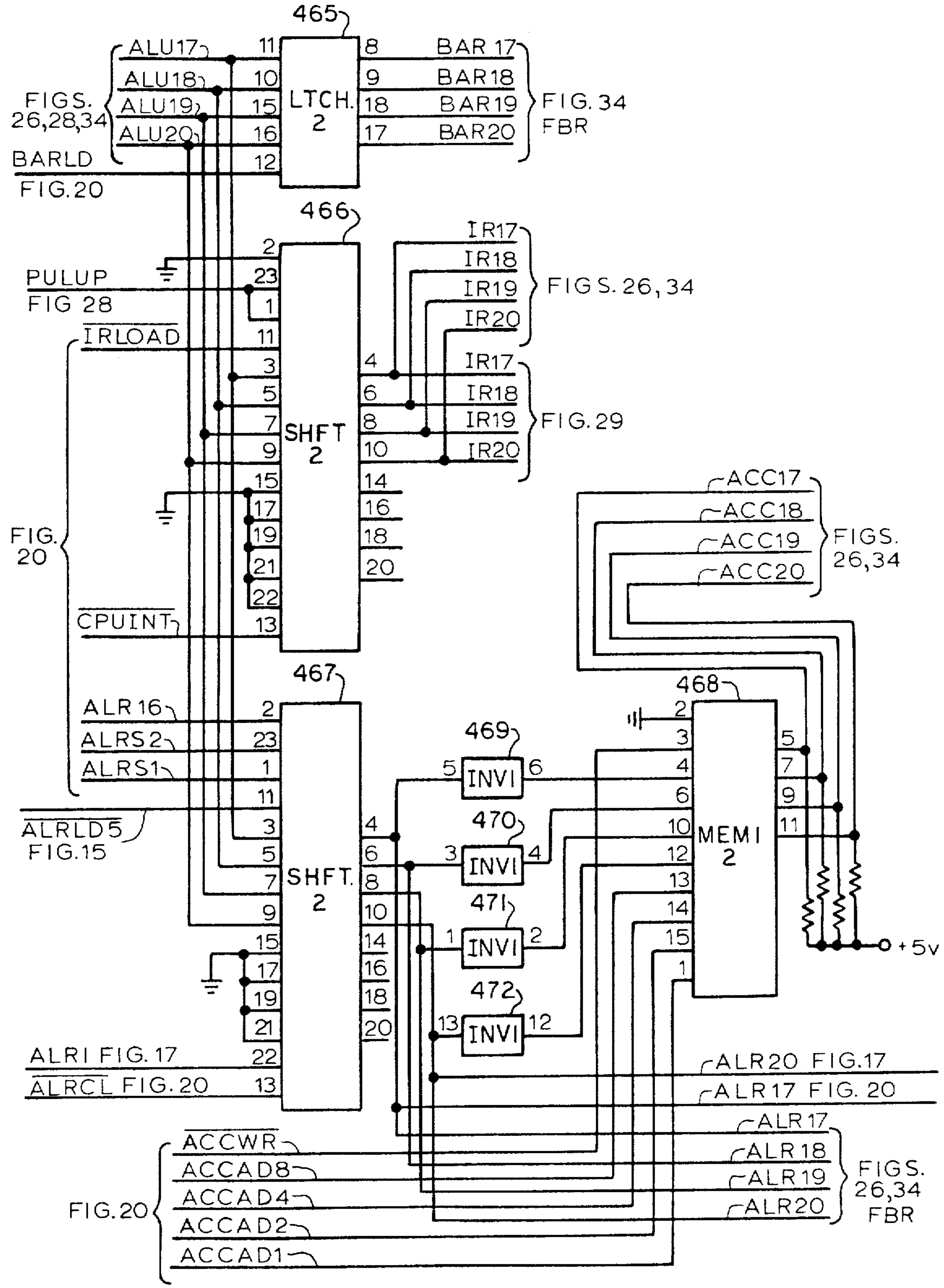

The circuit of FIG. 17 comprises 74198 8-BIT SHIFT REGISTERS 420 and 421, a 74100 DUAL 4-BIT LATCH 422, a 7420 4-NAND gate 423, a 7489 16×4 RAM 424 and 7404 HEX INVERTERS 425–428. The circuit of FIG. 18 comprises 74100 DUAL 4-BIT LATCH 430, 74198 8-BIT SHIFT REGISTERS 431 and 432, 7404 HEX INVERTERS 433–436 and a 7489 16×4 RAM 437. The circuit of FIG. 19 comprises a 74100 DUAL 4-BIT LATCH 440, 74193 4-BIT UP/DOWN COUNTER 441, 74198 8-BIT SHIFT REGISTER 442, a 7420 DUAL 4-NAND gate 443, a 7489 16×4 RAM 444 and 7404 HEX INVERTERS 445–452. FIG. 20 comprises 74100 DUAL 4BIT LATCH 455, 74198 8-BIT SHIFT REGISTERS 456 and 457, 7489 16×4 RAM 458 and 7404 HEX INVERTERS 459–462. FIG. 21 comprises 74100 DUAL 4-BIT LATCH 465, 74198 8-BIT SHIFT REGISTERS 466 and 467, 7489 16×4 RAM 468 and 7404 HEX INVERTERS 469–472. Inasmuch as each of the circuits of FIGS. 17–21 perform the same functions and only differ in that each relates to a different four bits of the 20 stored in the BAR, IR, ALR and accumulators, only FIG. 17 will be described in detail for purposes of brevity.

Latch 422 comprises the bus address register for BAR bits 1–4. Shift register 420 comprises the instruction register for IR bits 1–4. Shift register 421 comprises the ALR for ALR bits 1–4 and RAM 424 comprises the 16 accumulators for bits 1–4.

As previously mentioned, the bus address register stores the composite subsystem address of the subsystem to be interrogated during the scan operation to locate the preselected bits of data. The inputs of the latch 422 are coupled to leads ALU1, ALU2, ALU3 and ALU4 of the arithmetic logic unit for receiving bits 1–4 of the 20 bit composite subsystem address. The BAR is loaded with the composite address when a BARLD clock signal is applied which originates at the outputs of NAND gates 253 and 254 of FIG. 9 as previously referred to.

The instruction register as previously mentioned stores the scan operational code to be utilized by the central processor scan means as well as the other operational codes as they are executed. Shift register 420 receives IR bits 1–4 from the ALU via leads ALU1, ALU2, ALU3 and ALU4. The IR bits 1–4 are loaded into the shift register 420 upon the receipt of an IR load clock pulse ($\overline{\text{IRLOAD}}$) which is supplied by the output of NAND gate 411 of FIG. 16.

ALR shift register 421 receives its bits 1–4 of information from the ALU over ALU lines ALU1, ALU2, ALU3 and ALU4. ALR bits 1–4 are loaded into shift register 420 upon the receipt of a clock pulse $\overline{\text{ALRLD1}}$ which originates at the output of gate 403 of FIG. 15.

RAM 424 comprises all 16 accumulators for bits 1–4. The bits of data are loaded into the accumulators with the receipt of a clock pulse $\overline{\text{ACCWR}}$ which is derived from gate 283 of FIG. 10. The data to be entered into the accumulators is acquired from ALR shift register 421 via inverters 425, 426, 427 and 428 and are introduced at the RAM 424 at RAM pin numbers 4, 6, 10 and 12. The particular accumulator in which the bits of data are to be stored is controlled by leads ACCAD8, ACCAD4, ACCAD2 and ACCAD1 which are address leads to address a specific one of the 16 accumulators. For exaple, accumulator AC1 will be selected when ACCAD1 is equal to 1, and ACCAD2, ACCAD4 and ACCAD8 are all equal to 0. The first four bits of one of the accumulators will therefore be available at lines ACC1, ACC2, ACC3 and ACC4 when needed such as in the case when the contents of accumulator AC1 are to be utilized for masking with the transmitted data received from the particular subsystem address by the bus address register.

The arithmetic logic unit is shown in detail in the circuits of FIGS. 22, 23, 24, 25 and 26 corresponding to ALU bits 1–4, 5–8, 9–12, 13–16 and 17–20 respectively.

Figure 22:
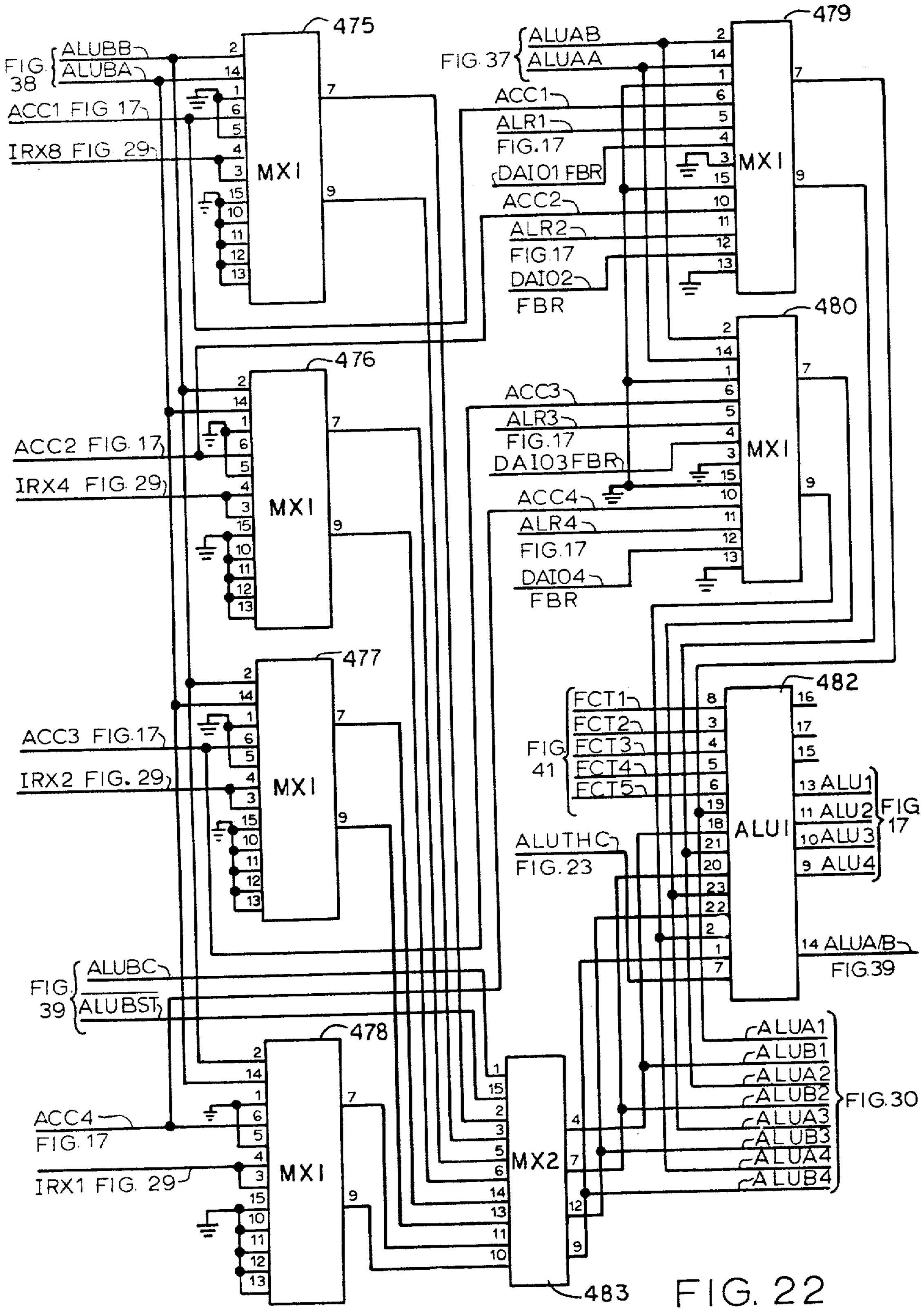
FIGS. 22–26 are detailed schematic diagrams of the arithmetic logic unit of FIG. 1.

The circuit of FIG. 22 comprises 74153 DUAL 4→1 MULTIPLEXERS 475–480, a 74181 4-BIT ARITHMETIC & LOGIC UNIT 482 and 74157 QUAD 2→1 MULTIPLEXER 483. The circuit of FIG. 23 comprises 74153 DUAL 4→1 MULTIPLEXERS 485–490, 74181 4-BIT ARITHMETIC & LOGIC UNIT 491 and a 74157 QUAD 2→1 MULTIPLEXER 492. The circuit of FIG. 24 comprises 74153 DUAL 4→1 MULTIPLEXERS 495–500, a 74181 4-BIT ARITHMETIC & LOGIC UNIT 501 and a 74157 QUAD 2→1 MULTIPLEXER 502. The circuit of FIG. 25 comprises 74153 DUAL 4→1 MULTIPLEXERS 505–510, 74181 4-BIT ARITHMETIC & LOGIC UNIT 511 and a 74157 QUAD 2→1 MULTIPLEXER 512. Lastly, the circuit of FIG. 26 comprises 74153 DUAL 4→1 MULTIPLEXERS 515–520, 74181 4-BIT ARITHMETIC & LOGIC UNIT 521 and a 74157 QUAD 2→1 MULTIPLEXER 522.

Inasmuch as each of the circuits of FIGS. 22–26 perform the same functions but for different bits, only FIG. 22 will be described in detail. Arithmetic and logic unit chip 482 performs all of the necessary functions during the scan operation such as the compare, mask, A PLUS B, A MINUS B, $\overline{\text{A}}$, A etc. The function to be performed by ALU 482 is dictated by the levels on inputs FCT1–FCT5. The function control leads correspond to the function control signals in the following manner. FCT1 corresponds to M, FCT2 corresponds to S8, FCT3 corresponds to S4, FCT4 corresponds to S2 and FCT5 corresponds to S1. Therefore, for example, if the ALU 482 is to perform the A PLUS B function, FCT1 will be equal to 0, FCT2 will be equal to 1, FCT3 will be equal to 0, FCT4 will be equal to 0 and FCT5 will be equal to 1. Multiplexers 475–480 are used to select required information to be utilized by the ALU during the execution of the scan operational code. For example, multiplexer 475 has an input lead ACC1 to obtain information from one of the accumulators in bits 1–4 at RAM 424 of FIG. 17.

Figure 27:
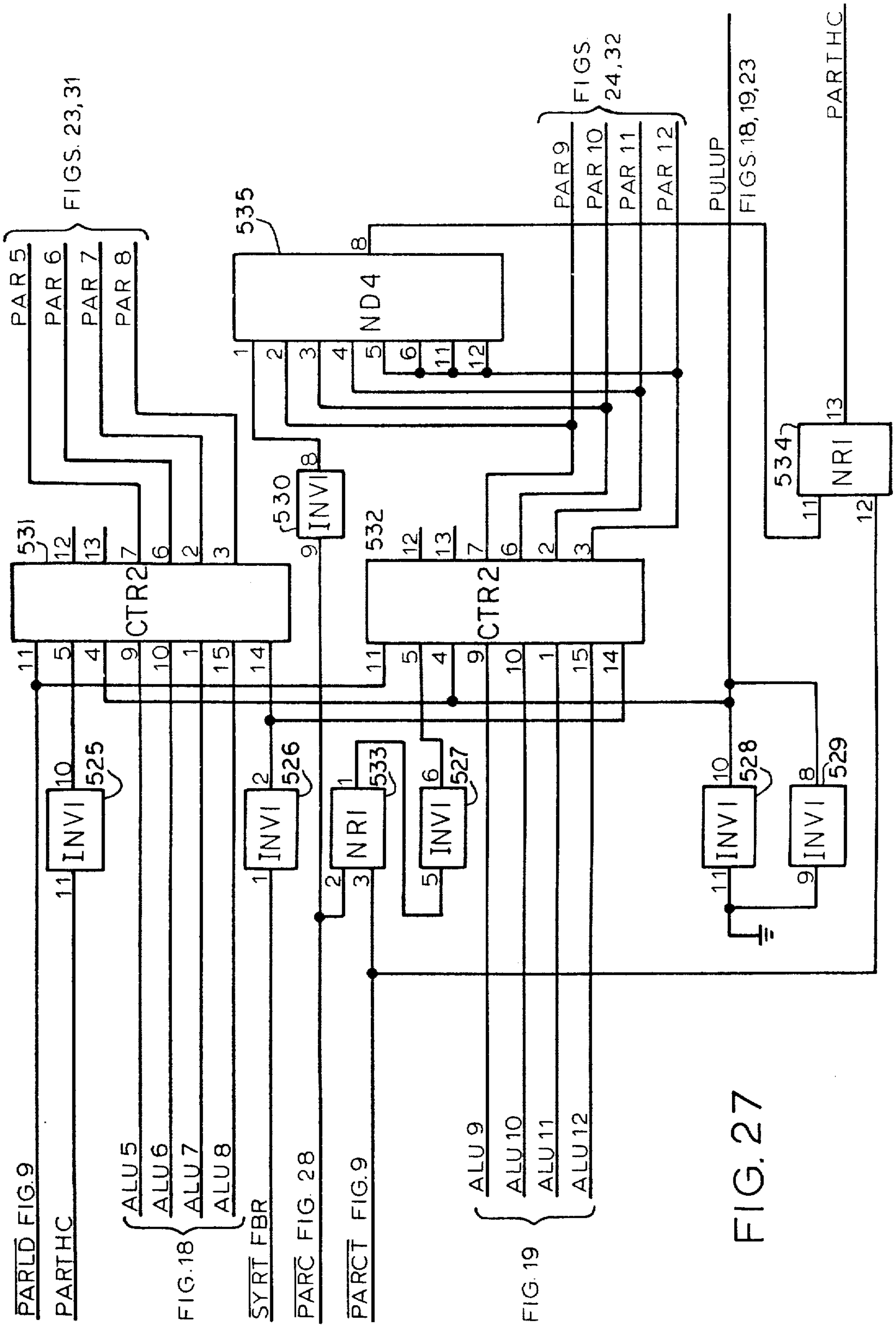
FIGS. 27–28 are detailed schematic diagrams of the program address register of FIG. 1.
Figure 28:
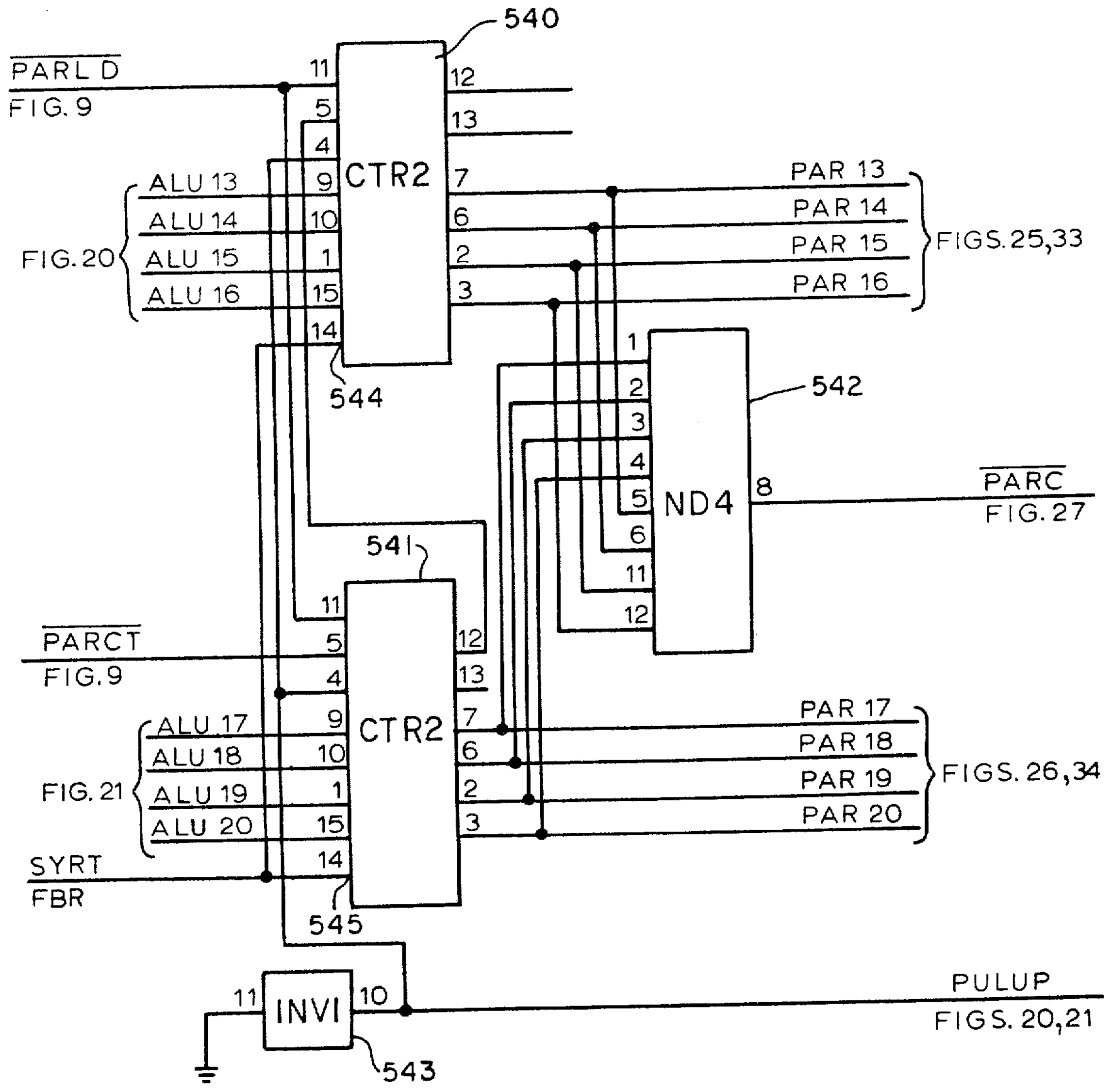

FIGS. 27 and 28 show the detailed schematic circuit diagrams of the program address register of FIG. 1. The circuit of FIG. 27 comprises 7404 HEX INVERTERS 525–530, 74193 4-BIT UP/DOWN COUNTERS 531 and 532, 7402 QUAD 2-NOR gates 533 and 534 and 7430 8-NAND gate 535. The circuit of FIG. 27 corresponds to the program address register bits 5–12.

The circuit of FIG. 28 comprises 74193 4-BIT UP/-DOWN COUNTERS 540 and 541, 7430 8-NAND gate 542 and 7404 HEX INVERTER 543. The circuit of FIG. 28 corresponds to the program address register bits 13–20.

The program address register is a 16-bit binary counter (PAR bits 5–20) having a maximum possible address range of 0000-FFFF. Counters 540 and 541 of FIG. 28 are the tens and units counters respectively. Counters 532 and 531 of FIG. 27 are the hundreds and thousands counters respectively. The units counter is incremented by PARCT until count OOOF is reached, after which lead CAR enables the tens counter to advance by one count to 0010. Counting continues until 00FF is reached. At count 00FF the output of NAND gate 542 ($\overline{\text{PARC}}$) goes low allowing the hundreds counter to advance by one count to 0100 on PARC . PARCT. Counting continues until 0FFF is reached. At count 0FFF the output of NOR gate 534 (PARTHC) goes high and is inverted by inverter 525 allowing the thousands counter to advance by one count to 1000. Counting continues until FFFF is reached. Therefore, as previously explained, PARCT is utilized to increment the program address register during the scan operational code.

Figure 29:
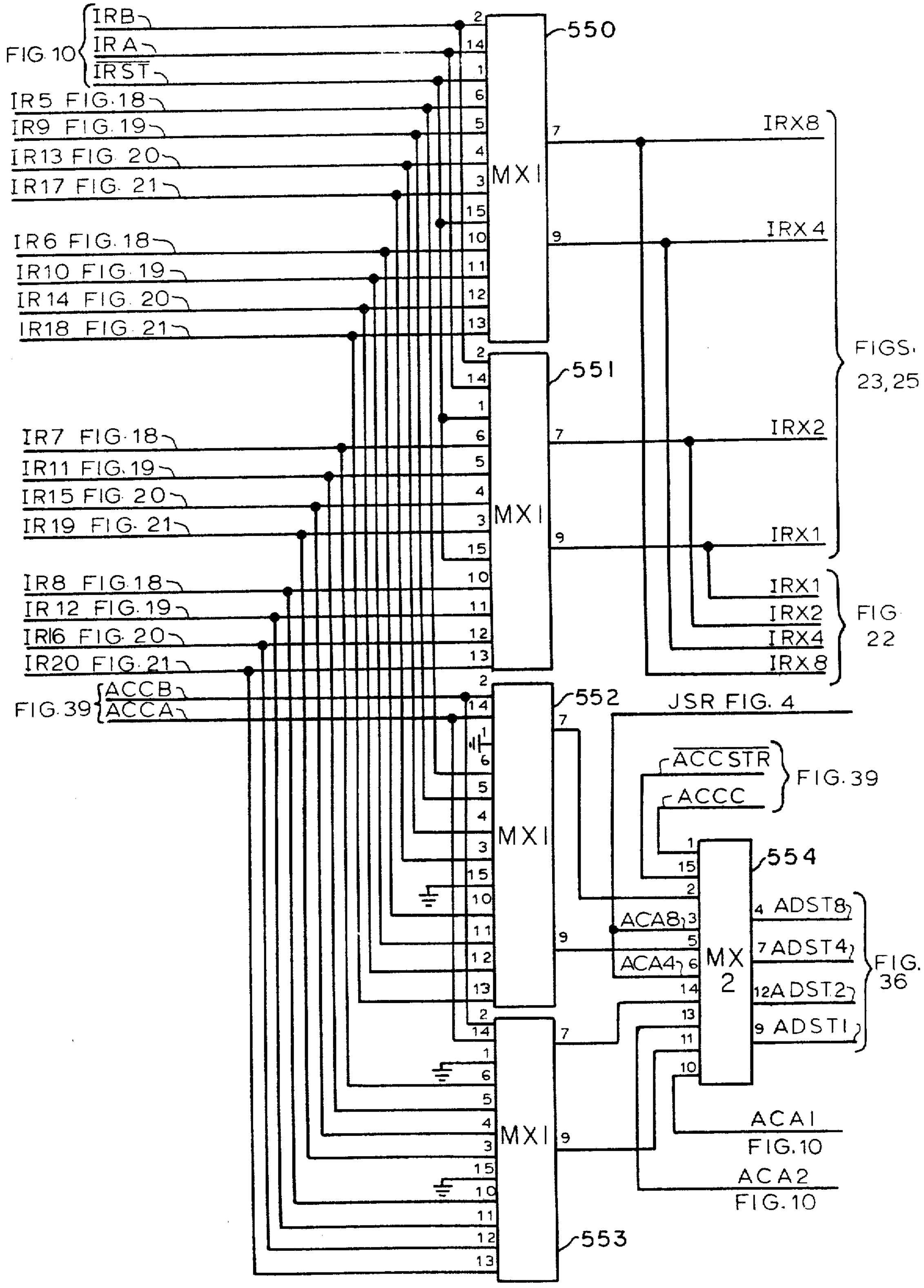
FIG. 29 is a detailed schematic diagram of the instruction register byte selector and part of the accumulator address register of FIG. 1.

Referring now to FIG. 29, it shows a detailed schematic diagram of the instruction register byte selector and part of the accumulator address register of FIG. 1. It comprises 74153 DUAL 4→1 MULTIPLEXERS 550–553 and 74157 QUAD 2→1 MULTIPLEXERS 554.

During the scan operational code, the scan means must select from the instruction register the P1 and P2 partial subsystem addresses during the indirect mode, and the P1 partial subsystem address during the direct mode. The inputs of multiplexers 551 and 550 together with the control functions IRA and IRB provide the necessary IR byte selections for obtaining the P1 and P2 partial subsystem addresses. They are provided at output IRX1, IRX2, IRX4 and IRX8 for use by the arithmetic logic unit for combination with the contents of the arithmetic logic register bits 5–20 which may be either the contents of accumulator AC0 or the address word received from the first subsystem interrogated during the indirect scan mode. As previously described, the results of the combination are then gated through the arithmetic logic unit to the bus address register for providing a composite subsystem address to be utilized for interrogating the next subsystem on the common data bus.

For selecting the P1 and P2 partial subsystem addresses, the IR byte selector of FIG. 29 utilizes input leads IRB, IRA, $\overline{\text{IRST}}$, IR9, IR13, IR10, IR14, IR11, IR15, IR12 and IR16.

Figure 30:
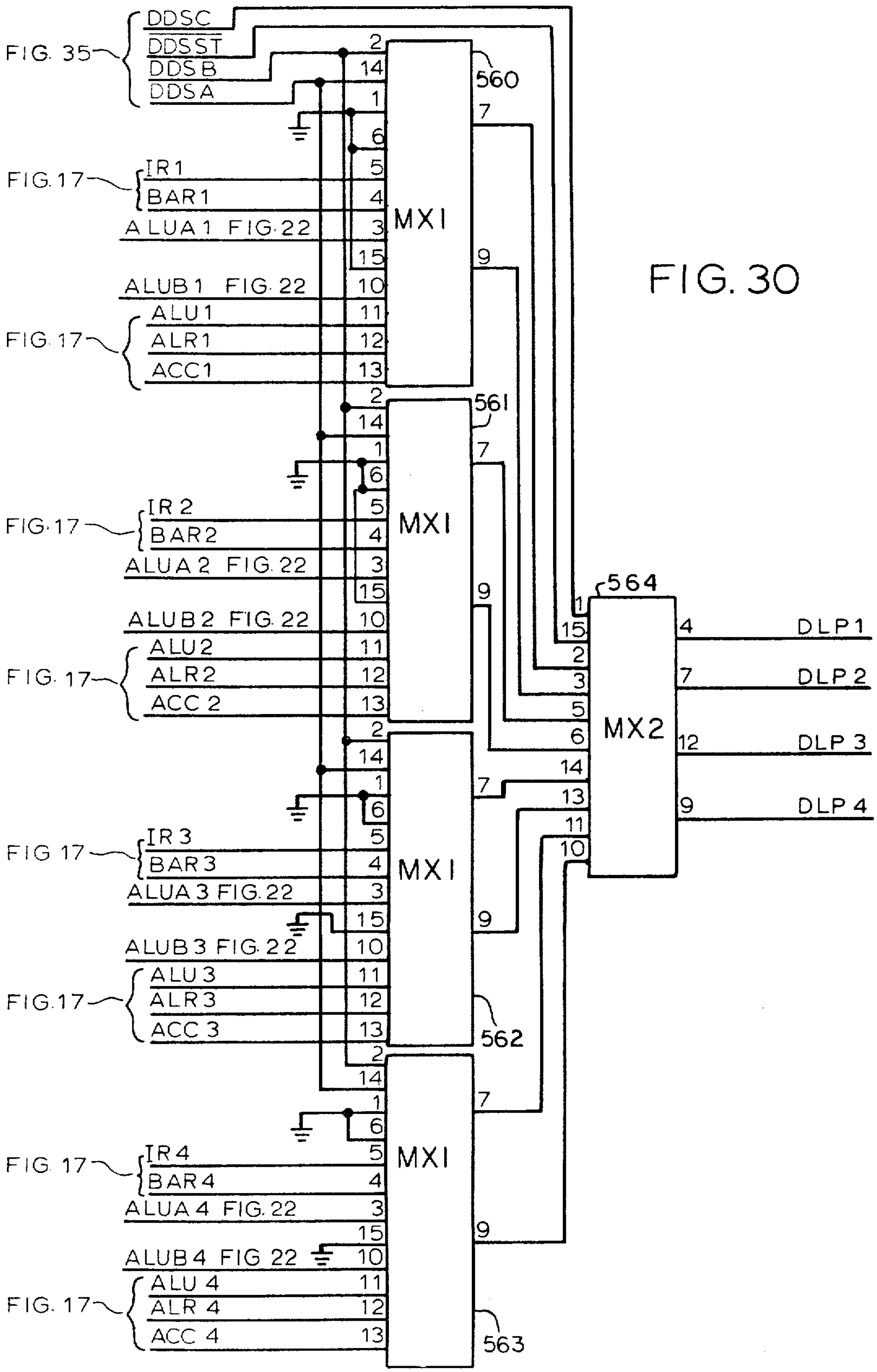
FIGS. 30–34 are detailed schematic circuit diagrams of a test panel which may be utilized to provide manual access to the central processor of FIG. 1.
Figure 31:
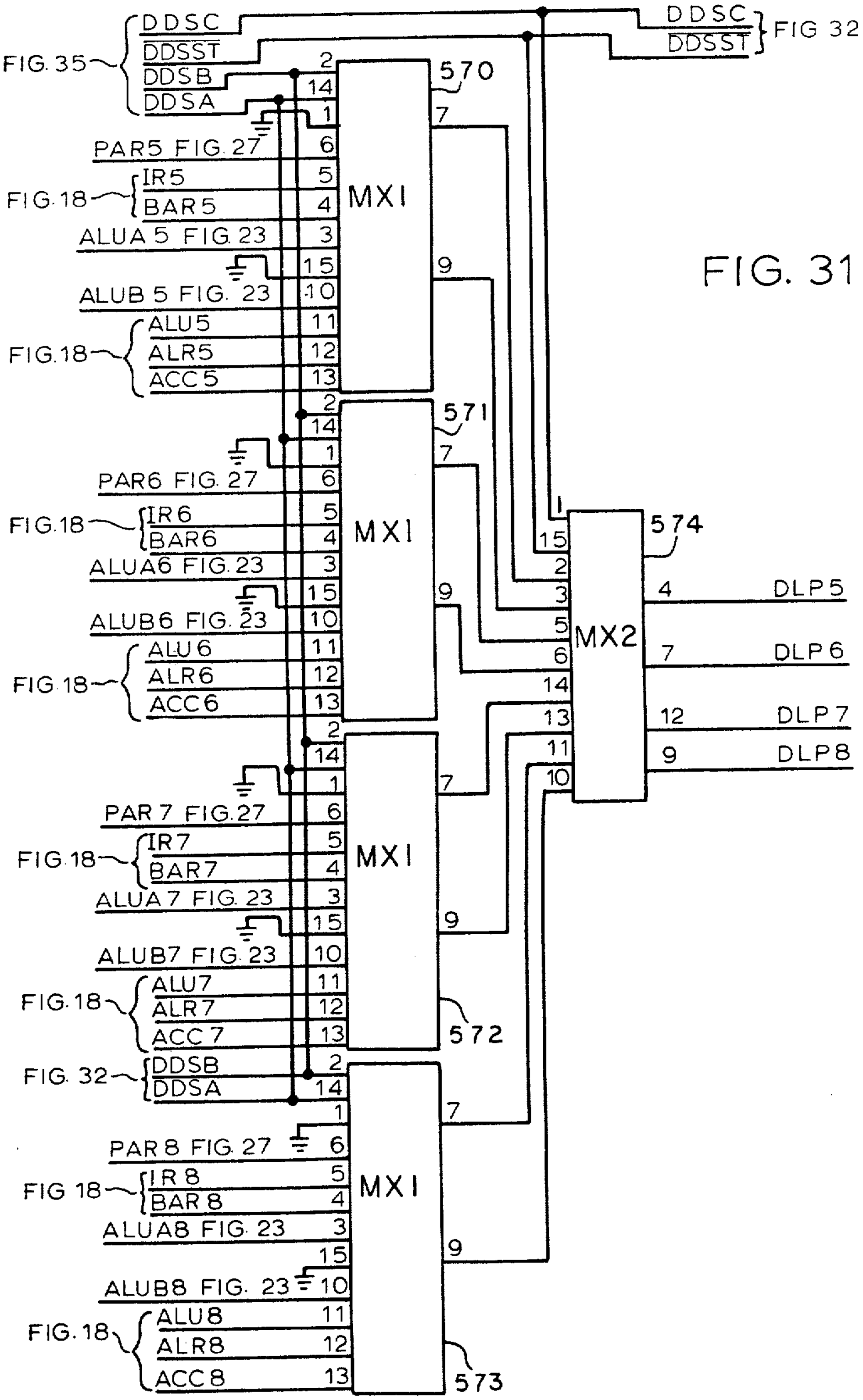
Figure 32:
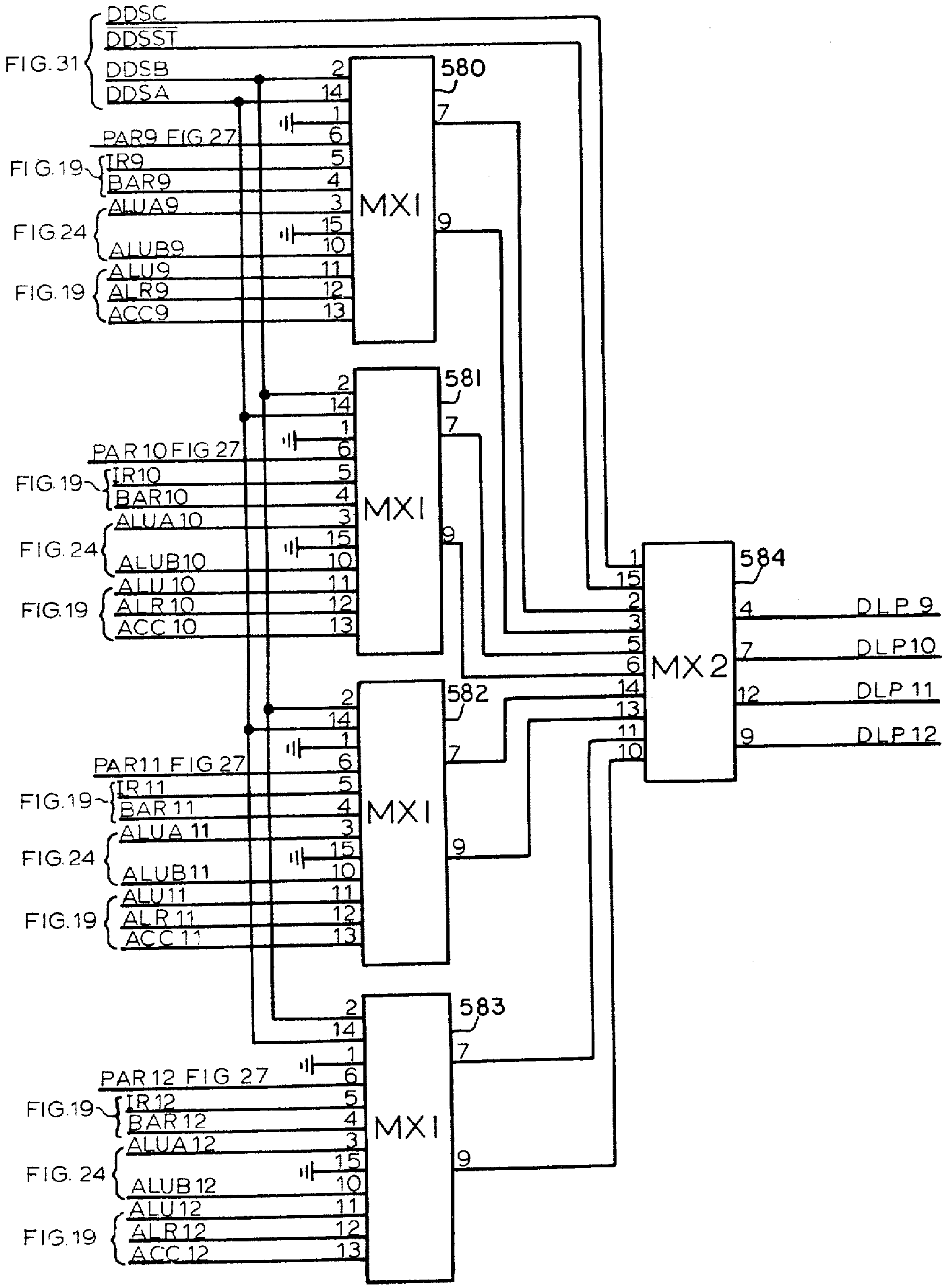

FIGS. 30–34 show detailed schematic circuit diagrams of the data display selector which is used to gate the contents of a selected register to be viewed on the data display light emitting diodes at a central processing unit test panel. These registers include program address register, instruction register, bus address register, ALU-A input, ALU-B input, ALU output, arithmetic logic register and accumulator output. FIG. 30 corresponds to the data display selector for bits 1–4, FIG. 31 corresponds to the data display selector bits 5–8, FIG. 32 corresponds to the data display selector bits 9–12, FIG. 33 corresponds to the data display selector bits 13–16, and FIG. 34 corresponds to the data display selector bits 17–20.

The circuit of FIG. 30 comprises 74153 DUAL 4→1 MULTIPLEXERS 560–563 and a 74157 QUAD 2→1 MULTIPLEXER 564. The circuit of FIG. 31 comprises 74153 DUAL 4→1 MULTIPLEXERS 570–573 and a 74157 QUAD 2→1 MULTIPLEXER 574. The circuit of FIG. 32 comprises 74153 DUAL 4→1 MULTIPLEXERS 580–583 and a 74157 QUAD 2→1 MULTIPLEXER 584.

Figure 33:
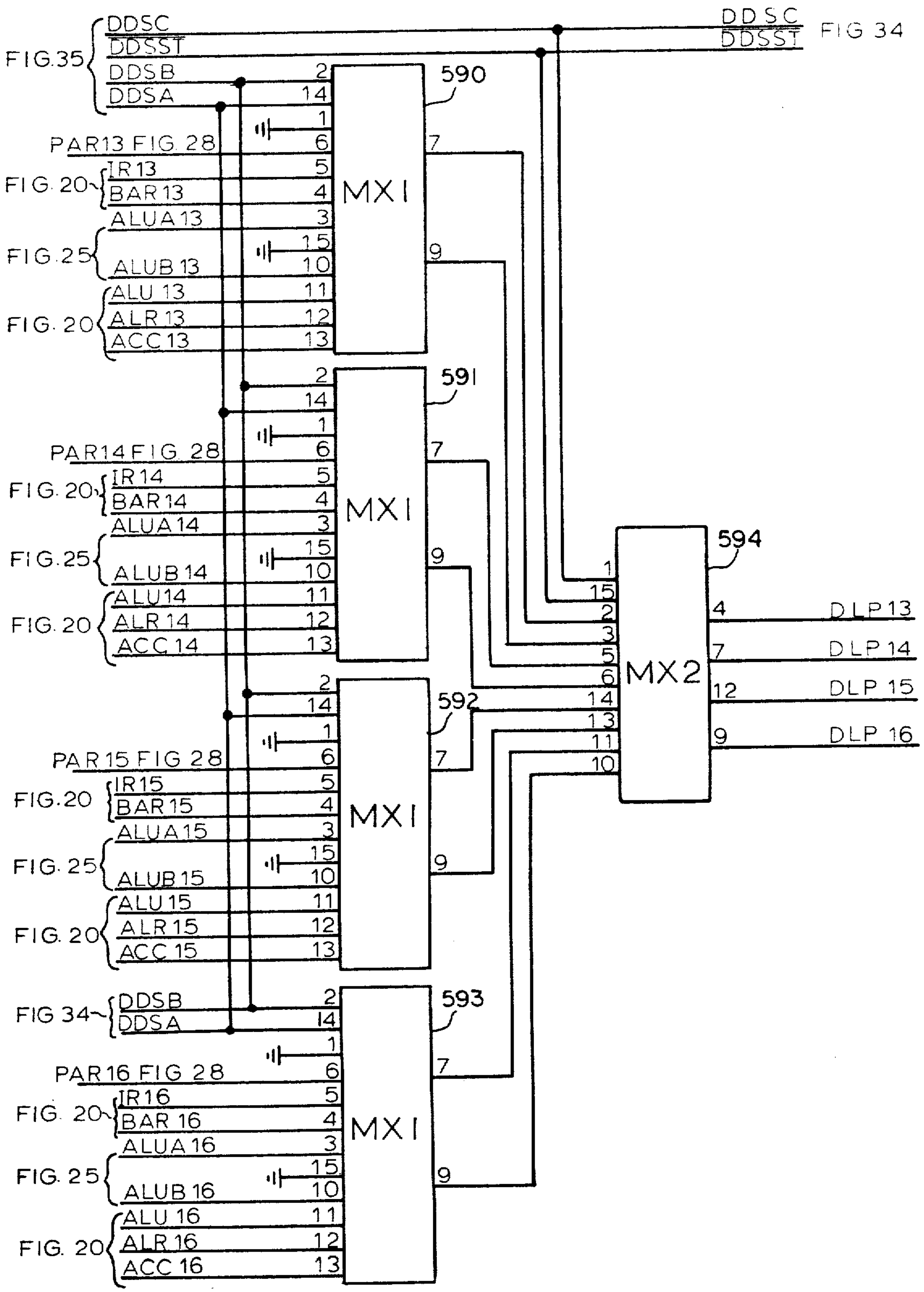
Figure 34:
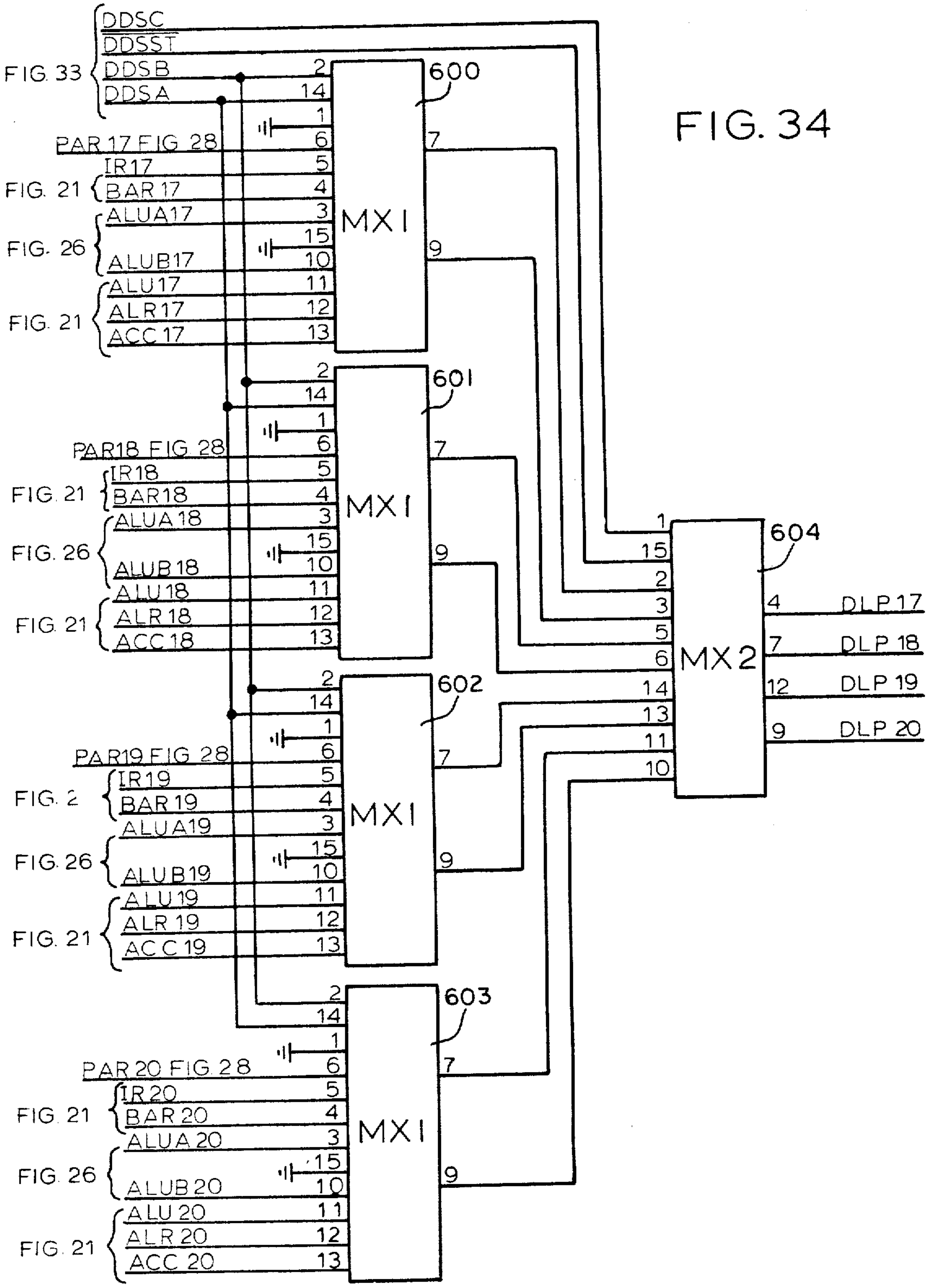

The circuit of FIG. 33 comprises 74153 DUAL 4→1 MULTIPLEXERS 590–593 and 74157 QUAD 2→1 MULTIPLEXER 594. Lastly, the circuit of FIG. 34 comprises 74153 DUAL 4→1 MULTIPLEXERS 600–603 and a 74157 QUAD 2→1 MULTIPLEXER 604.

Selection is accomplished by the multiplexers under the control of control function DDSA, DDSB, DDSC, DDSST. Data display selector outputs are taken to the central processing unit test panel via leads DLP1-DLP20.

Figure 35:
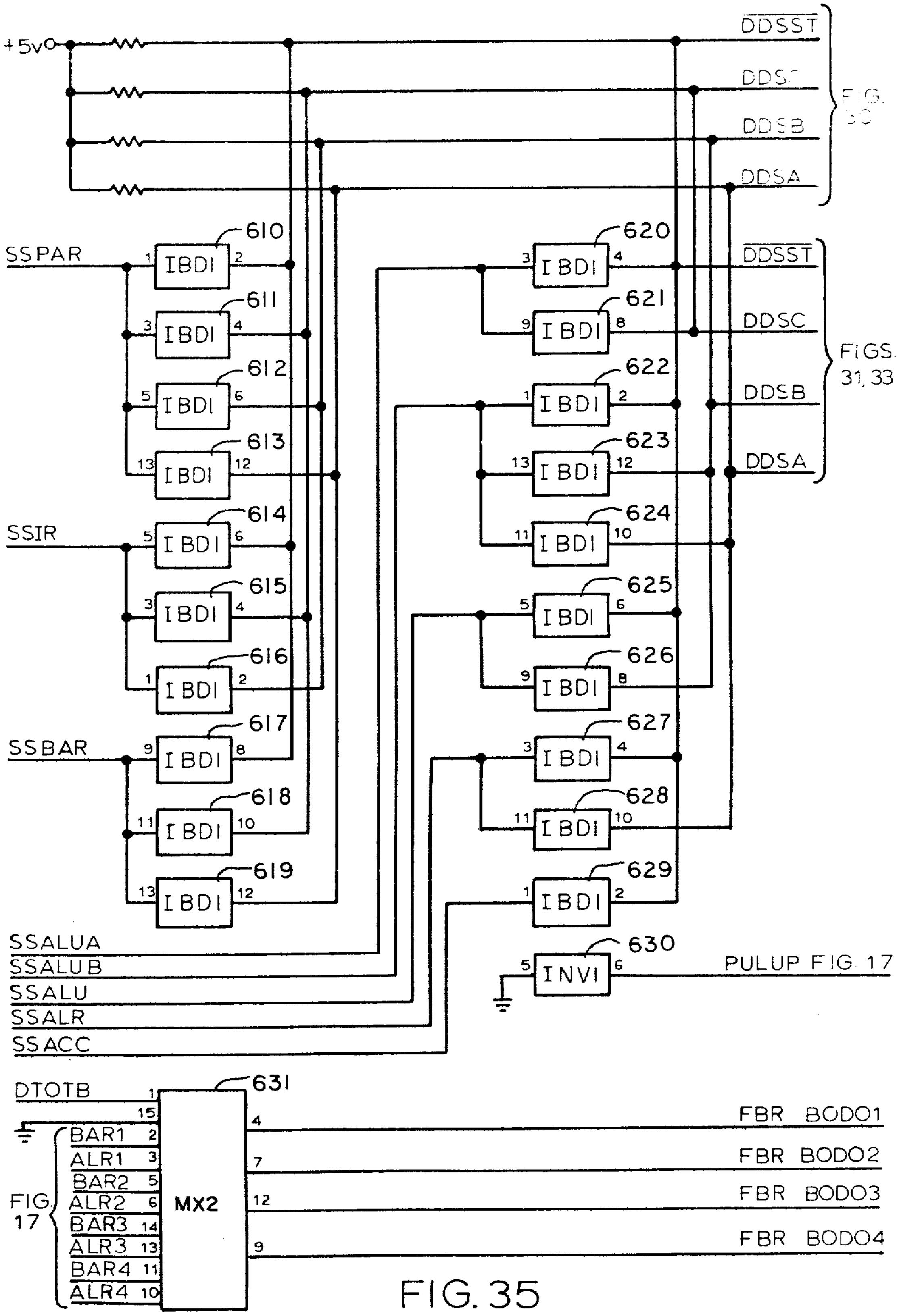
FIG. 35 is a detailed schematic circuit diagram of a portion of the test panel and of a bus control unit which may be utilized to interface the central processor of FIG. 1 to the common data bus.

FIG. 35 shows another portion of the test panel and also a bus data selector. It comprises 7406 HEX INVERTER OPEN COLLECTOR BUFFERS 610–629, 7404 HEX INVERTER 630 and 74157 QUAD 2→1 MULTIPLEXER 631.

The scan means uses the data bus multiplexer 631 to transfer information from the bus address register through the data bus. This is to allow the composite subsystem address to be placed onto the bus for purposes of interrogating the preselected subsystems to loacte the preselected bits of data.

Figure 36:
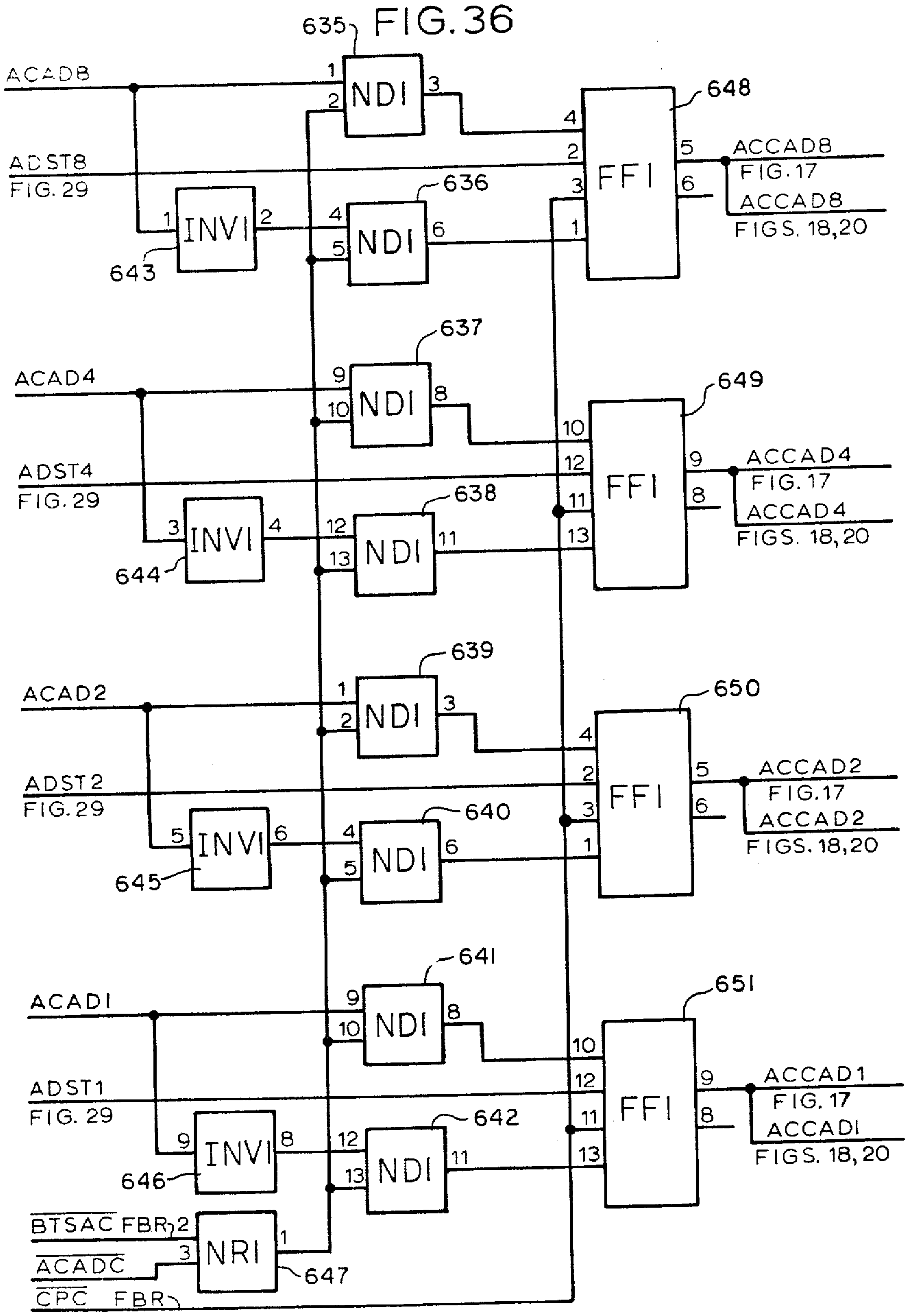
FIG. 36 is a detailed schematic diagram of the major portion of the accumulator address register of FIG. 1.

FIG. 36 shows a detailed schematic circuit diagram of the major portion of the accumulator address register. It comprises 7400 QUAD 2-NAND gates 635–642, 7404 HEX INVERTER 643–646, 7402 QUAD 2-NOR gate 647 and 7474 DUAL D FLIP-FLOP 648–651.

Flip-flops 648–651 are used to select one of the accumulators AC0–AC3 during the scan means operation. Recall for the moment that the RAMS of the accumulators had 4 input leads which are used to select the particular accumulator into which the information is to be stored. Leads ACCAD8, ACCAD4, ACCAD2 and ACCAD1 go to these four inputs for providing the appropriate selection. The selections are made responsive to leads ADST8, ADST4, ADST2 and ADST1 on flip-flops 648, 649, 650 and 651 respectively. The accumulator selections are gated by the central processor clock ($\overline{\text{CPC}}$).

Figure 37:
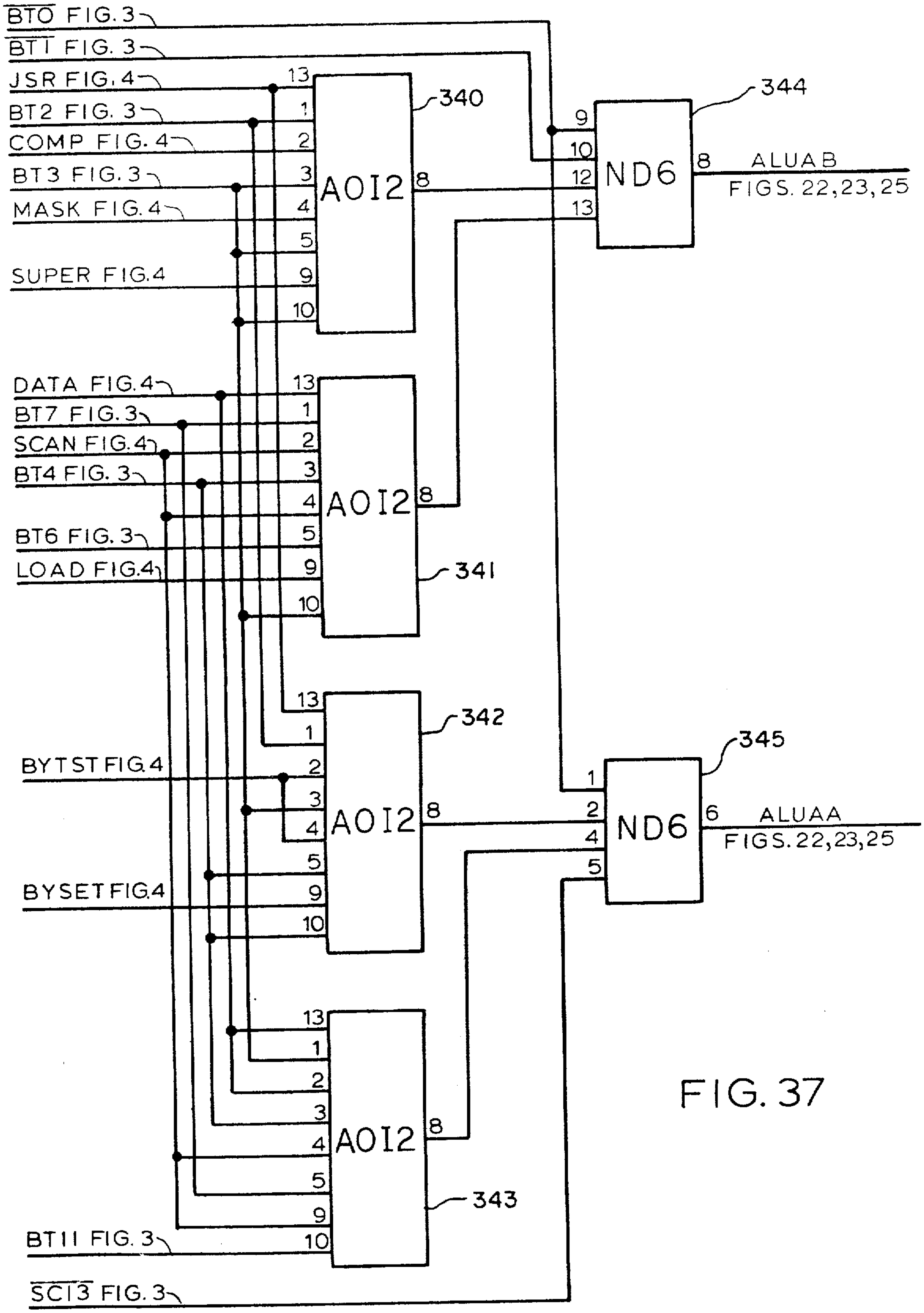
FIGS. 37–40 are detailed schematic diagrams showing additional portions of the control word generator of FIG. 1.

Referring to FIGS. 37 through 40 which comprise the balance of the control word generator, the circuit of FIG. 37 comprises 7454 4×2 AND/OR/INVERT gates 340–343 and 7440 DUAL 4-NAND BUFFER gates 344 and 345. As previously mentioned, the ALU has two sets of inputs, the A input and the B input. There are two control leads used to select information to be gated to input A of the ALU, namely the ALUAB and ALUAA inputs. Gates 341 and 344 control what information is fed into the ALUAB input during the scan operational code. Gate 343 and 345 controls what information is fed into the ALUAA input of the ALU during the scan operational code.

Figure 38:
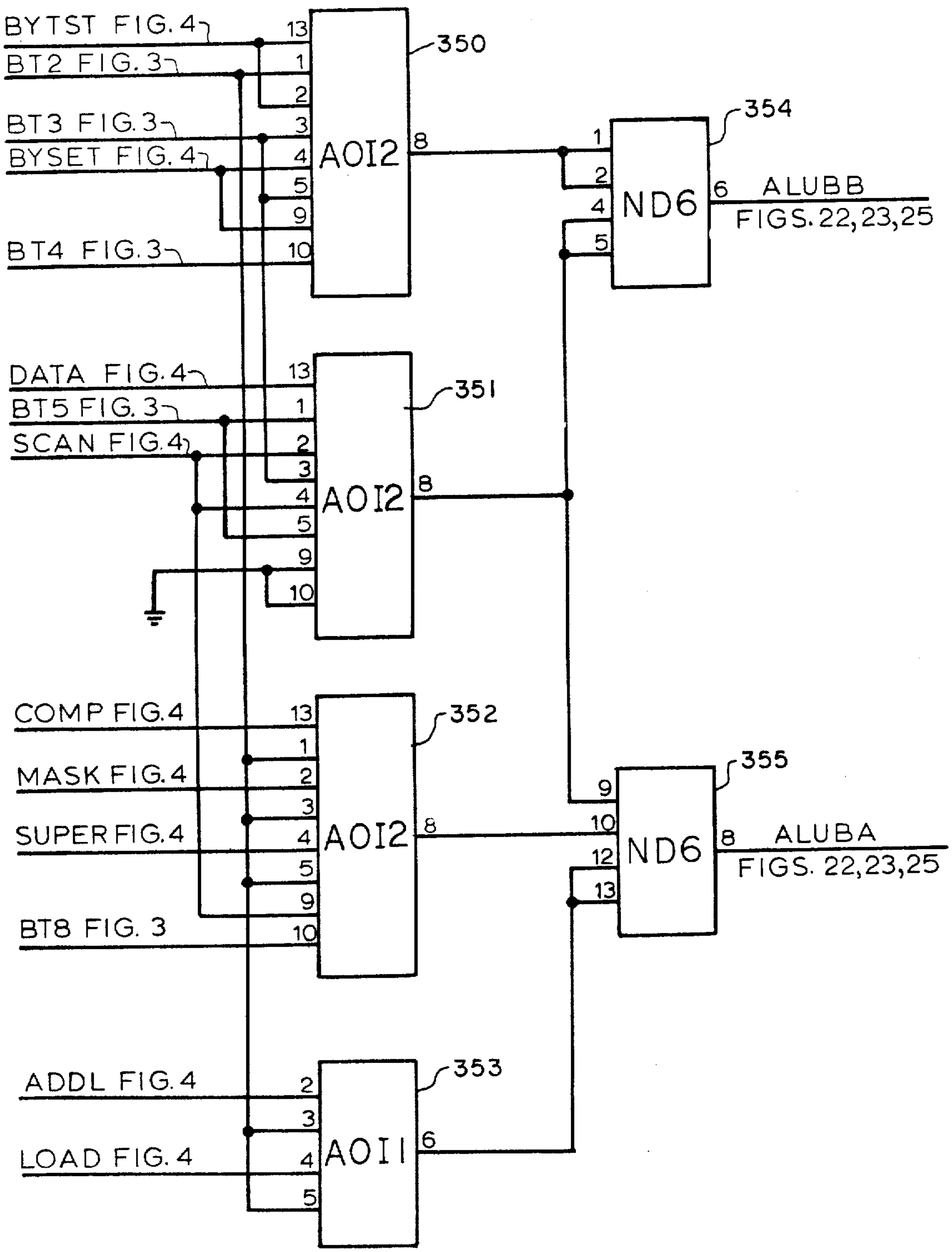

FIG. 38 comprises 7454 4×2 AND/OR/INVERT gates 350–352, 7440 DUAL 4-NAND BUFFER gates 354 and 355, and 7451 DUAL 2×2 AND/OR/INVERT gate 353. The circuit of FIG. 39 comprises 7404 HEX INVERTERS 360–366, 7420 DUAL 4-NAND gates 367–369, 7430 8-NAND gates 370–371, 7454 4×2 AND/OR/INVERT gate 372 and a 74123 DUAL RETRIEVABLE MONSTABLE MULTIVIBRATOR 373.

Referring specifically to FIG. 38, the circuit thereshown controls the selection of information which is fed into input B of the ALU during the scan operation. Gates 351 and 354 determine what information is fed into the ALU input B multiplexers of the ALU during the scan operation. Gates 351, 352 and 355 are used to select information to be fed into the ALUBA input during the scan execution and gate 369 of FIG. 39 is used to select the information to be fed into the ALUBC input during the scan execution.

Figure 39:
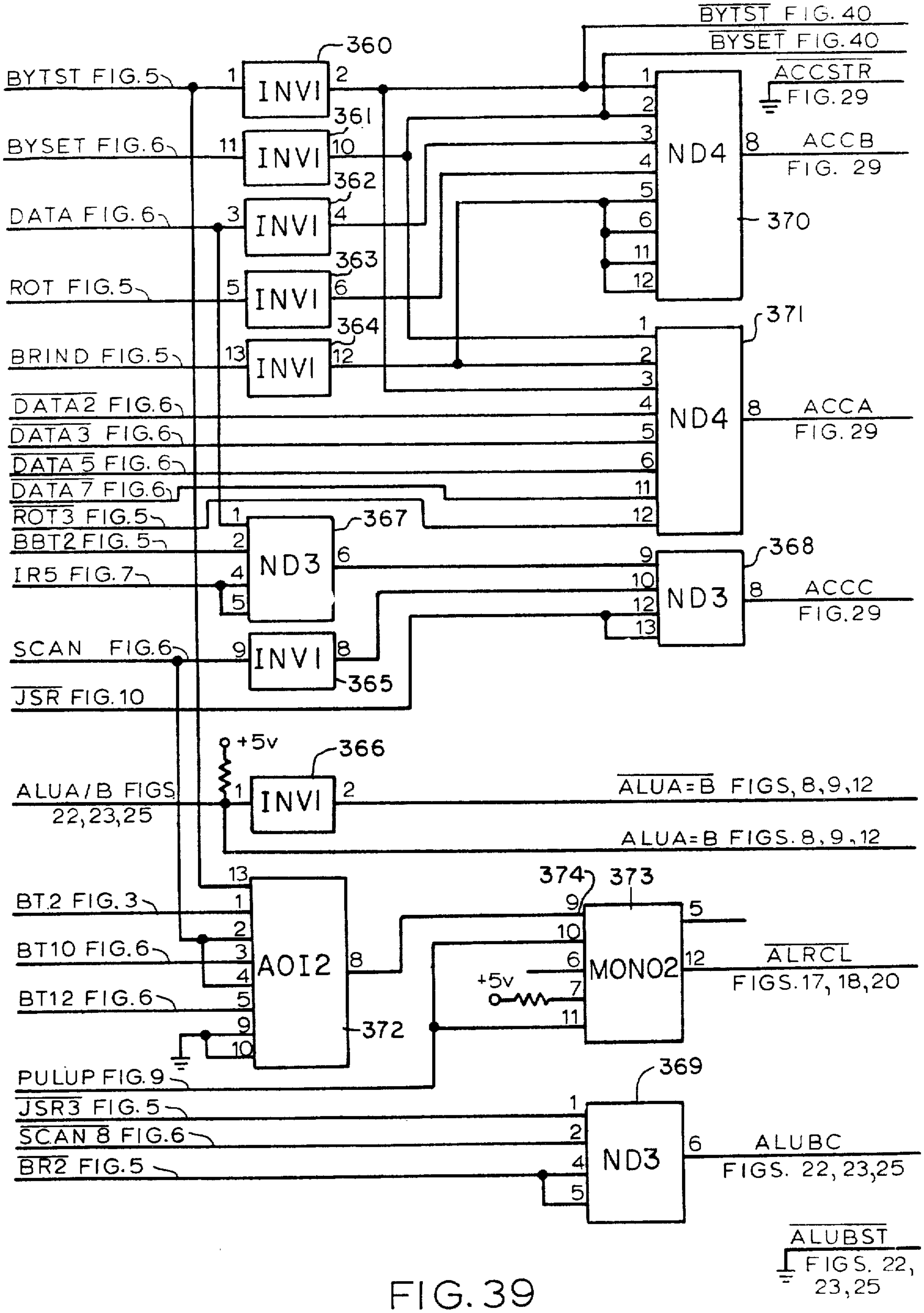

Referring specifically now to FIG. 39, leads ACCA, ACCB and ACCC are used to provide the address of a particular accumulator to be utilized during the scan execution. They are utilized by multiplexers 552–554 of FIG. 29 to allow the IR byte selector or the control word generator to select a given accumulator at any point in time.

Inverter 366 is utilized by the scan means to determine as to whether or not the data at input A is identical to the data at input B of the ALU during the scan execution. If the inputs to the ALU are identical and the ALU is in the proper mode, inverter 366 will provide a first control signal and if they are not identical, inverter 366 will provide the second control signal.

Monostable 373 is used to clear the arithmetic logic register at certain times during the execution of the scan means. This is necessary in order to facilitate the compare function of the ALU. The clearing of the ALR is formed at BT10 and BT12.

Figure 40:
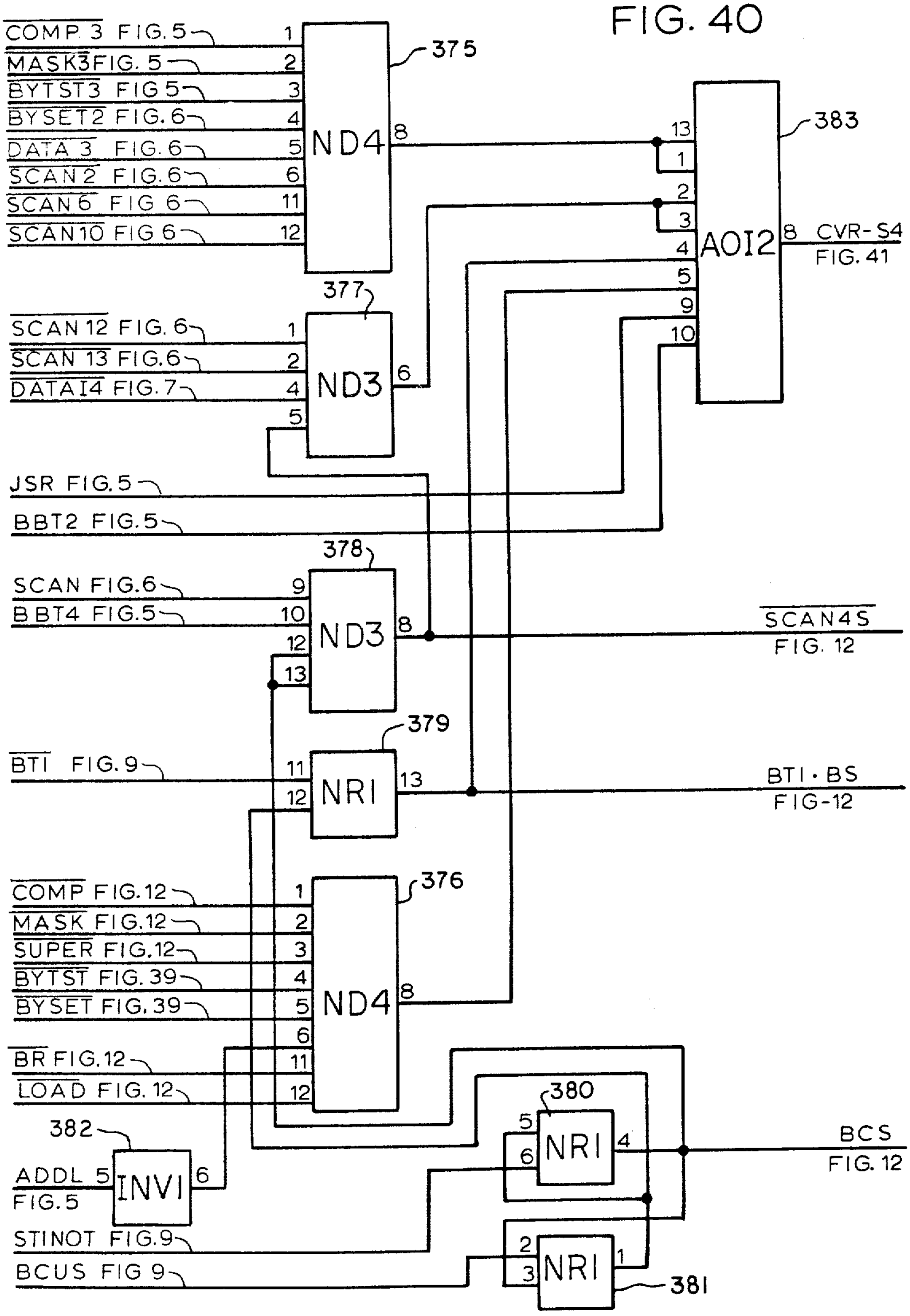

FIG. 40 comprises 7430 8-NAND gates 375 and 376, 7420 DUAL 4-NAND gates 377 and 378, 7402 QUAD 2-NOR gates 379–381, 7404 HEX INVERTER 382 and 7454 4×2 AND/OR/INVERT gate 383.

Gate 383 provides CVR-S4, which is the S4 function control signal to be utilized by the arithmetic logic unit for determining what function it is to perform.

$\overline{SCAN4S}$ provides a signal which indicates that the scan means is in scan operational code, at bit time 4 and has received a bus strobe pulse. Scan means is in bit time 4, it is waiting for information from the bus. Previous to the bus control strobe pulse to indicate that the bus is answering, the scan means must retain the F=A function in the ALU but after the data is received from the bus the function must be changed to F=B. NOR gates 380 and 381 detect when the strobe signal is received. That information is ANDED with scan and bit time 4 to provide $\overline{SCAN4S}$.

Figure 41:
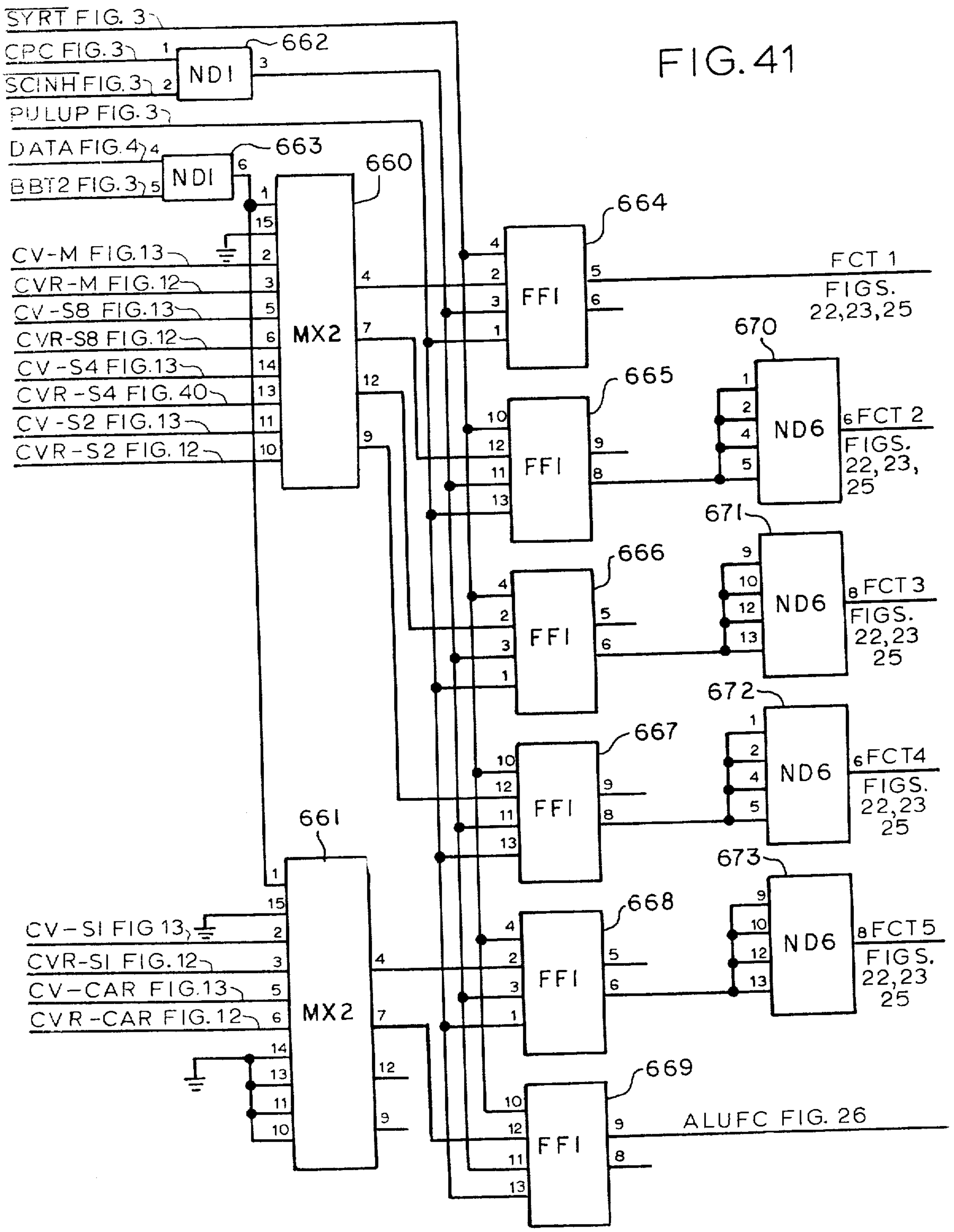
FIG. 41 is a detailed schematic circuit of the function control of FIG. 1.

FIG. 41 is a detailed schematic circuit diagram of the function control of FIG. 1. It comprises 74157 QUAD 2→1 MULTIPLEXERS 660 and 661, 7400 QUAD 2-NAND gates 662 and 663, 7474 DUAL D FLIP-FLOP 664–669 aad 7440 DUAL 4-NAND BUFFERS 670-673. This circuit merely takes the CVR-M, CVR-S8, CVR-S4, CVR-S2 and CVR-S1 signals and encodes them into the FCT1–FCT5 function signals to be utilized by the ALU of the scan means.

Lastly, referring back to FIGS. 22–26 and remembering that bits 1–8 of accumulator AC3 are decremented each time the transmitted data and the preselected bits of data are not identical, the decrement is performed by utilizing a hard wired decrement constant which is subtracted from bits 1–8 of accumulator AC3. The hard wired decrement constant is one of the 8 inputs to be received by the ALUB inputs. When information is to be selected, the ALUBB and ALUBA inputs at the tops of each of the FIGS. 22–26 will both be zero. The information on pin 6 of each multiplexer 475–478, 485–488, 495–498, 505–508 and 515–518 will be gated to the output pin 7 of each of the multiplexers. Likewise the information on pin 10 of each of these multiplexers will be gated to their output pin 9. Each pin 6 of these multiplexers is connected to one of the ACC lines ACC1–ACC20. These form a 20 input lead set for the multiplexers. Each multiplexer has 8 individual input leads pins 6, 5, 4, 3 and 10, 11, 12 and 13. Considering that all 20 of these multiplexers has these 8 inputs, therefore 8 sets of 20 inputs. One of those sets is wired to provide the hard wired constant.

Figure 23:
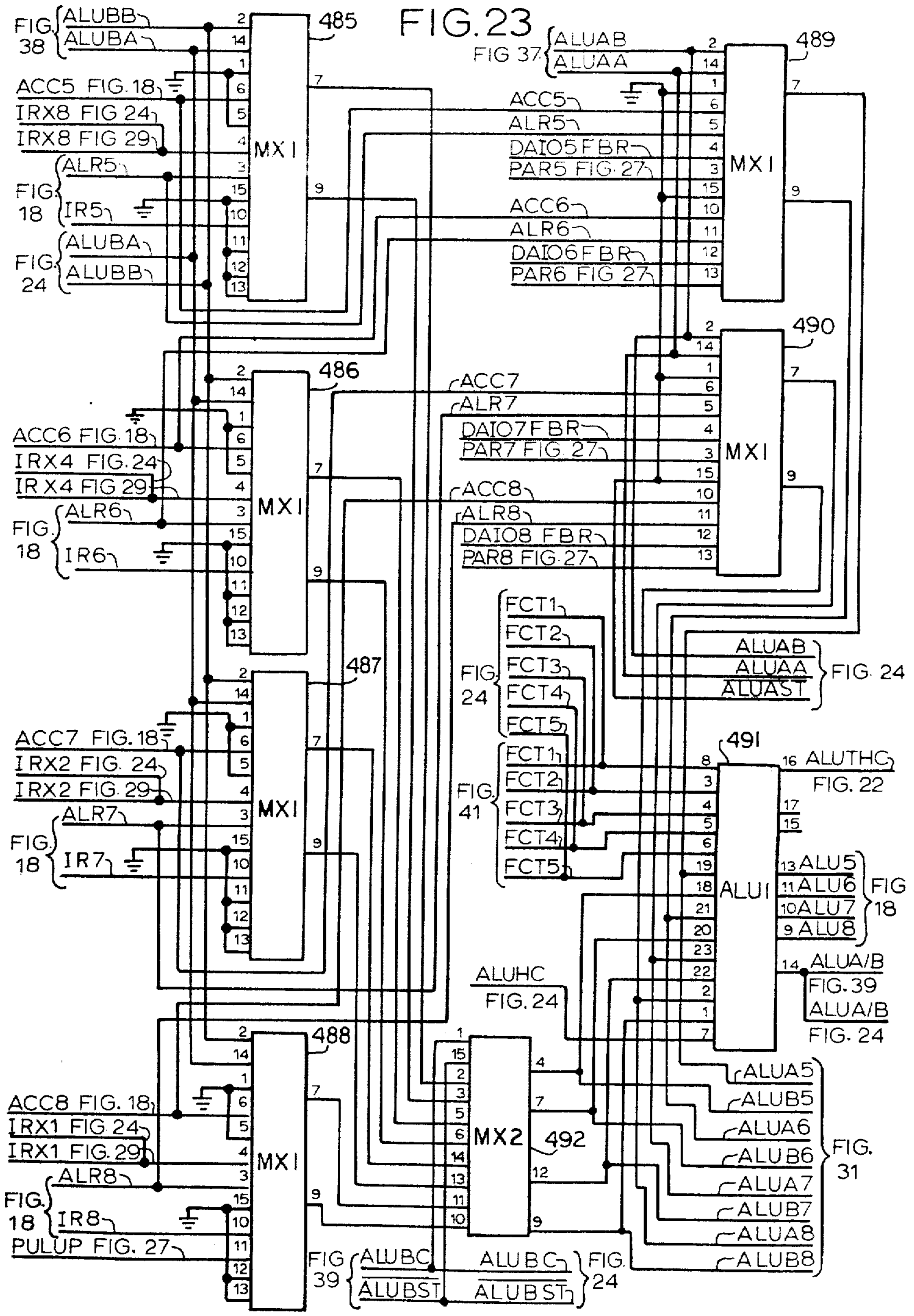
Figure 24:
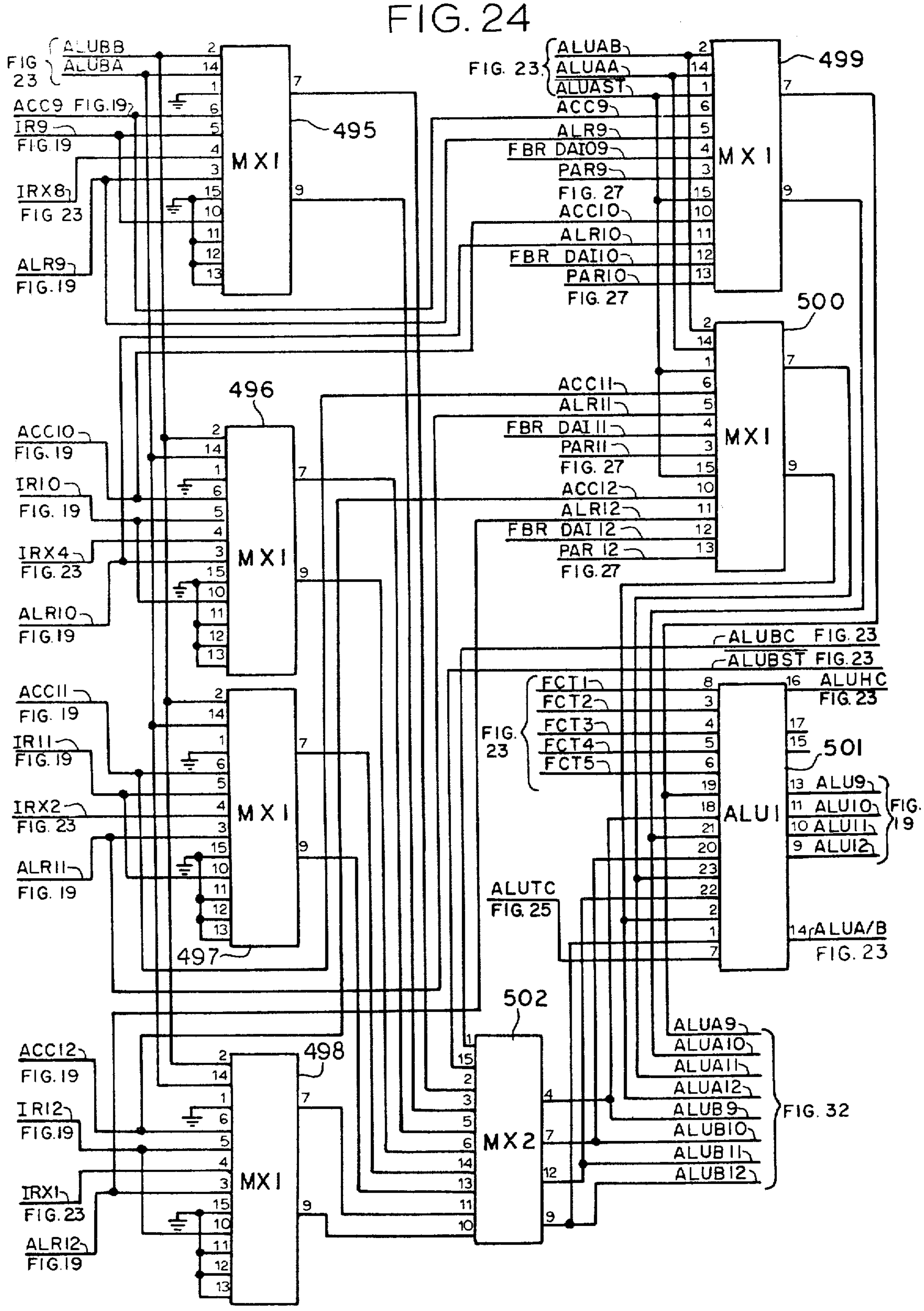
Figure 25:
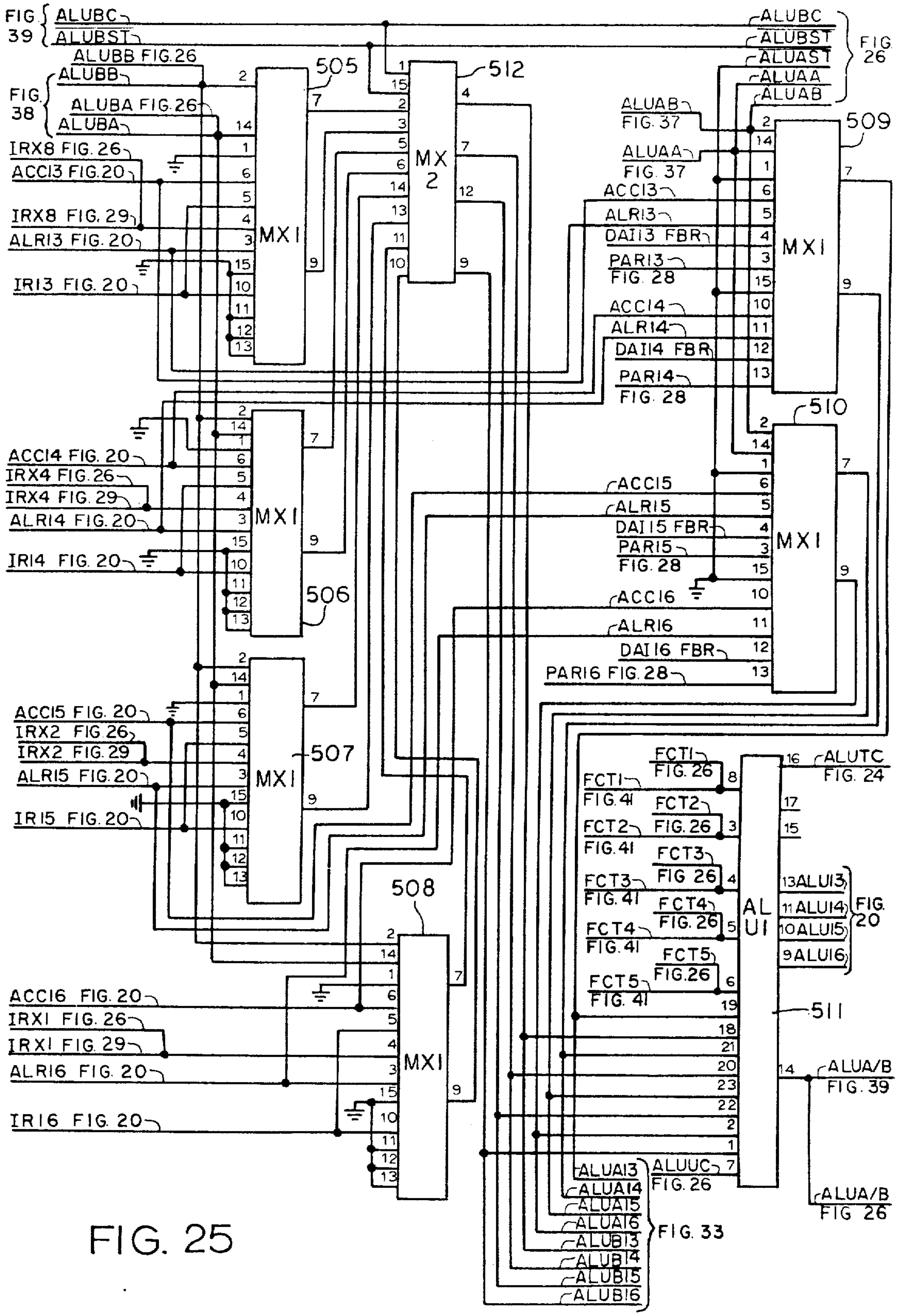
Figure 26:
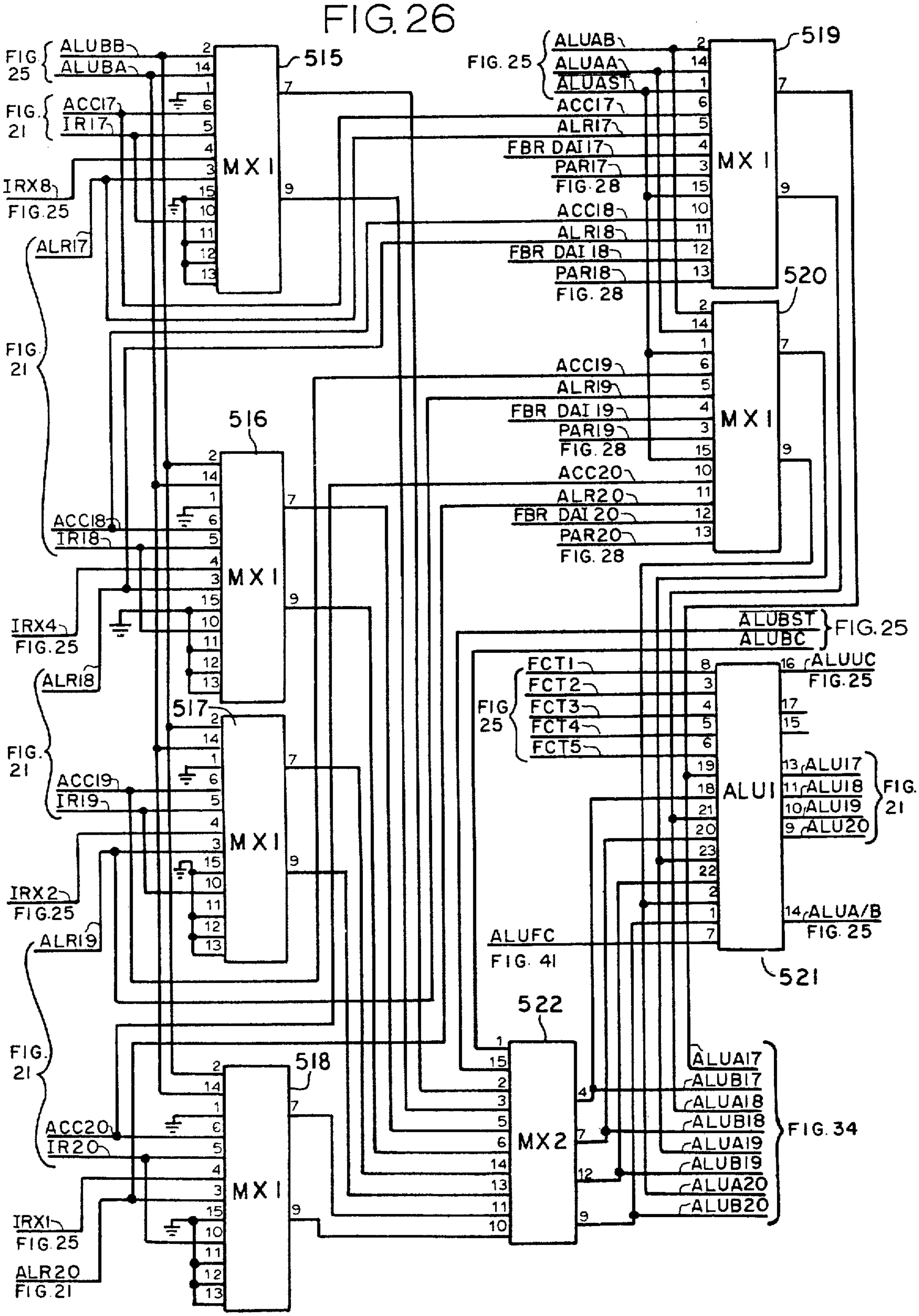

The hard wired constant is provided at pin number 11 of each of these multiplexers. The hard wired constant is provided by the fact that only pin 11 of multiplexer 488 of FIG. 23 is pulled up to a one while all of the other pin 11s of the multiplexers are grounded. Therefore, the multiplexers of FIG. 22 provides a zero, the multiplexer of FIG. 23 provides a one, the multiplexers of FIGS. 24, 25, and 26 provide zeros.

Therefore, a decrement constant of 01000 is provided for decrementing the bits 1–8 of accumulator of AC3.

While a particular embodiment of the invention has been shown and described it will be obvious to those skilled in the art that changes and modifications may be made without departing from the invention in its broader aspects, and therefore, the aim in the appended claims is to cover all such changes and modifications as may fall within the true spirit and scope of the invention.

We claim:

1. In a central processor of the type which controls the operation of telephone exchange subsystems to establish requested service between telephone subscribers in response to a plurality of addressable multiple bit operational codes, wherein each of the subsystems is connected to the central processor by a common data bus and assigned a discrete subsystem address for enabling the addressing of each subsystem and wherein one of the subsystems is a program memory containing the plurality of operational codes, the improvement of scan means responsive to a particular operational code which includes a first partial subsystem address for interrogating preselected subsystems to locate stored subsystem data which contains preselected bits of data comprising:

an instruction register for storing the particular operational code;

an instruction register byte selector coupled to said instruction register for selecting said first partial subsystem address;

a first accumulator for storing a second partial subsystem address;

combining means coupled to said instruction register byte selector and said first accumulator for combining said first and second partial subsystem addresses to provide a composite subsystem address;

a bus address register coupled to said combining means and to said common data bus for addressing the subsystem having said composite subsystem address for causing it to transmit the data stored therein over said common data bus;

a second accumulator for storing the preselected bits of data as a compare constant;

a comparator coupled to said common data bus and to said second accumulator for comparing said transmitted data to said compare constant for determining if said transmitted data and said compare constant are identical; and means responsive to said comparator for providing a first control signal when said transmitted data and said compare constant are identical and for providing a second control signal when said transmitted data and said compare constant are not identical.

2. A central processor in accordance with claim 1 further comprising a third accumulator for storing a mask constant and masking means coupled to said common data bus and to said third accumulator for masking said transmitted data with said mask constant for transforming said transmitted data into a data work having predetermined bits to be compared to said compare constant by said comparator.

3. A central processor in accordance with claim 2 further comprising a fourth accumulator coupled to said combining means for storing an increment address constant, and wherein said combining means combines said second partial subsystem address with said increment address constant responsive to said second control signal to provide sequential incremented composite subsystem addresses as long as said masked transmitted data and said compare constant are not identical.

4. A central processor in accordance with claim 3 wherein said fourth accumulator additionally includes a down counter for initially storing a cycle data word representing a predetermined number of subsystem address increments and means responsive to said second control signal for decrementing said down counter.

5. A central processor in accordance with claim 4 further comprising a program address register for sequentially storing the address of the next program memory operational code and means coupled to said program address register and responsive to said down counter for terminating the scan means and for causing said program address register to pass over the next operational code when said down counter is decremented by said predetermined number.

6. A central processor in accordance with claim 5 further comprising means responsive to said first control signal and coupled to said program address register for causing said program address register to initiate the next operational code in response to said first control signal.

7. A central processor in accordance with claim 5 further comprising means responsive to said second control signal and coupled to said program address register for causing said program address register to initiate the next operational code in response to said second control signal.

8. A central processor in accordance with claim 3 wherein said incremented composite subsystem address and said composite subsystem address comprise twenty bits, wherein said first partial subsystem address comprises four bits and wherein said second partial subsystem address comprises sixteen bits.

9. In a central processor of the type which controls the operation of telephone exchange subsystems to establish requested service between telephone subscribers in response to a plurality of addressable multiple bit operational codes, wherein each of the subsystems is connected to the central processor by a common data bus and assigned a discrete subsystem address for enabling the addressing of each subsystem and wherein one of the subsystems is a program memory containing the plurality of operational codes, the improvement of a scan means responsive to a particular operational code which includes a mode bit and first and second partial subsystem addresses for interrogating preselected subsystems to locate stored subsystem data which contains preselected bits of data comprising:

an instruction register for storing the particular operational code;

an instruction register byte selector coupled to said instruction register for selecting said first and second partial subsystem addresses;

a first accumulator for storing a third partial subsystem address;

combining means coupled to said instruction register byte selector and said first accumulator for combining said first and third partial subsystem addresses to provide an address word obtaining composite subsystem address;

a bus address register coupled to said combining means and to said common data bus and responsive to said combining means for addressing the subsystem having said address word obtaining composite subsystem address for causing it to transmit the address word stored therein over said common data bus;

said combining means additionally being coupled to said common data bus and responsive to said mode bit for combining said second partial subsystem address with said address word for providing a data obtaining composite sybsystem address;

said bus address register additionally being responsive to said data obtaining composite subsystem address for addressing the subsystem having said data obtaining composite address for causing it to transmit the data stored therein over said common data bus;

a second accumulator for storing the preselected bits of data as a compare constant;

a comparator coupled to said common data bus and to said second accumulator for comparing said transmitted data to said compare constant for determining if said transmitted data and said compare constant are identical; and means responsive to said comparator for providing a first control signal when said transmitted data and said compare constant are identical and for providing a second control signal when said transmitted data and said compare constant are not identical.

10. A central processor in accordance with claim 9 further comprising a third accumulator for storing a mask constant and masking means coupled to said common data bus and to said third accumulator for masking said transmitted data with said mask constant for transforming said transmitted data into a data word having predetermined bits to be compared to said compare constant by said comparator.

11. A central processor in accordance with claim 10 further comprising a fourth accumulator coupled to said combining means for storing an increment address constant, and wherein said combining means combines said third partial subsystem address with said increment address constant responsive to said second control signal to provide sequential data obtaining incremented composite subsystem addresses as long as said masked transmitted data and said compare constant are not identical.

12. A central processor in accordance with claim 11 wherein said fourth accumulator additionally includes a down counter for initially storing a cycle data word representing a predetermined number of subsystem data obtaining address increments and means responsive to said second control signal for decrementing said down counter.

13. A central processor in accordance with claim 12 further comprising a program address register for sequentially storing the address of the next program memory operational code and means coupled to said program address register and responsive to said down counter for terminating the scan means and for causing said program address register to pass over the next operational code when said down counter is decremented by said predetermined number.

14. A central processor in accordance with claim 13 further comprising means responsive to said first control signal and coupled to said program address register for causing said program address register to initiate the next operational code in response to said first control signal.

15. A central processor in accordance with claim 13 further comprising means responsive to said control signal and coupled to said program address register for causing said program address register to initiate the next operational code in response to said second control signal.

16. A central processor in accordance with claim 11 wherein said address word obtaining composite subsystem address, said incremented data obtaining composite subsystem address and said data obtaining composite subsystem address comprise twenty bits, wherein said first and second partial subsystem address comprises four bits and wherein said third partial subsystem address comprises sixteen bits.

* * * * *

UNITED STATES PATENT OFFICE
CERTIFICATE OF CORRECTION

PATENT NO. : 3,922,644

DATED : November 25, 1975

INVENTOR(S) : R.A.BORBAS, J.P.DUFTON & J.H.FOSTER

It is certified that error appears in the above identified patent and that said Letters Patent are hereby corrected as shown below Column 26, line 48, delete "work" and insert -- word --

Column 27, line 64, "sybsystem" should be -- subsystem --

Column 28, line 55, after "said" insert -- second --

Signed and Sealed this

*twenty-third* Day of *March 1976*

[SEAL]

*Attest:*

RUTH C. MASON
*Attesting Officer*

C. MARSHALL DANN
*Commissioner of Patents and Trademarks*